(12) United States Patent
Cranfill et al.

(10) Patent No.: US 8,438,504 B2
(45) Date of Patent: May 7, 2013

(54) DEVICE, METHOD, AND GRAPHICAL USER INTERFACE FOR NAVIGATING THROUGH MULTIPLE VIEWING AREAS

(75) Inventors: Elizabeth Caroline Furches Cranfill, San Francisco, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 12/789,436

(22) Filed: May 27, 2010

(65) Prior Publication Data

US 2011/0167341 A1    Jul. 7, 2011

Related U.S. Application Data

(60) Provisional application No. 61/292,785, filed on Jan. 6, 2010.

(51) Int. Cl.
*G06F 3/033* (2006.01)
*G06F 3/01* (2006.01)
*G06F 3/048* (2006.01)

(52) U.S. Cl.
USPC ............................ 715/863; 715/702; 715/794

(58) Field of Classification Search ................ 715/702, 715/790, 791, 793–797, 802, 835, 863
See application file for complete search history.

(56) References Cited

U.S. PATENT DOCUMENTS

| | | |
|---|---|---|
| 4,313,108 A | 1/1982 | Yoshida |
| 5,446,882 A | 8/1995 | Capps et al. |
| 5,541,697 A | 7/1996 | McIntyre |
| 5,570,109 A | 10/1996 | Jenson |
| 5,610,653 A | 3/1997 | Abecassis |

(Continued)

FOREIGN PATENT DOCUMENTS

| | | |
|---|---|---|
| EP | 0 476 972 A2 | 3/1992 |
| EP | 0 651 544 A2 | 6/1995 |

(Continued)

OTHER PUBLICATIONS

Anonymous, "Menus," Chapter 13, Apple Human Interface Guidelines, Aug. 20, 2009, pp. 165-190, <http://developer.apple.com/library/mac/documentation/UserExperience/Conceptual/AppleHIGuidelines/OSXHIGuidelines.pdf>.

(Continued)

*Primary Examiner* — Omar Abdul-Ali
*Assistant Examiner* — Andrew Tank
(74) *Attorney, Agent, or Firm* — Morgan, Lewis & Bockius LLP

(57) ABSTRACT

A method includes: displaying a first viewing area, the first viewing area including a first plurality of selectable objects; in response to detecting activation of an object in the first plurality of selectable objects, overlaying a second viewing area on a portion of the first viewing area while maintaining display of a remaining portion of the first viewing area. The second viewing area includes a second plurality of selectable objects. The method also includes, in response to detecting activation of an object in the second plurality of selectable objects, overlaying a third viewing area on a portion of the first viewing area. The third viewing area includes a third plurality of selectable objects. The method also includes displaying a portion of the second viewing area overlaid on a portion of the first viewing area; and maintaining display of a remaining portion of the first viewing area.

23 Claims, 77 Drawing Sheets

U.S. PATENT DOCUMENTS

| | | | |
|---|---|---|---|
| 5,612,719 A | 3/1997 | Beernink et al. |
| 5,659,805 A | 8/1997 | Furlani et al. |
| 5,760,773 A | 6/1998 | Berman et al. |
| 5,896,133 A | 4/1999 | Lynch et al. |
| 5,900,909 A | 5/1999 | Parulski et al. |
| 6,011,585 A | 1/2000 | Anderson |
| 6,025,842 A | 2/2000 | Filetto et al. |
| 6,073,036 A | 6/2000 | Heikkinen et al. |
| 6,177,936 B1 | 1/2001 | Cragun |
| 6,199,082 B1 | 3/2001 | Ferrel et al. |
| 6,243,080 B1 | 6/2001 | Molne |
| 6,262,732 B1 | 7/2001 | Coleman et al. |
| 6,297,795 B1 | 10/2001 | Kato et al. |
| 6,313,855 B1 | 11/2001 | Shuping et al. |
| 6,326,970 B1 | 12/2001 | Mott et al. |
| 6,349,410 B1 | 2/2002 | Lortz |
| 6,359,615 B1 | 3/2002 | Singh |
| 6,388,877 B1 | 5/2002 | Canova, Jr. et al. |
| 6,411,283 B1 | 6/2002 | Murphy |
| 6,466,198 B1 | 10/2002 | Feinstein |
| 6,466,203 B2 | 10/2002 | Van Ee |
| 6,486,895 B1 | 11/2002 | Robertson et al. |
| 6,489,975 B1 | 12/2002 | Patil et al. |
| 6,496,182 B1 | 12/2002 | Wong et al. |
| 6,570,583 B1 | 5/2003 | Kung et al. |
| 6,590,568 B1 | 7/2003 | Astala et al. |
| 6,613,100 B2 | 9/2003 | Miller |
| 6,639,584 B1 | 10/2003 | Li |
| 6,771,250 B1 | 8/2004 | Oh |
| 6,919,879 B2 | 7/2005 | Griffin et al. |
| 6,928,461 B2 | 8/2005 | Tuli |
| 6,956,564 B1 | 10/2005 | Williams |
| 7,007,241 B2 * | 2/2006 | Boeuf | 715/802 |
| 7,030,861 B1 | 4/2006 | Westerman et al. |
| 7,054,965 B2 | 5/2006 | Bell et al. |
| 7,075,512 B1 | 7/2006 | Fabre et al. |
| 7,085,590 B2 | 8/2006 | Kennedy et al. |
| 7,149,549 B1 | 12/2006 | Ortiz et al. |
| 7,166,791 B2 | 1/2007 | Robbin et al. |
| 7,171,625 B1 | 1/2007 | Sacchi |
| 7,346,855 B2 | 3/2008 | Hellyar et al. |
| 7,461,353 B2 | 12/2008 | Rohrabaugh et al. |
| 7,587,671 B2 | 9/2009 | Saft et al. |
| 7,676,767 B2 * | 3/2010 | Hofmeister et al. | 715/863 |
| 7,679,604 B2 | 3/2010 | Uhlik et al. |
| 7,739,271 B2 | 6/2010 | Cook et al. |
| 7,788,583 B1 | 8/2010 | Amzallag et al. |
| 7,831,926 B2 | 11/2010 | Rohrabaugh et al. |
| 7,840,907 B2 * | 11/2010 | Kikuchi et al. | 715/790 |
| 7,844,889 B2 | 11/2010 | Rohrabaugh et al. |
| 8,259,153 B1 * | 9/2012 | Campbell et al. | 348/14.01 |
| 8,269,739 B2 * | 9/2012 | Hillis et al. | 345/173 |
| 8,291,341 B2 * | 10/2012 | Tseng et al. | 715/786 |
| 8,294,105 B2 * | 10/2012 | Alameh et al. | 250/344 |
| 2002/0015064 A1 | 2/2002 | Robotham et al. |
| 2002/0021278 A1 | 2/2002 | Hinckley et al. |
| 2002/0093531 A1 | 7/2002 | Barile |
| 2002/0152283 A1 | 10/2002 | Dutta et al. |
| 2003/0013483 A1 | 1/2003 | Ausems et al. |
| 2003/0025676 A1 | 2/2003 | Cappendijk |
| 2003/0033331 A1 | 2/2003 | Sena et al. |
| 2003/0063125 A1 | 4/2003 | Miyajima et al. |
| 2003/0081135 A1 | 5/2003 | Boll |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0117440 A1 | 6/2003 | Hellyar et al. |
| 2003/0164861 A1 | 9/2003 | Barbanson et al. |
| 2003/0193524 A1 | 10/2003 | Bates et al. |
| 2004/0027396 A1 | 2/2004 | Lection |
| 2004/0055446 A1 | 3/2004 | Robbin et al. |
| 2004/0103371 A1 | 5/2004 | Chen et al. |
| 2004/0143796 A1 | 7/2004 | Lerner et al. |
| 2004/0169674 A1 | 9/2004 | Linjama |
| 2004/0201595 A1 | 10/2004 | Manchester |
| 2004/0205496 A1 | 10/2004 | Dutta et al. |
| 2004/0215534 A1 | 10/2004 | Gautier et al. |
| 2004/0250217 A1 | 12/2004 | Tojo et al. |
| 2004/0268400 A1 | 12/2004 | Barde et al. |
| 2005/0005246 A1 | 1/2005 | Card et al. |
| 2005/0020317 A1 | 1/2005 | Koyama |
| 2005/0044509 A1 | 2/2005 | Hunleth et al. |
| 2005/0057524 A1 | 3/2005 | Hill et al. |
| 2005/0066286 A1 | 3/2005 | Makela |
| 2005/0071364 A1 | 3/2005 | Xie et al. |
| 2005/0071736 A1 | 3/2005 | Schneider et al. |
| 2005/0071778 A1 | 3/2005 | Tokkonen |
| 2005/0079896 A1 | 4/2005 | Kokko et al. |
| 2005/0093826 A1 | 5/2005 | Huh |
| 2005/0114788 A1 | 5/2005 | Fabritius |
| 2005/0166232 A1 | 7/2005 | Lamkin et al. |
| 2005/0177783 A1 | 8/2005 | Agrawala et al. |
| 2005/0183017 A1 | 8/2005 | Cain |
| 2005/0192924 A1 | 9/2005 | Drucker et al. |
| 2005/0204385 A1 | 9/2005 | Sull et al. |
| 2005/0229118 A1 | 10/2005 | Chiu et al. |
| 2005/0240494 A1 | 10/2005 | Cue et al. |
| 2005/0243069 A1 | 11/2005 | Yorio et al. |
| 2005/0270276 A1 | 12/2005 | Sugimoto et al. |
| 2005/0283729 A1 | 12/2005 | Morris et al. |
| 2005/0285880 A1 | 12/2005 | Lai et al. |
| 2006/0017692 A1 | 1/2006 | Wehrenberg et al. |
| 2006/0026521 A1 | 2/2006 | Hotelling et al. |
| 2006/0033761 A1 | 2/2006 | Suen et al. |
| 2006/0036944 A1 | 2/2006 | Wilson |
| 2006/0053387 A1 | 3/2006 | Ording |
| 2006/0055789 A1 | 3/2006 | Jin et al. | 348/208.12 |
| 2006/0064647 A1 | 3/2006 | Tapuska et al. |
| 2006/0085743 A1 | 4/2006 | Baudisch et al. |
| 2006/0097991 A1 | 5/2006 | Hotelling et al. |
| 2006/0101354 A1 | 5/2006 | Hashimoto et al. |
| 2006/0125799 A1 | 6/2006 | Hillis et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0197753 A1 | 9/2006 | Hotelling |
| 2006/0246955 A1 | 11/2006 | Nirhamo et al. |
| 2006/0265643 A1 | 11/2006 | Saft et al. |
| 2006/0277588 A1 | 12/2006 | Harrington et al. |
| 2006/0284852 A1 | 12/2006 | Hofmeister et al. |
| 2007/0004451 A1 | 1/2007 | Anderson |
| 2007/0024646 A1 | 2/2007 | Saarinen et al. |
| 2007/0038612 A1 | 2/2007 | Sull et al. |
| 2007/0067738 A1 | 3/2007 | Flynt et al. |
| 2007/0106952 A1 | 5/2007 | Matas et al. |
| 2007/0152984 A1 | 7/2007 | Ording et al. |
| 2007/0155434 A1 | 7/2007 | Jobs et al. |
| 2007/0157228 A1 | 7/2007 | Bayer et al. |
| 2007/0236476 A1 * | 10/2007 | Suzuki | 345/173 |
| 2007/0236479 A1 | 10/2007 | Wang et al. | 345/184 |
| 2007/0250762 A1 | 10/2007 | Funakami et al. |
| 2008/0059888 A1 | 3/2008 | Dunko |
| 2008/0062137 A1 | 3/2008 | Brodersen et al. |
| 2008/0066016 A1 | 3/2008 | Dowdy et al. |
| 2008/0094370 A1 | 4/2008 | Ording et al. |
| 2008/0165152 A1 | 7/2008 | Forstall et al. |
| 2008/0231610 A1 | 9/2008 | Hotelling et al. |
| 2009/0179867 A1 | 7/2009 | Shim et al. | 345/173 |
| 2010/0095240 A1 * | 4/2010 | Shiplacoff et al. | 715/784 |
| 2011/0029864 A1 * | 2/2011 | Stewart et al. | 715/702 |
| 2011/0041096 A1 * | 2/2011 | Larco et al. | 715/835 |

FOREIGN PATENT DOCUMENTS

| | | |
|---|---|---|
| EP | 0 701 220 A1 | 3/1996 |
| EP | 0 880 090 A2 | 11/1998 |
| EP | 1 049 305 A1 | 11/2000 |
| EP | 1 517 228 A2 | 3/2005 |
| EP | 1 632 874 A2 | 3/2006 |
| EP | 1 752 880 A1 | 2/2007 |
| GB | 2 301 217 A | 11/1996 |
| GB | 2 347 593 A | 9/2000 |
| JP | 11 143604 | 5/1999 |
| JP | 2000 181436 | 6/2000 |
| JP | 2001 175386 | 6/2001 |
| JP | 2002 244635 | 8/2002 |
| JP | 2004 288208 | 10/2004 |
| JP | 2004 318505 | 11/2004 |

| | | |
|---|---|---|
| JP | 2005 018229 | 1/2005 |
| JP | 2005 242669 | 9/2005 |
| JP | 2005 267049 | 9/2005 |
| WO | WO 99/54807 A1 | 10/1999 |
| WO | WO 00/08757 A | 2/2000 |
| WO | WO 01/23985 A1 | 4/2001 |
| WO | WO 02/46903 A1 | 6/2002 |
| WO | WO 02/082418 A2 | 10/2002 |
| WO | WO 02/093542 A1 | 11/2002 |
| WO | WO 03/052626 A1 | 6/2003 |
| WO | WO 2004/021166 A1 | 3/2004 |
| WO | WO 2004/040481 A1 | 5/2004 |
| WO | WO 2005/036416 A2 | 4/2005 |
| WO | WO 2005/041020 | 5/2005 |
| WO | WO 2005/074268 A1 | 8/2005 |
| WO | WO 2005/106684 A1 | 11/2005 |
| WO | WO 2006/003591 A2 | 1/2006 |
| WO | WO 2006/020304 A2 | 2/2006 |
| WO | WO 2006/020305 A2 | 2/2006 |
| WO | WO 2006/048028 A1 | 5/2006 |
| WO | WO 2008/030874 A1 | 3/2008 |
| WO | WO 2008/030976 A2 | 3/2008 |
| WO | WO 2008/086303 A1 | 7/2008 |
| WO | WO 2009/143076 A2 | 11/2009 |

OTHER PUBLICATIONS

International Search Report and Written Opinion dated Jun. 22, 2011, received in International Application No. PCT/US2010/062314, which corresponds to U.S. Appl. No. 12/789,436.
Agarwal, A., "iTunesInlineVideo," Digital Inspiration—The Tech Guide, 27 pages, http://labnol.blogspot.com/2006_09_17_labnol_archive.html, Sep. 23, 2006.
Ahmad, I. et al., "Content-Based Image Retrieval on Mobile Devices," Proc. of SPIE-IS&T Electronic Imaging. vol. 5684, 2005, 10 pages.
Alam, H. et al., "Web Document Manipulation for Small Screen Devices: A Review," 4 pages, http://www.csc.liv.ac.uk/~wda2003/Papers/Section_II/Paper_8.pdf, Aug. 2003.
Alejandre, S., "Graphing Linear Equations," Jun. 12, 2006, 3 pages, http://mathforum.org/alejandre/palm/times.palm.html.
Apparao, V. et al., "Level 1 Document Object Model Specification," W3C Working Draft Jul. 20, 1998, 3 pages, http://www.w3.org/TR/WD-DOM/.
Ars Technica, "CoverFlow : my visual album browser needs your help," posted on Ars Technica forum Jul. 27, 2005, 37 pages, http://arstechnica.com/civis/viewtopic.php?f=19&t=313706>.
Baudisch, P., "Collapse-to-Zoom: Viewing Web Pages on Small Screen Devices by Interactively Removing Irrelevant Content:" Oct. 24-27, 2004, 4 pages.
Bitstream®, "ThunderHawk Pocket PC Edition for End Users," ©2005, downloaded Jun. 12, 2006, 4 pages, http://www.bitstream.com/wireless/products/pocketpc/faq_using.html.
Bos, B. et al., "3 Conformance: Requirements and Recommendations," Cascading Style Sheets, level 2 CSS2 Specification, W3C Recommendation, May 12, 1998, 6 pages, http://www.w3.org/TR/CSS21/conform.html#doctree.
Buyukkokten, O. et al., "Power Browser: Efficient Web Browsing for PDAs." Digital Libraries Lab (InfoLab). Stanford University, Stanford, CA, Dec. 27, 2000, 8 pages.
Chen et al., "A novel navigation and transmission technique for mobile handheld devices.," Technical Report CSE-2003-1, Department of Computer Science, University of California at Davis, 2003, 8 pages, available at http://www.cs.ucdavis.edu/research/tech-r.
Chen et al., "Dress: A Slicing Tree Based Web Representation for Various Display Sizes," Microsoft Researach, Technical Report MSR-TR-2002-126, Nov. 16, 2002, 9 pages.
Chen, Y., "Detecting Web Page Structure far Adaptive Viewing on Small Form Factor Devices," Microsoft Research, i-yuchen@microsoft.com, May 20-24, 2003, 9 pages.
CNET, "Fujitsu LifeBook B6110D," CNET Review. Nov. 24, 2005, 2 pages.
Cooper, A., "The Inmates Are Running the Asylum," Sams Publishing, 1999, pp. 138-147.
del Strother, Jonathan, "CoverFlow " http://www.steelskies.com/coverflow, printed Jun. 15, 2006, 14 pages.
Enright, A.C., "Dissatisfaction Sows Innovation," The Treehouse + The Cave, , http://web.archive.org/web/20050331055401/http://thetreehouseand . . . , Figures A & B, http://web.archive.org/web/20061221232052/photos3.flickr.com, Dec. 29, 2004, 6 pages.
Eyemodule, "Turn Your Handspring ™ Handheld into a Digital Camera," User's Manual, 2000, www.eyemodule.com, 9 pages.
FingerWorks, "Installation and Operation Guide for the TouchStream" Copyright© 2002, 14 pages, www.fingerworks.com.
FingerWorks, "Quick Reference Guide for iGesture Products,"Copyright© 1999-2002, 4 pages, www.fingerworks.com.
FingerWorks, "Quick Reference Guide for TouchStream ST/LP," 2003, 4 pages, www.fingerworks.com.
FingerWorks, "TouchStream LP Silver," Apr. 27, 2005, 18 pages, http://www.fingerworks.com.
FingerWorks Forums, "Finger works Support Forums—Product Comments—TouchStream KeyBoards—Is the Multitouch Lemur," http://64233.167.104/search?q=cache:sjVdtyFBvRMJ:forums.finder, printed Nov. 16, 2005, 2 pages.
Fling, B., "Designing for Mobile, Bringing Design Down to Size," Jul. 2006 Blue Flavor, brian@blueflavor.com.
Gears, "Orange SPV C600 Review," coolsmartphone.com, Apr. 14, 2006, 58 pages, http://www.coolsmartphone.com/article569.html.
Getgreg, "Jeff Han's Multiple Touch Point Display, the Stuff Dreams are Made of," Aug. 16, 2006, 2 pages, http://www.theyshoulddothat.com2006/08/jeff_hanns_multiple_touch_poin.html>.
Goehl, D., et al., "Motion Sensors Gaining Inertia with Popular Consumer Eiectronics", IvensSense, Inc., 5 pages.
Guan et al., "Zoom Selector: A Pen-based Interaction Technique for Small Target Selection," Transactions of the Information Processing Society of Japan, Aug. 2004, vol. 45, No. 8, pp. 2087-2097, Inf. Process. Soc. Japan, ISSN 0387-5806.
Han, J., "Talks Jeff Han: Unveiling the Genius of Multi-touch Interface Design," Ted Ideas Worth Spreading, Aug. 6, 2006, 1 page, http://www.ted.com/talks/lang/en/jeff_han_demos_his_breakthrough_touchscreen.html.
Hart, K., "'Rewriting the Web for Mobile Phones," washingtonpost.com, Jul. 26, 2006, 2 pages, http://www.washingtonpost.com/wp-dyn/content/article/2006/07/25/AR2006072501517_pf.html.
Hinckley et al., "Sensing Techniques for Mobile Interaction," UIST 2000 Symposium on User Interface Software and Technology, CHI Letters 2 (2), Nov. 2000, San Diego, CA, 10 pages.
Hinckley et al., "Input/Output Devices and interaction Techniques," Microsoft Research, Nov. 2004, 79 pages.
Hinze, C. "Cover Flow—A Beautiful Way to Browse your MP3s," NOISE blog, Feb. 5, 2006, http://noise.typepad.com/noise_blog/2006/02/cover_flow_the_html, downloaded Jan. 24, 2008.
Holmquist, L., "The Zoom Browser Showing Simultaneous Detail and Overview in Large Documents," retrieved Dec. 17, 2007, Human IT, 1998, http://www.hb.se/bhs/ith/3-98/leh.htm.
Karlson et al., "AppLens and LaunchTile: Two Designs for One-handed Thumb Use on Small Devices," CHI 2005 Apr. 2-7, 2005, Portland, OR, 10 pages.
Karlson et al., "AppLens and LaunchTile: Two Designs for One-handed Thumb Use on Small Devices," PowerPoint presentation, CHI 2005 Apr. 2-7, 2005, Portland, OR, 17 pages.
Khella, A. et al., "Pocket PhotoMesa: A Zoomable Image Browser for PDAs," retrieved Dec. 17, 2007, Proceedin, http://delivery.acm.org/10.1145/1060000/1052384/p19-khelia.pdf?key1=1052384&key2=2419987911&co11=GUIDE&d1=GUIDE&CFID=47073625&CFTOKEN=65767142.
Kinoma, Kinoma Player 4 EX Documentation [online], Archived Nov. 1, 2006, 28 pages, http://replay.waybackmachine.org/20061101175306/http://www.kinoma.com/index/pd-player-4.
Laakko et al., "Adapting Web Content to Mobile User Agents," IEEE Internet Computing. vol. 9, Issue 2, Mar./Apr. 2005, 8 pages.
Landragin, F., "The Role of Gesture in Multimodal Referring Actions," Proceedings of the Fourth IEEE International Conference on Multimodal Interfaces, Oct. 2002. 6 pages, http://ieeexplore.iee.org/ie15/8346i/26309/01166988pdf?arnumber=11616988>.
Lie, H., "Cascading Style Sheets," 2005, pp. 243-247, http://people.opera.com/howcome/2006/phd/css.pdf.

Microsoft Word, "Example of scrolling pages in Word 2003," Microsoft Word 2003, 3 pages.

Microwaves RF, "MS Motion Sensors Boost Handset Reliability," http://www.mwrf.com/Articles/Print.cfm?ArticleID=12740, Copyright© 2004, Penton Media, Inc., 4 pages.

Milic-Frayling, N. et al., "Smartview:Enhanced Document Viewer for Mobile Devices," ftp:ftp.research.microsoft.com/pub/tr/tr-2002-114.pdf, retrieved Dec. 17, 2007, Microsoft Technical Report, Nov. 15, 2002, URL, 9 pages.

Milic-Frayling, N. et al., "Smartview: Flexible Viewing of Web Page Contents," The Eleventh International World Wide Web Conference, May 11, 2002, 4 pages, http://www2002.org/CDROM/poster/172/>.

Opera Software, "Download the Opera Mobile™ Browser," Oct. 19, 2006, 5 pages, http://www.opera.com/products/mobile/products/.

Opera Software, "Opera for Mobile, The Full Web Anytime, Anywhere," Jan. 2006, 7 pages, www.opera.com/mobile.

Opera Software, "Opera for S60 Tutorial," Apr. 5, 2006, 5 pages, http://www.opera.com/support/tutorials/260/.

Opera—Press Releases Database, "The New Opera Browser for Series 60 Features Zoom and Password Manager," Nov. 14, 2005, 3 pages, http://press-releases.techwhack.com/1334/1411-opera-browser-features-zoom-and-password.

Opera Software, "Opera for Windows Mobile Srnartphone 2003 Tutorial," Apr. 5, 2005, 4 pages, http://www.opera.com/support/tutorials/winmobile.

Opera Software, "Opera 7.60 for Series 60 Mobile," http://jp.opera.com/support/tutorials/s60/760/O760manual.pdf.

Opera Software, "Opera 8.5 Beta 2 for Windows Mobile, Pocket PC," Apr. 5, 2006, 2 pages, http://www.opera.com/products/mobile/products/winmobileppc.

Opera, "Opera 8.5 for S60 Phones-Get the Full Internet Experience on Your Mobile Phone," Apr. 5, 2006, 3 pages, http://www.symbian-freak.com/news/1105/opera.htm.

palmOne, "Your Mobile Manager," Chapter 2, LifeDrive™ User's Guide, © 2005 palmOne, 23 pages; http://www.palm.com/us/support/handbooks/lifedrive/en/lifedrive_handbook.pdf.

Palme, J. et al,, "MIME Encapsulation of Aggregate Documents, such as HTML" The Internet Society, 1999, 24 pages.

Raman, B. et al., "Application-specific Workload Shaping in Multimedia-enabled Personal Mobile Devices," CODES + ISSS' 06, Oct. 22-25, 2006, Seoul, Korea, Copyright 2006 ACM, 6 pages.

Rohrer, T., "Metaphors We Compute by: Bringing Magic into Interface Design," http://www.uoregon.edu/~uophil/metaphor/gui4web.htm, printed Jun. 13, 2006, 7 pages.

Rose, M., "Music in the Home: Interfaces for Music Appliances," Personal Technologies (2000), 4:45-53.

Roto, V. et al. "Minimap—A Web Page Visualization Method for Mobile Phones," CHI 2006, Nokia Research Center, Apr. 22-27, 2006. 10 pages.

Salmre, I., "Chapter 2, Characteristics of Mobile Applications," Salme_02.fm, pp. 19-36, Dec. 20, 2004.

Schreiner, T., "High DPI in IE: Tip & Mystery Solved," Tony Schreiner's Weblog, May 2004, 2 pages, http://blogs.msdn.com/tonyschr/archive/2004/05/05/126305.aspx.

Stampfli, T., "Exploring Full-Screen Mode in Flash Player 9," Jan. 5, 2007, http://web.archive.org/web20070105231635/http://www.adobe.com/devnet/flashplayer/articles/full_screen_mode.html.

Stanek, W. et al., "Chapter 9, Video and Animation Plug-Ins," Web Publishing Professional Reference Edition, copyright 1997 by Sams.net Publishing, http://www.ssuet.edu.pk/taimoor/books/1-57521-198-X/index.htm.

Stanek, W. et al., "Chapter 22, Adding Multimedia to Your Web Site," Web Publishing Professional Reference Edition, copyright 1997 by Sams.net Publishing, http://www.ssuet.edu.pk/taimoor/books/1-57521-198-X/index.htm.

Surfin'Safari, "XUL," 7 pages, Oct. 2003, http://weblogs.mozillazine.org/hyatt/archives/2003_10.html.

Tidwell, J., "Animated Transition," from Designing Interfaces, O'Reilly Media, Inc., Nov. 2005, pp. 84-85.

Versiontracker, "Photogather—7.2.6. Hi-res Image Viewer & Editor for Palm," printed Jun. 12, 2006, 5 pages, http://www.versiontracker.com/dyn/moreinfo/palm/4624.

w3schools.com, "Multimedia Video Formats," www.w3sschools.com/media/media_videoformats.asp?output=print, Dec. 20, 2006, 2 pages.

w3schools.com, "Playing QuickTime Movies," http://www.w3schools.com/media/media_quicktime.asp?output=print, Dec. 21, 2006, 2 pages.

w3schools.com, "Playing Videos on the Web," www.w3schools.com/media/media_browservideos.asp?out=print, Dec. 20, 2006, 3 pages.

Wave Technologies, "Certified Internet Webmaster Foundations Study Guide," Wave Technologies International, Inc, a Thomson Learning company, copyright 1988-2000, 88 pages.

Warabino, T. et al., "Video Transcoding Proxy for 3Gwireless Mobile Internet Access," IEEE Communications Magazine, vol. 38, Issue 10, Oct. 2000, 6 pages.

weblogs, "Chapter 1: Downloading and Building WebCore," WebCore documentation; 2 pages, http://weblogs.mozillazine.org/hyatt/WebCore/chapter1.html, Aug. 4, 2006.

weblogs, "Chapter 2: An Overview of WebCore," WebCore documentation, 3 pages, http://weblogs.mozillazine.org/hyatt/WebCore/chapter2.html, Aug. 4, 2006 webmasterworld.com, "Page Zooming with IE," webmasterworld.com, Jul. 2004, 7 pages, http://www.webmasterworld.com/forum83/4179.htm.

Wikipedia, "History of YouTube," 2004-2009, downloaded Mar. 15, 2011, 4 pages, http://en.wikipedia.org/wiki/History_of_YouTube.

Williams, M., "LG's Cell Phone Can Pause Live TV," PC World, Oct. 11, 2005, 2 pages.

Wobbrock, J. et al., "WebThumb: Interaction Techniques for Small-Screen Browsers," UIST'02, Oct. 27-30, 2002, Paris France, 4 pages.

Mao, X. et al., "Slicing*-Tree Based Web Page Transformation for Small Displays," CIKM'05, Oct. 31-Nov. 5, 2005, Bremen, Germany, 2 pages.

Yin, X. et al., "Using Link Analysis to Improve Layout on Mobile Devices," WWW2004, May 17-22, 2004, 7 pages, http://www.iw3c2.org/WWW2004/docs/1p338.pdf.

YouTube, "Broadcast Yourself," 2 pages, www.youtube.com, Nov. 1, 2005.

YouTube, "Broadcasting Ourselves;)," Nov. 15, 2005, 5 pages, http://youtube-global.blogspot.com/2005_11_01_archive.html.

International Search Report and Written Opinion dated Jan. 15, 2008; received in International Application No. PCT/US2007/077773, which corresponds to U.S. Appl. No. 11/850,638, 13 pages (Ording).

International Search Report and Written Opinion dated Jun. 5, 2008, received in International Application No. PCT/US2008/050428, which corresponds to U.S. Appl. No. 11/969,800, 17 pages (Forstall).

Office Action dated Oct. 26, 2010, received in U.S. Appl. No. 11/850,638 (Ording).

Final Office Action dated Feb. 8, 2011, received in U.S. Appl. No. 11/850,638 (Ording).

Office Action dated Jan. 17, 2012, received in U.S. Appl. No. 11/850,638, 24 pages (Ording).

Final Office Action dated May 15, 2012, received in U.S. Appl. No. 11/850,638, 18 pages (Ording)

Office Action dated Jul. 2, 2009, received in Australian Patent Application No. 2007289019, which corresponds to U.S. Appl. No. 11/850,638 (Ording).

Office Action dated Oct. 7, 2009, received in Australian Patent Application 2007289019, which corresponds to U.S. Appl. No. 11/850,638 (Ording).

Office Action dated Jan. 15, 2010, received in Chinese Application for Invention No. 200780001140.9, which corresponds to U.S. Appl. No, 11/850,638 (Ording).

Office Action dated Jun. 10, 2011, received in Chinese Patent Application No. 200780001140.9, which corresponds to U.S. Appl. No. 11/850,638 (Ording).

Decision to Grant dated Feb. 3, 2012, received in Chinese Patent Application No. ZL200780001140.9, which corresponds to U.S. Appl. No. 11/850,638, 4 pages (Ording).

Examination report dated Feb. 23, 2012, received in European Patent Application No. 07841980.1, which corresponds to U.S. Appl. No. 11/850,638, 5 pages (Ording).

Office Action dated Jul. 12, 2011, received in Japanese Patent Application No. 2009-527566, which corresponds to U.S. Appl. No. 11/850,638 (Ording).

Office Action dated Nov. 12, 2010, received in Korean Patent Application No. 10 2009 7007067, which corresponds to U.S. Appl. No. 11/850,638 (Ording).

Notice of Final Rejection dated Aug. 30, 2011, reveived in Korean Patent Application No. 10-2009-7007067, which corresponds to U.S. Appl. No. 11/850,638 (Ording).

Notice of Allowance dated Dec. 1, 2011, received in Korean Patent Application No. 10 2009 7007067, which corresponds to U.S. Appl. No. 11/850,638, 4 pages (Ording).

Office Action dated Feb. 16, 2011, received in U.S. Appl. No. 11/969,800.

Final Office Action dated Jun. 15, 2011, received in U.S. Appl. No. 11/969,800, 25 pages (Forstall).

Office Action dated Jan. 20, 2012, received in U.S. Appl. No. 11/969,800, 26 pages (Forstall).

Office Action dated May 22, 2012, received in U.S. Appl. No. 11/969,800, 53 pages (Forstall).

\* cited by examiner

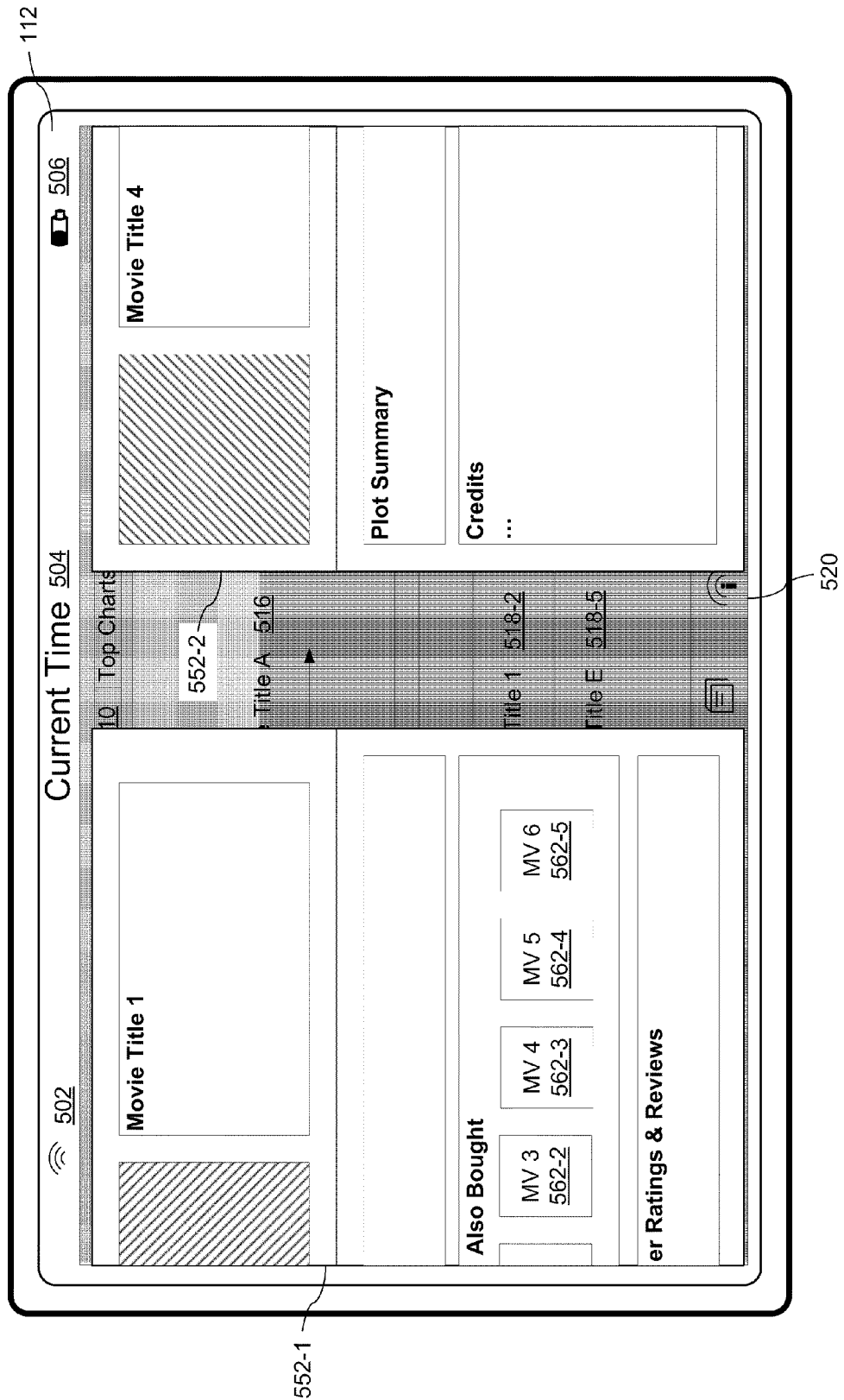

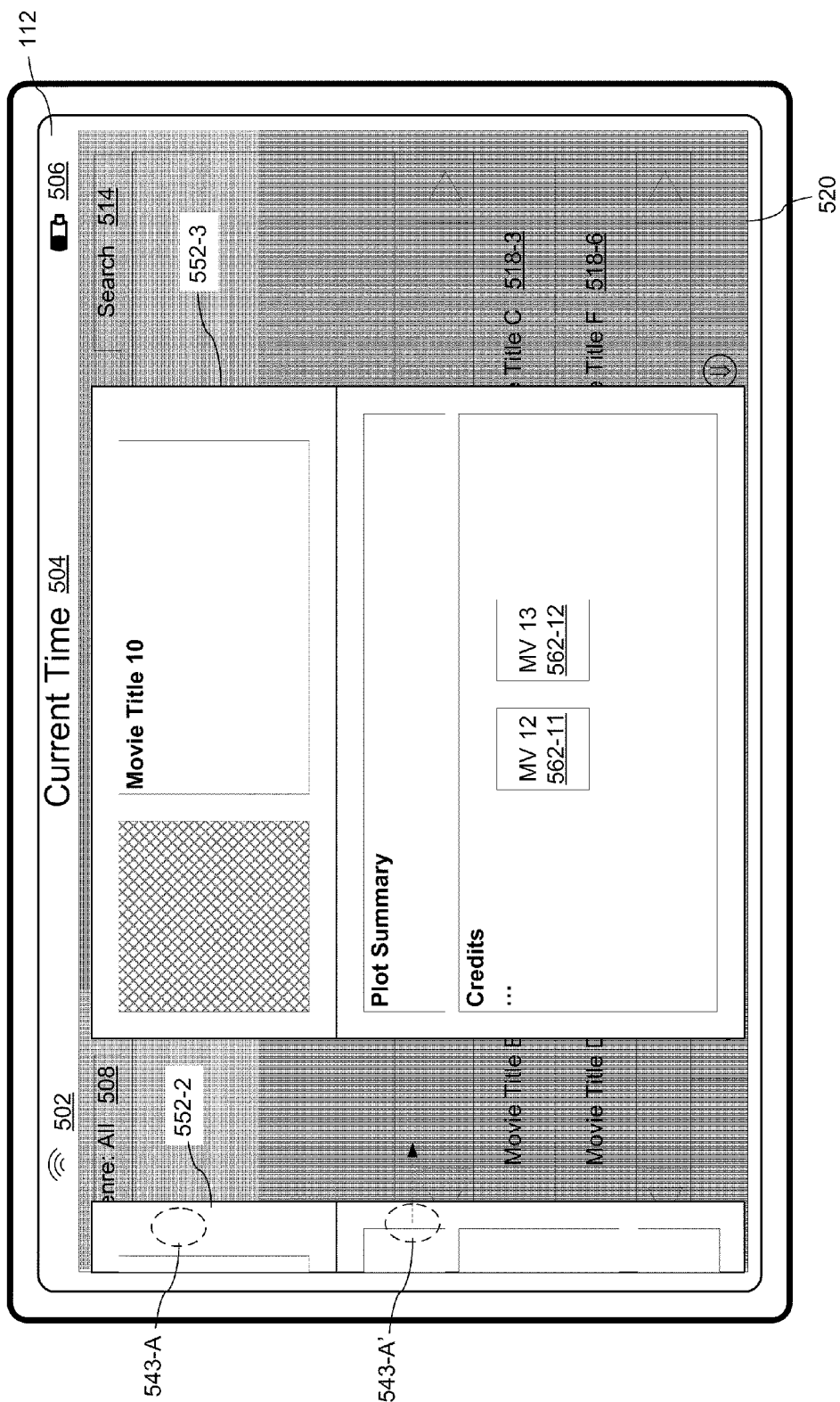
Figure 5AAA

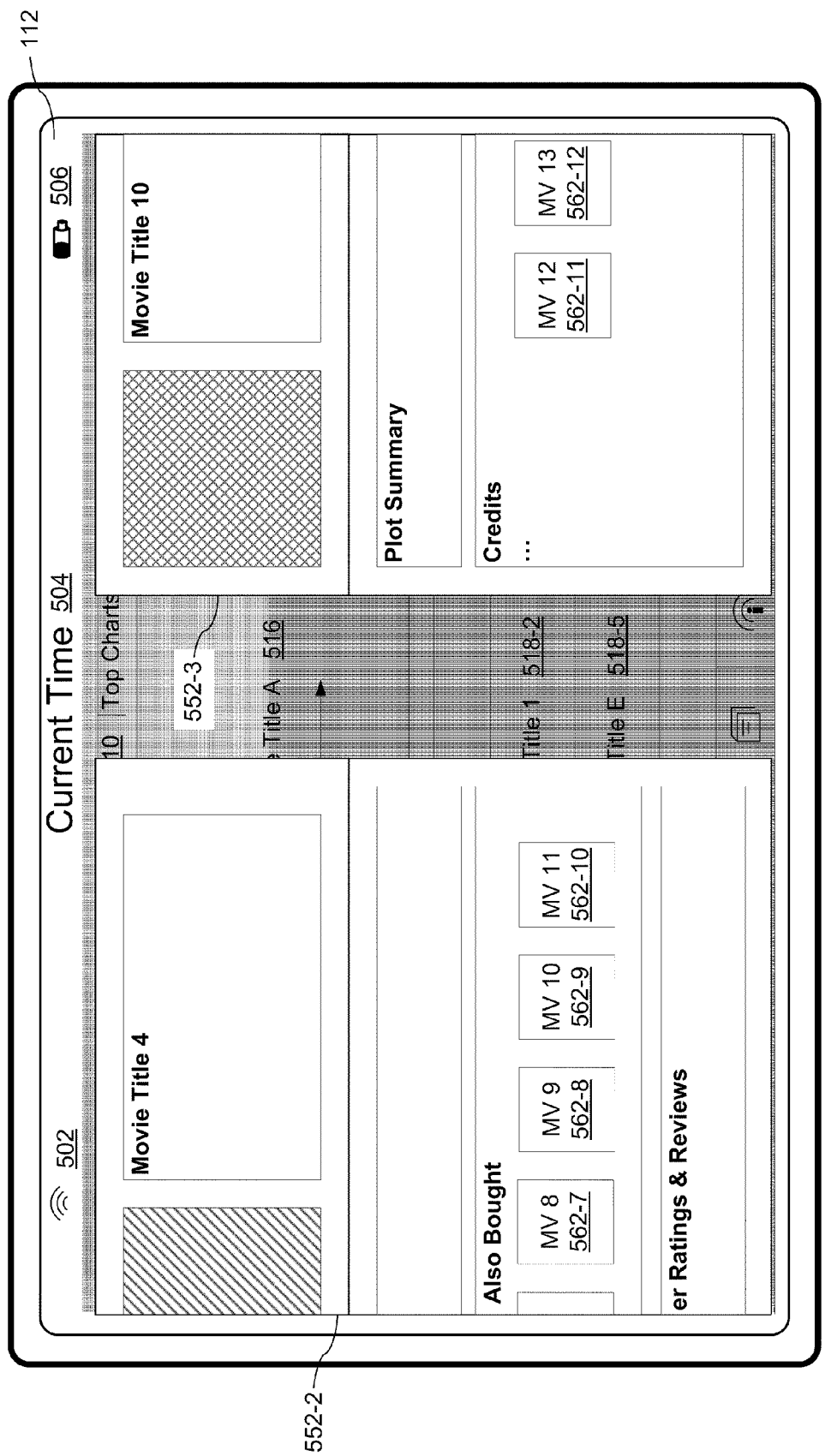
Figure 5BBB

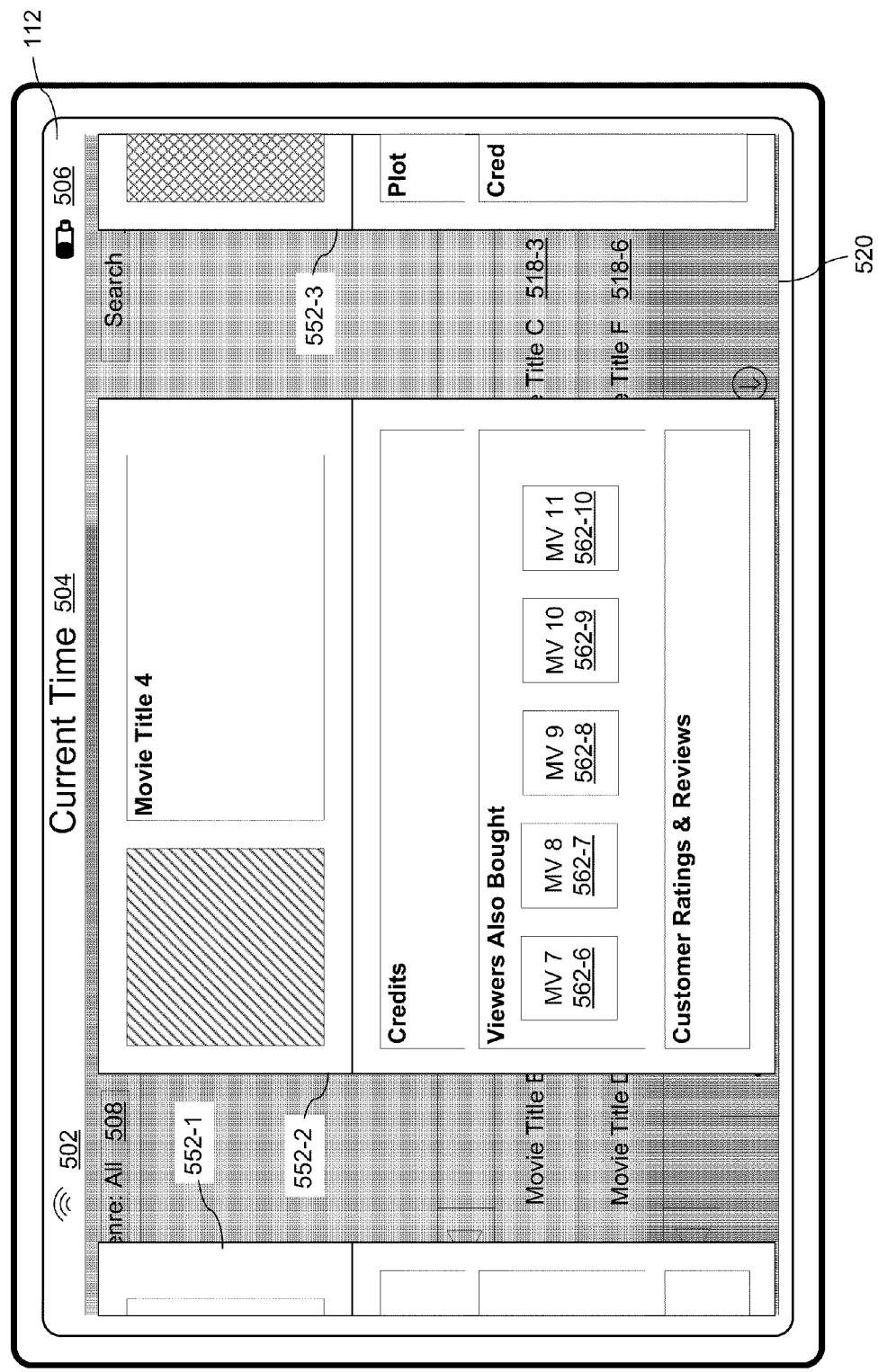
Figure 5CCC

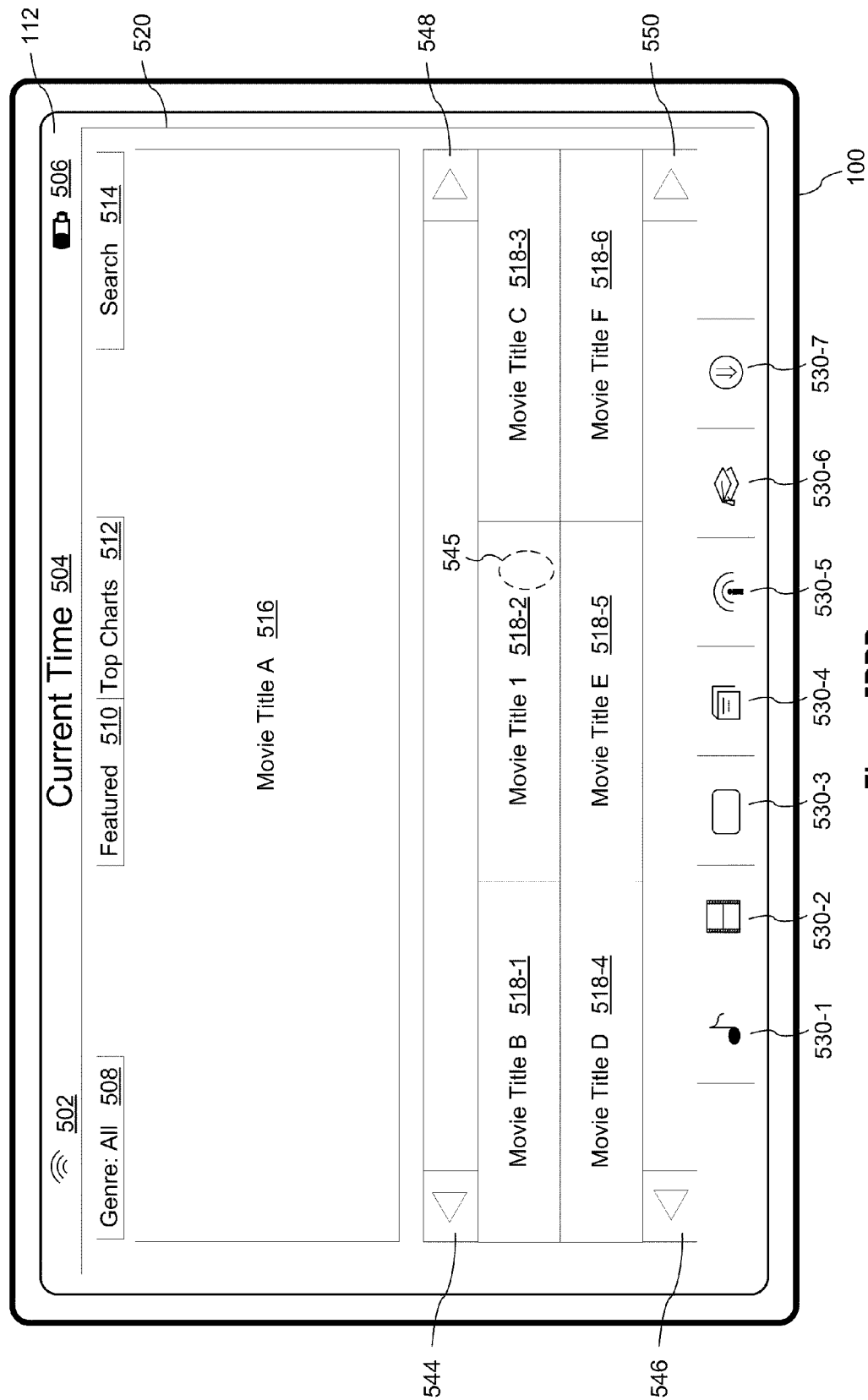
Figure 5DDD

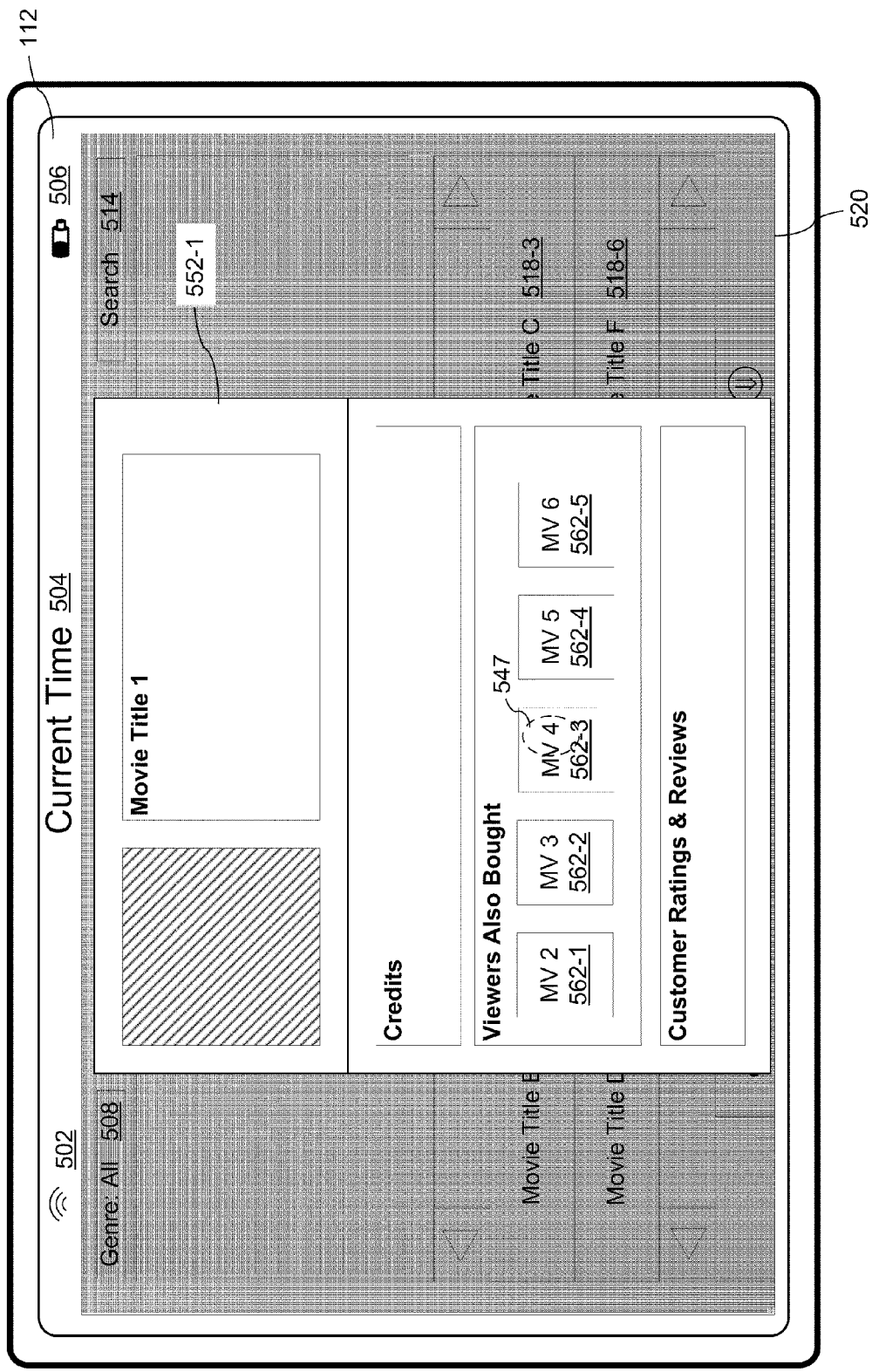
Figure 5EEE

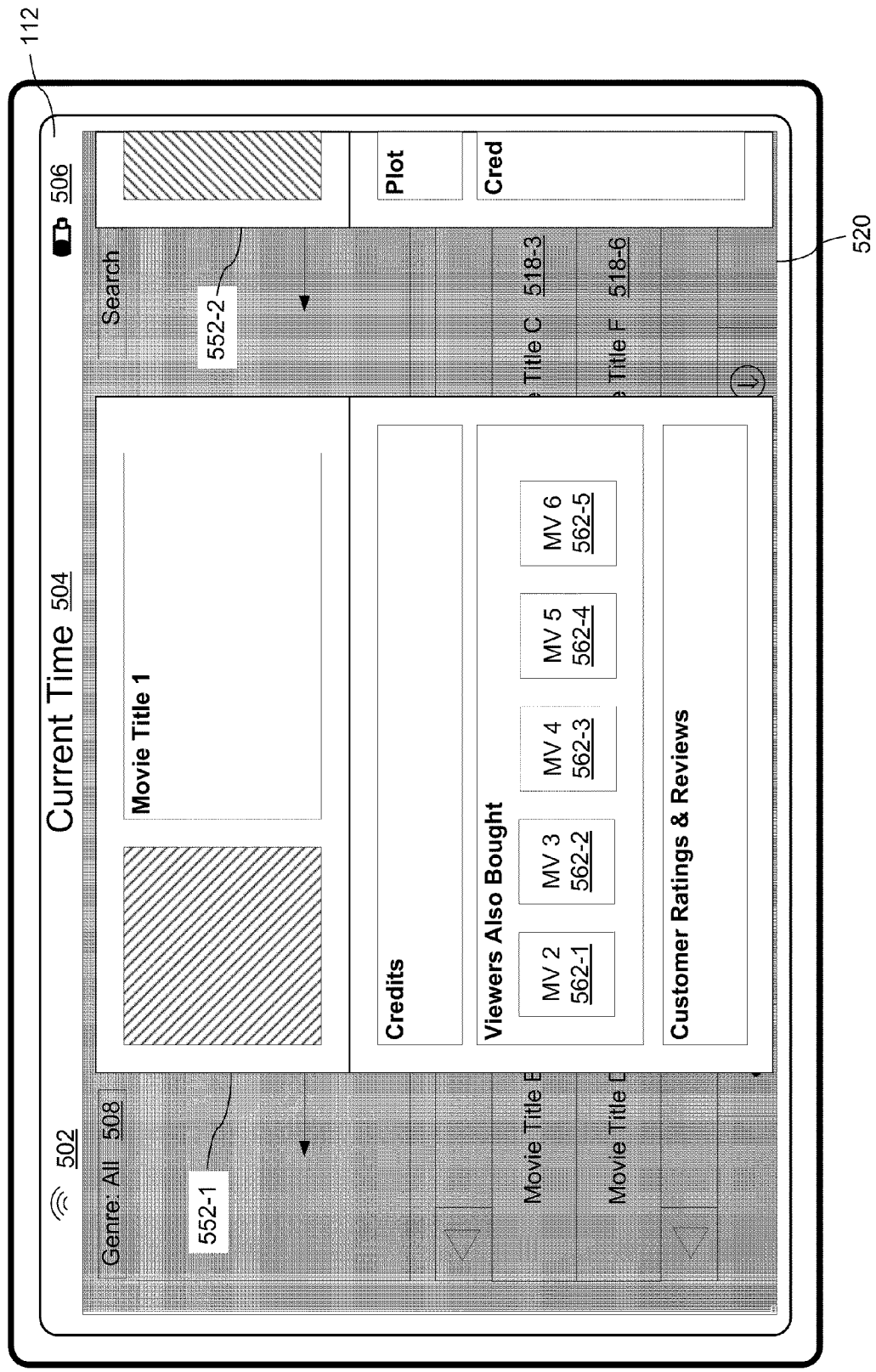
Figure 5FFF

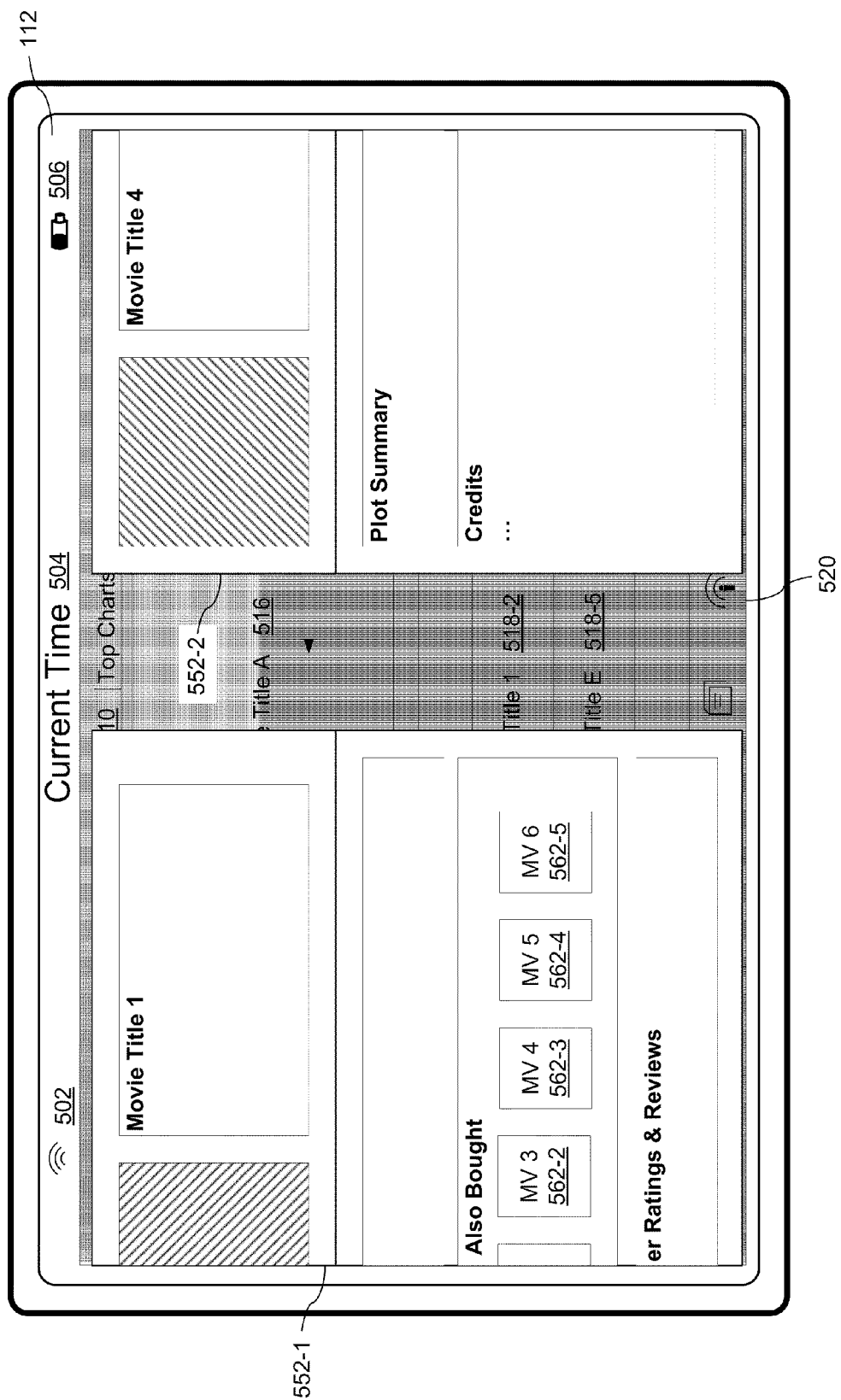
Figure 5GGG

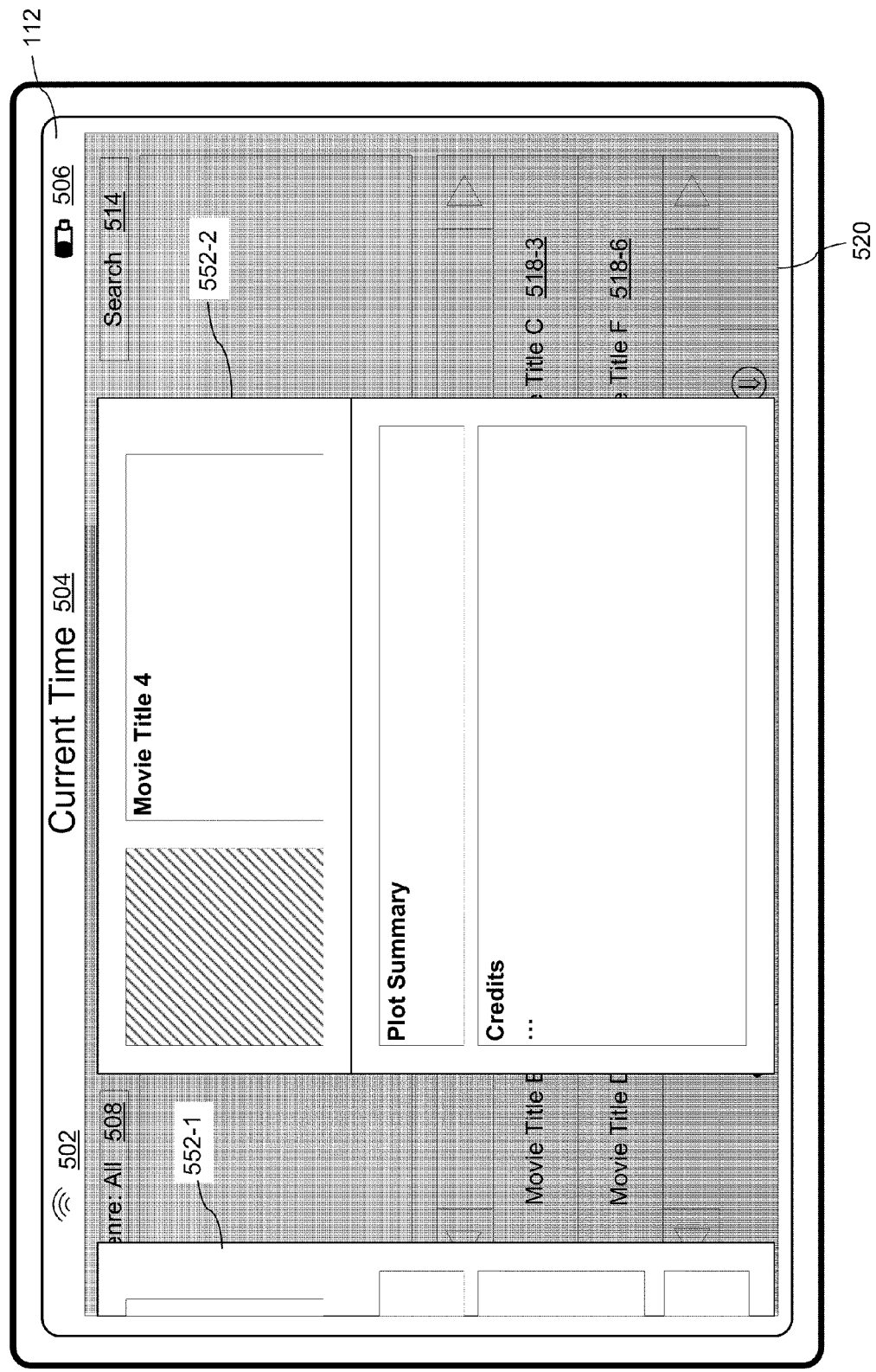
Figure 5HHH

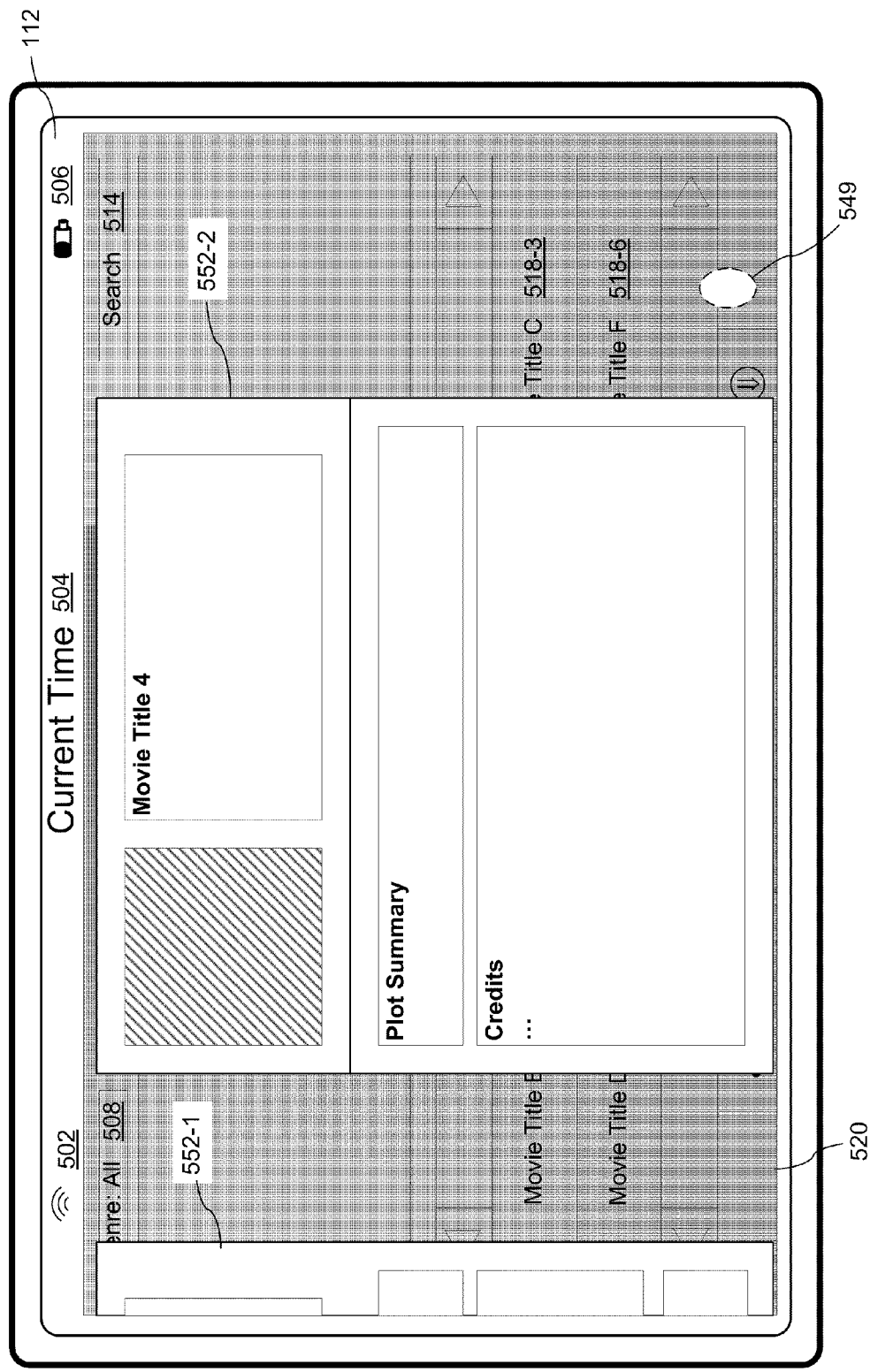
Figure 5III

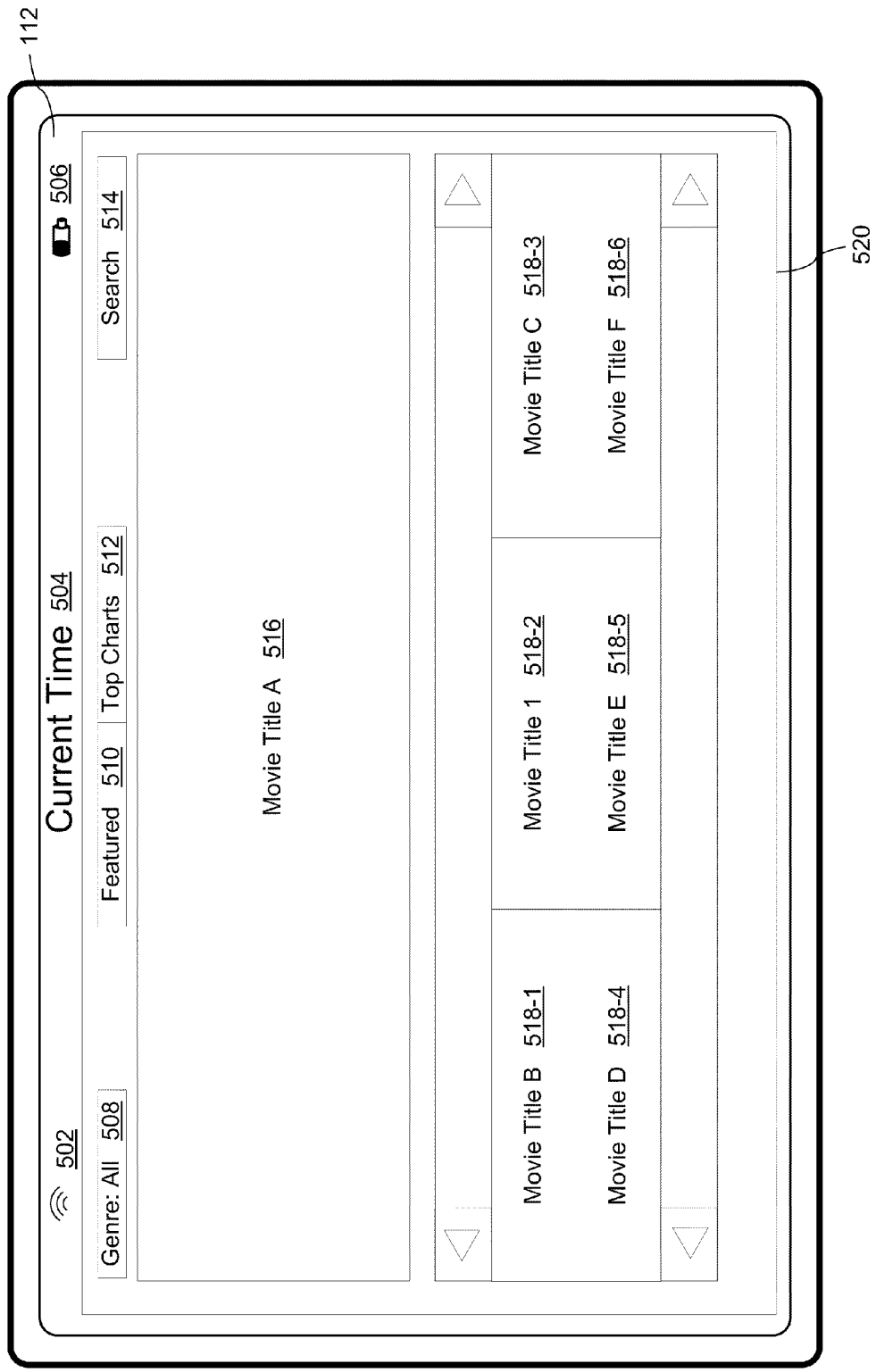
Figure 5JJJ

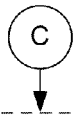

While displaying the third viewing area and the portion of the second viewing area:
    detect activation of an object in the third plurality of selectable objects; and,
    in response to detecting activation of the object in the third plurality of selectable objects:
        overlay a fourth viewing area on a portion of the first viewing area; the fourth viewing area includes a fourth plurality of selectable objects;
        move the third viewing area such that a portion of the third viewing area moves off the display and a portion of the third viewing area remains on the display overlaid on a portion of the first viewing area;
        cease to display the second viewing area; and
        maintain display of a remaining portion of the first viewing area.

— 626

While displaying the fourth viewing area and the portion of the third viewing area:
    detect a gesture at a location on the touch-sensitive surface that corresponds to the remaining portion of the first viewing area; and,
    in response to detecting the gesture at the location on the touch-sensitive surface that corresponds to the remaining portion of the first viewing area:
        close the fourth viewing area and the third viewing area; and
        display the entire first viewing area.

— 628

While displaying the fourth viewing area and the portion of the third viewing area:
    detect a gesture at a location on the touch-sensitive surface that corresponds to the portion of the third viewing area; and,
    in response to detecting the gesture at the location on the touch-sensitive surface that corresponds to the portion of the third viewing area:
        cease to display the fourth viewing area;
        move the third viewing area such that the entire third viewing area is redisplayed; and
        maintain display of a remaining portion of the first viewing area.

— 630

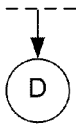

Figure 6D

DEVICE, METHOD, AND GRAPHICAL USER INTERFACE FOR NAVIGATING THROUGH MULTIPLE VIEWING AREAS

RELATED APPLICATIONS

This application claims priority to U.S. Provisional Application Ser. No. 61/292,785, filed Jan. 6, 2010, entitled "Device, Method, and Graphical User Interface for Navigating Through Multiple Viewing Areas," which is incorporated herein by reference in its entirety.

TECHNICAL FIELD

This relates generally to electronic information devices, including but not limited to electronic information devices that navigate through multiple windows or other viewing areas.

BACKGROUND

The use of viewing areas (e.g., windows) to display information in graphical user interfaces has become pervasive. Users often need to navigate through multiple viewing areas to search for information in volumes of data. In some applications, a user may find certain content and then need to navigate through additional viewing areas to search for related information. A user may need to perform these tasks in many different applications, such as a web browser (e.g., Safari from Apple Inc. of Cupertino, Calif.) or a digital content (e.g., videos and music) management application (e.g., iTunes from Apple Inc. of Cupertino, Calif.).

But existing methods for navigating through multiple viewing areas are cumbersome and inefficient. For example, using a conventional web browser to navigate through multiple viewing areas is tedious and creates a significant cognitive burden on a user. In particular, it is well known that people have limited short-term memory and working memory (e.g., see M. Daneman and P. Carpenter, "Individual differences in working memory and reading" *Journal of Verbal Learning & Verbal Behavior*, 19(4): 450-66 (1980); G. A. Miller, "The magical number seven, plus or minus two: Some limits on our capacity for processing information", *Psychological Review*, 63, 81-97 (1956)). Because of this limited memory capacity, users can easily lose track of where they are in the course of a search or where they started the search while navigating through multiple views. This problem can reduce user efficiency and productivity.

In addition, existing methods for navigating through multiple viewing areas take longer than necessary, thereby wasting energy. This latter consideration is particularly important in battery-operated devices.

SUMMARY

Accordingly, there is a need for devices with more efficient methods and interfaces for navigating through multiple viewing areas in response to user inputs (e.g., via a keyboard, a mouse, a track pad or touch-sensitive display). Such methods and interfaces may complement or replace conventional methods for navigating through multiple viewing areas. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes displaying a first viewing area. The first viewing area includes a first plurality of selectable objects. The method also includes: detecting activation of an object in the first plurality of selectable objects; and, in response to detecting activation of the object in the first plurality of selectable objects, overlaying a second viewing area on a portion of the first viewing area while maintaining display of a remaining portion of the first viewing area. The second viewing area includes a second plurality of selectable objects. The method also includes: detecting activation of an object in the second plurality of selectable objects; and, in response to detecting activation of the object in the second plurality of selectable objects, overlaying a third viewing area on a portion of the first viewing area. The third viewing area includes a third plurality of selectable objects. The method further includes, in response to detecting activation of the object in the second plurality of selectable objects: displaying a portion of the second viewing area overlaid on a portion of the first viewing area; and maintaining display of a remaining portion of the first viewing area.

In accordance with some embodiments, a method is performed at a multifunction device with a display and a touch-sensitive surface. The method includes displaying a first viewing area. The first viewing area includes a first plurality of selectable objects. The method also includes: detecting activation of an object in the first plurality of selectable objects; and, in response to detecting activation of the object in the first plurality of selectable objects, overlaying a second viewing area on a portion of the first viewing area while maintaining display of a remaining portion of the first viewing area. The second viewing area includes a second plurality of selectable objects. The method also includes: detecting activation of an object in the second plurality of selectable objects; and, in response to detecting activation of the object in the second plurality of selectable objects, overlaying a third viewing area on a portion of the first viewing area. The third viewing area includes a third plurality of selectable objects. The method further includes, in response to detecting activation of the object in the second plurality of selectable objects, maintaining display of a remaining portion of the first viewing area. The method further includes, while displaying the third viewing area: detecting a gesture at a location on the touch-sensitive surface that corresponds to the remaining portion of the first viewing area; and, in response to detecting the gesture at the location on the touch-sensitive surface that corresponds to the remaining portion of the first viewing area: closing the second viewing area and the third viewing area; and displaying the entire first viewing area.

In accordance with some embodiments, a method is performed at a multifunction device with a display and a touch-sensitive surface. The method includes displaying a first viewing area. The first viewing area includes a first plurality of selectable objects. The method also includes detecting activations of a plurality of selectable objects in a plurality of viewing areas; and, in response to detecting activation of a respective selectable object in a respective viewing area, overlaying another viewing area that corresponds to the respective selectable object on a portion of the first viewing area and maintaining display of a remaining portion of the first viewing area. The method further includes: detecting a gesture at a location on the touch-sensitive surface that corresponds to the remaining portion of the first viewing area; and, in response to detecting the gesture at the location on the touch-sensitive surface that corresponds to the remaining portion of the first viewing area, closing all viewing areas overlaid on the first viewing area and displaying the entire first viewing area.

In accordance with some embodiments, a multifunction device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a display and a touch-sensitive surface, cause the device to perform the operations of any of the methods described above. In accordance with some embodiments, a multifunction device includes: a display; a touch-sensitive surface; and means for performing the operations of any of the methods described above. In accordance with some embodiments, an information processing apparatus, for use in a multifunction device with a display and a touch-sensitive surface, includes means for performing the operations of any of the methods described above.

Thus, multifunction devices with displays and touch-sensitive surfaces are provided with faster, more efficient methods and interfaces for navigating through multiple viewing areas, thereby increasing the effectiveness, efficiency, and user satisfaction with such devices. Such methods and interfaces may complement or replace conventional methods for navigating through multiple viewing areas.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6E are flow diagrams illustrating a method of navigating through multiple viewing areas in accordance with some embodiments.

DESCRIPTION OF EMBODIMENTS

Figure 1A:
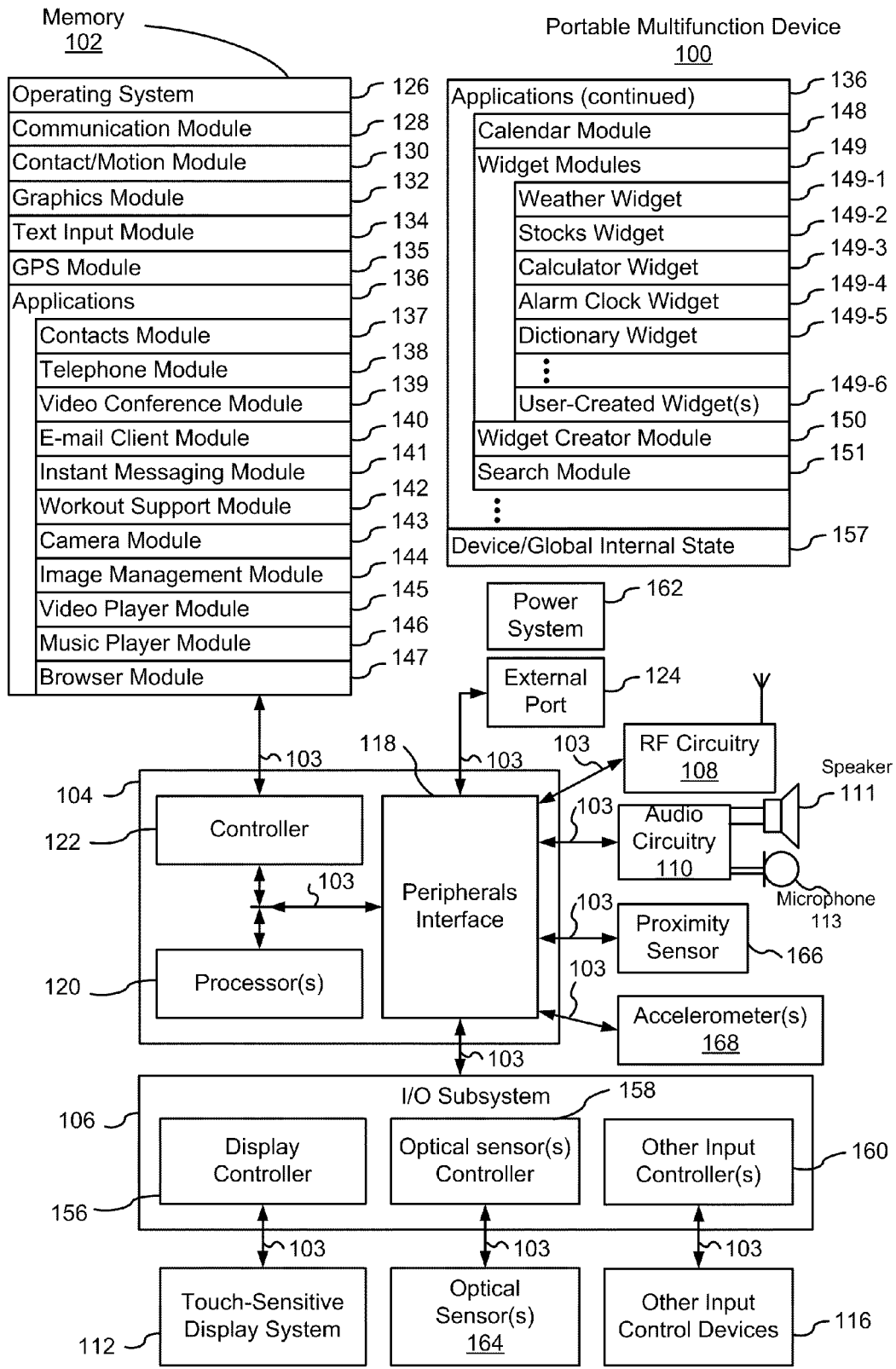
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browser application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
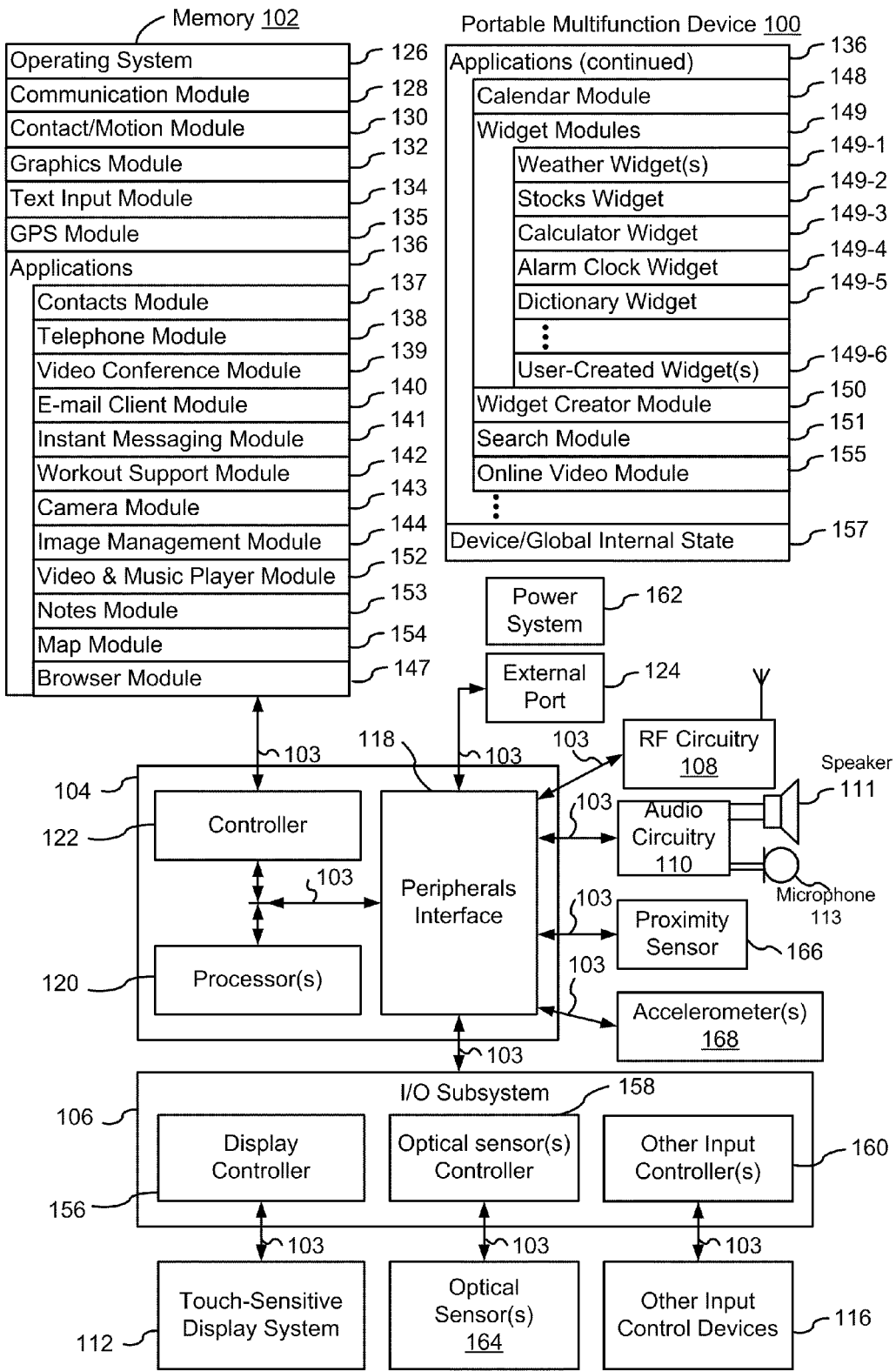

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a resolution in excess of 100 dpi. In an exemplary embodiment, the touch screen has a resolution of approximately 160 dpi. The user may make contact with touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

Figure 3:
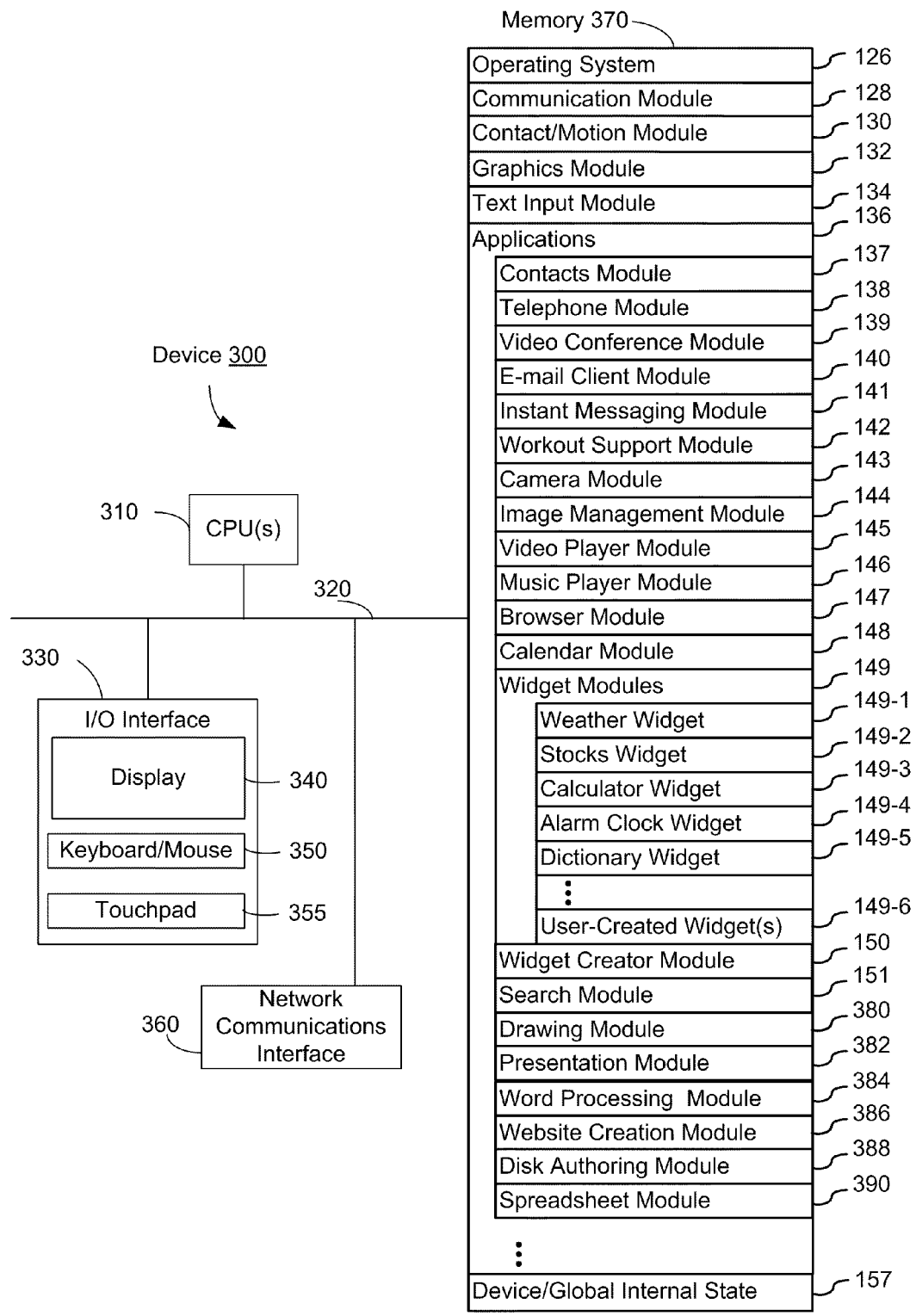
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
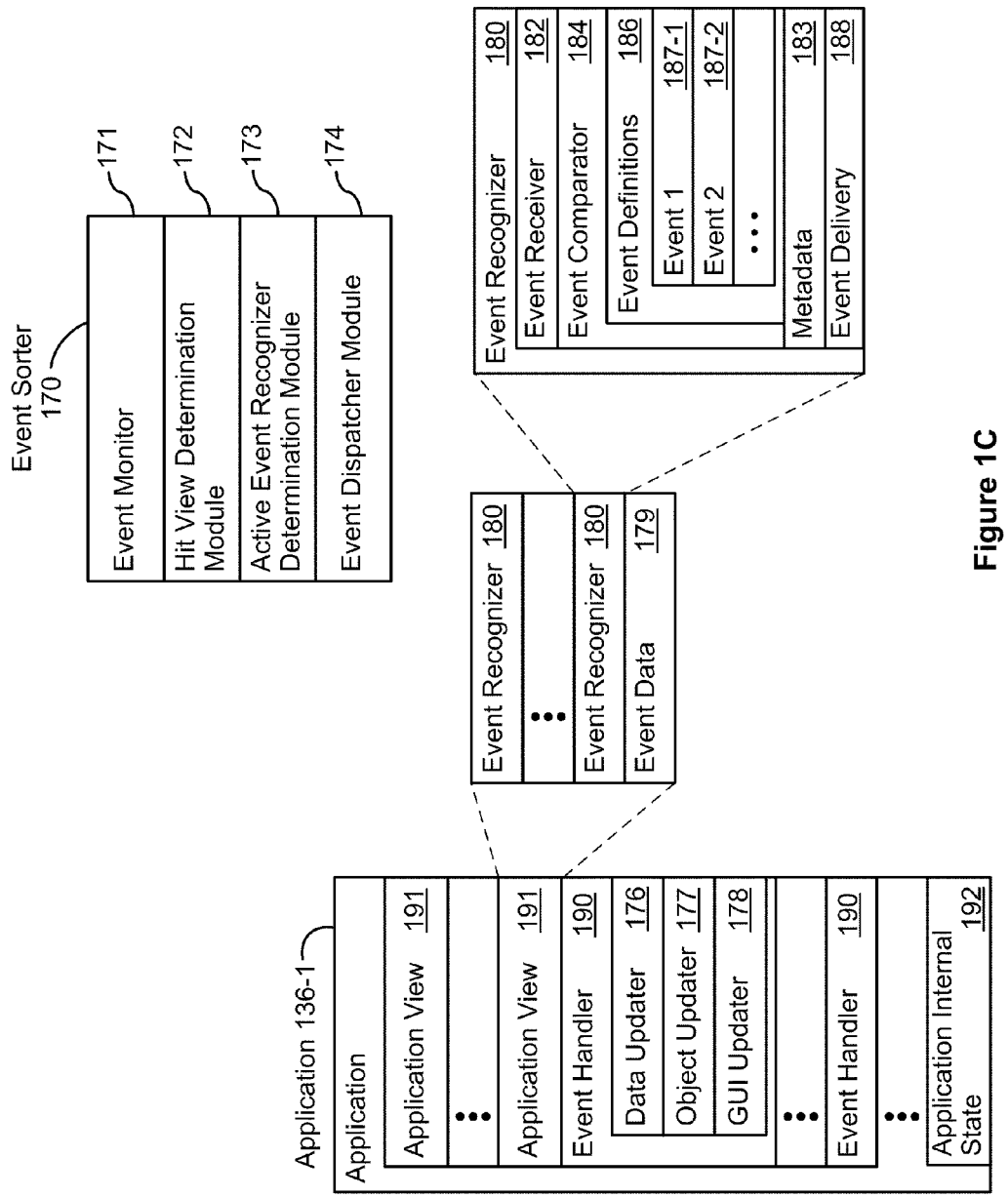
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
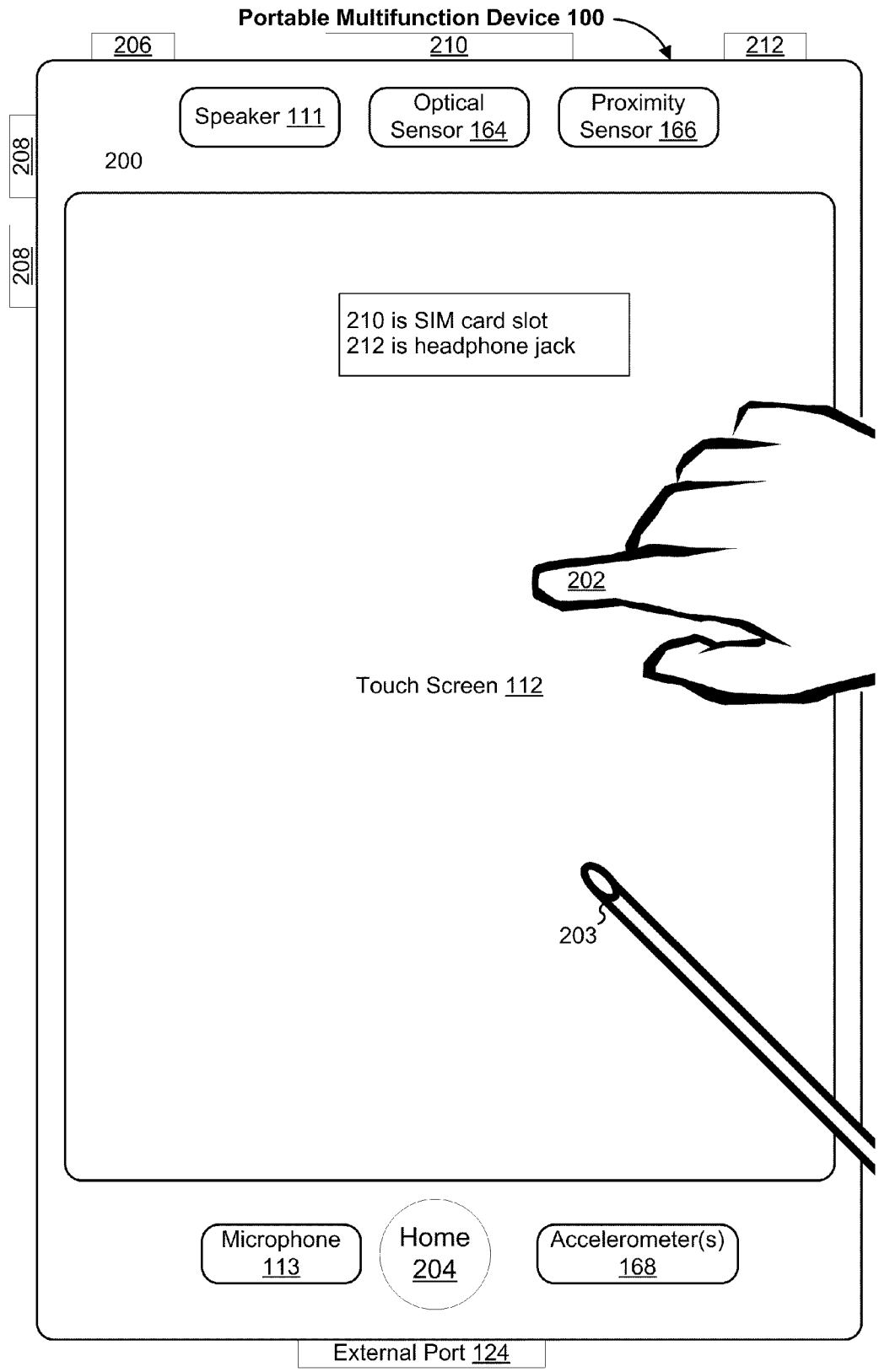
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
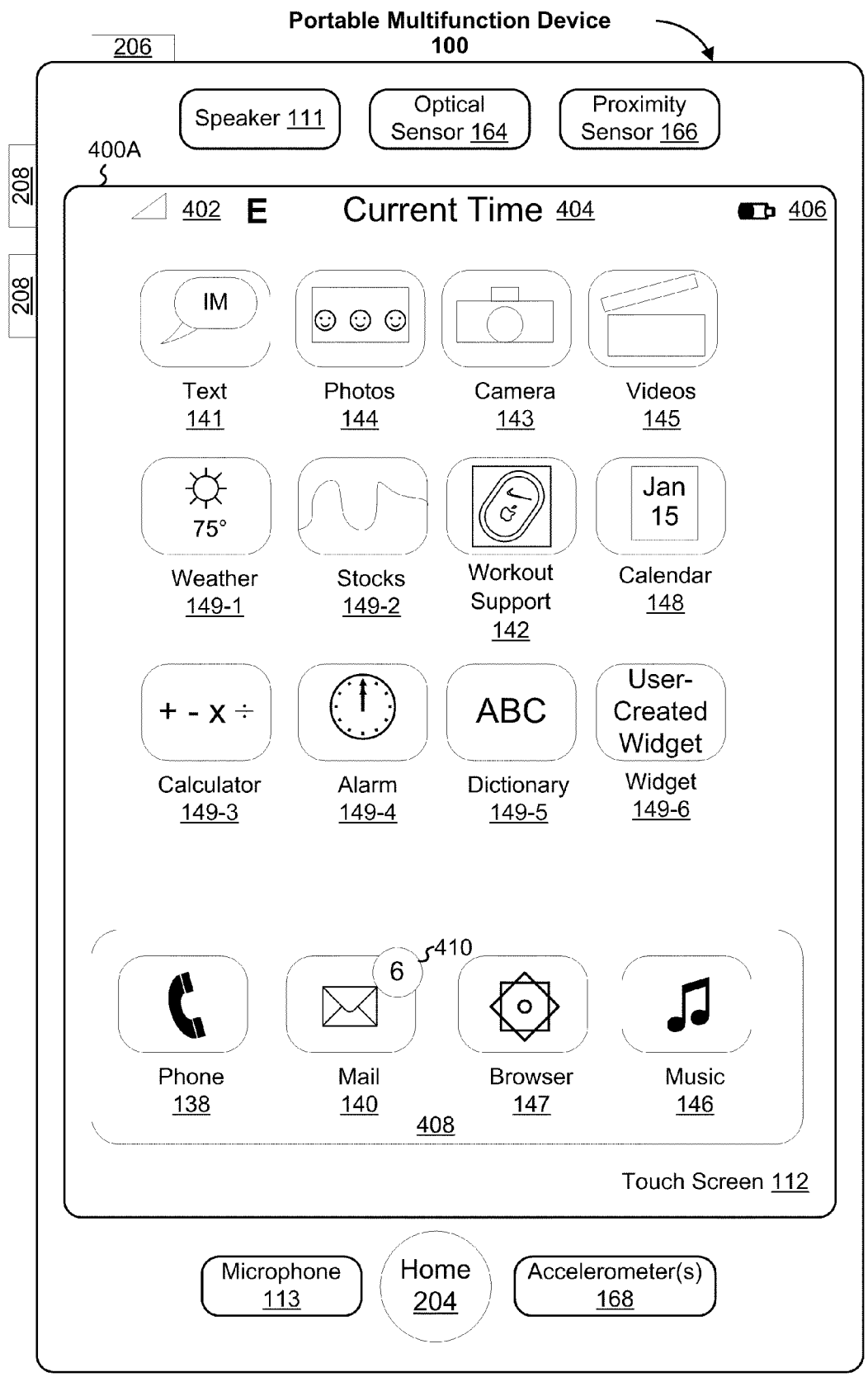
FIGS. 4A and 4B illustrate exemplary user interfaces for a menu of applications on a portable multifunction device in accordance with some embodiments.
Figure 4B:
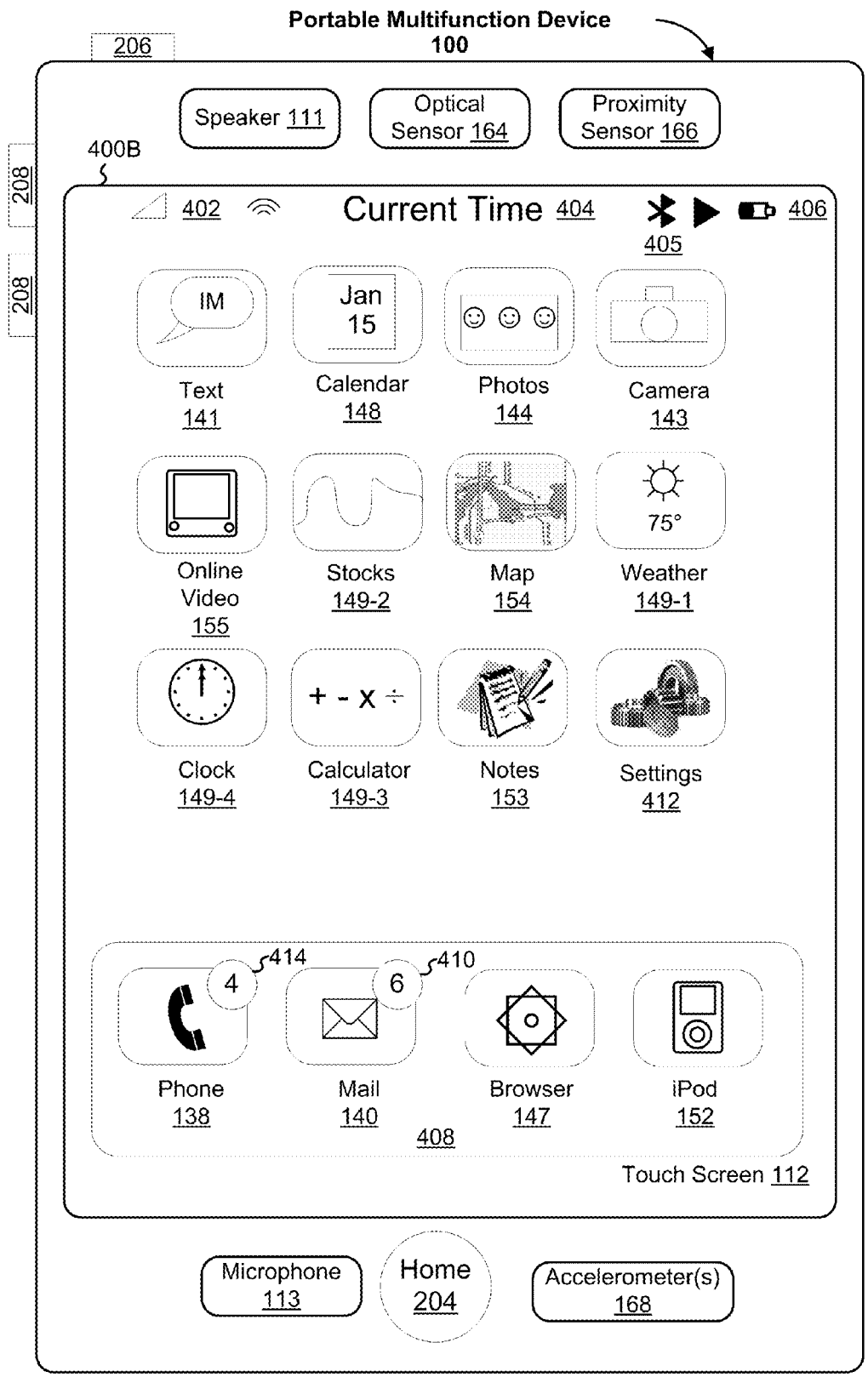

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
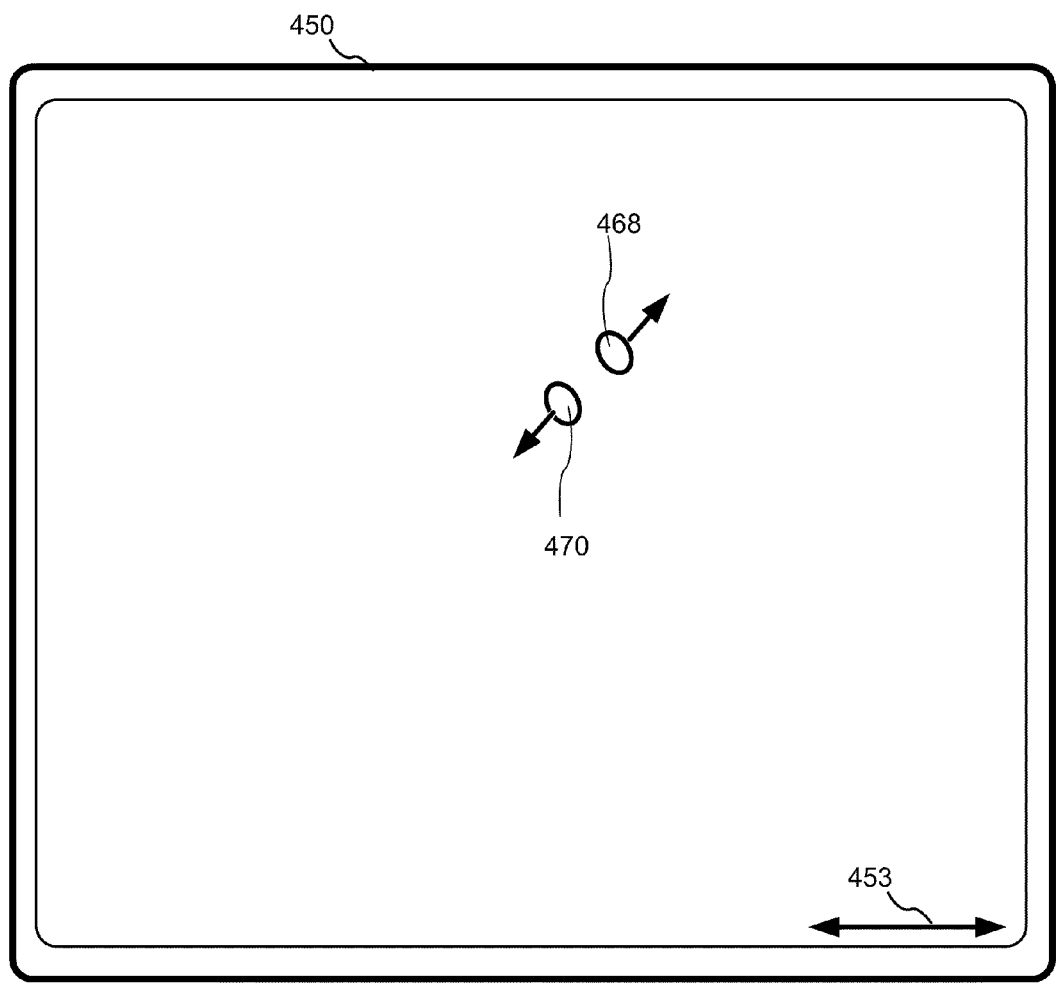
FIG. 4C illustrates an exemplary user interface for a multifunction device with a touch-sensitive surface that is separate from the display in accordance with some embodiments.
Figure 4C:
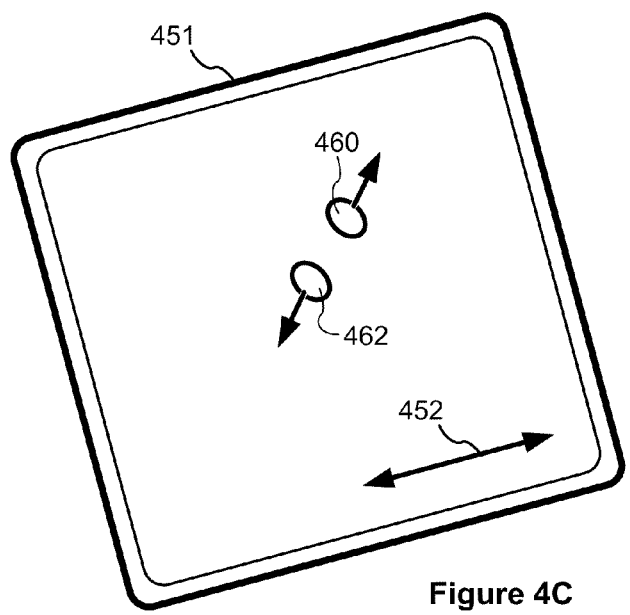

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a keyboard and finger contacts may be used simultaneously.

In the descriptions provided below, the term "contact" (except when used to describe an entry in a contact list, address book or the like) is used as a short hand term for "touch gesture," and thus each contact mentioned or described below may be any suitable touch gesture detected by a sensor (or set of sensors) of a touch-sensitive display or other touch-sensitive surface. Similarly, each "finger tap" mentioned or described below may be any suitable touch gesture. Furthermore, in some embodiments, "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

Attention is now directed towards embodiments of user interfaces ("UI") and associated processes that may be implemented on a multifunction device with a display and a touch-sensitive surface, such as device 300 or portable multifunction device 100.

While the following user interfaces are illustrated primarily for a digital content management application (e.g., iTunes), it should be understood that analogous user interfaces can be implemented in other applications that include, or can benefit from, multiple viewing areas. For example, such applications include: a web browser (e.g., Safari); a file management program (e.g., Finder from Apple Inc. of Cupertino, Calif.); an image management application (e.g., Aperture or iPhoto from Apple Inc. of Cupertino, Calif.); a presentation application (e.g., Keynote from Apple Inc. of Cupertino, Calif.); or an electronic document reader application (e.g., a portable document format (PDF) file reader).

FIGS. 5A-5JJJ illustrate exemplary user interfaces for navigating through multiple viewing areas in accordance with some embodiments. The user interfaces in these figures are used to illustrate the processes described below, including the processes in FIGS. 6A-6E, 7, and 8.

In FIGS. 5A-5JJJ, some finger contact movement sizes may be exaggerated for illustrative purposes. No depiction in the figures bearing on finger contact movements should be taken as a requirement or limitation for the purpose of understanding sizes and scale associated with the method and devices disclosed herein.

Figure 5A:
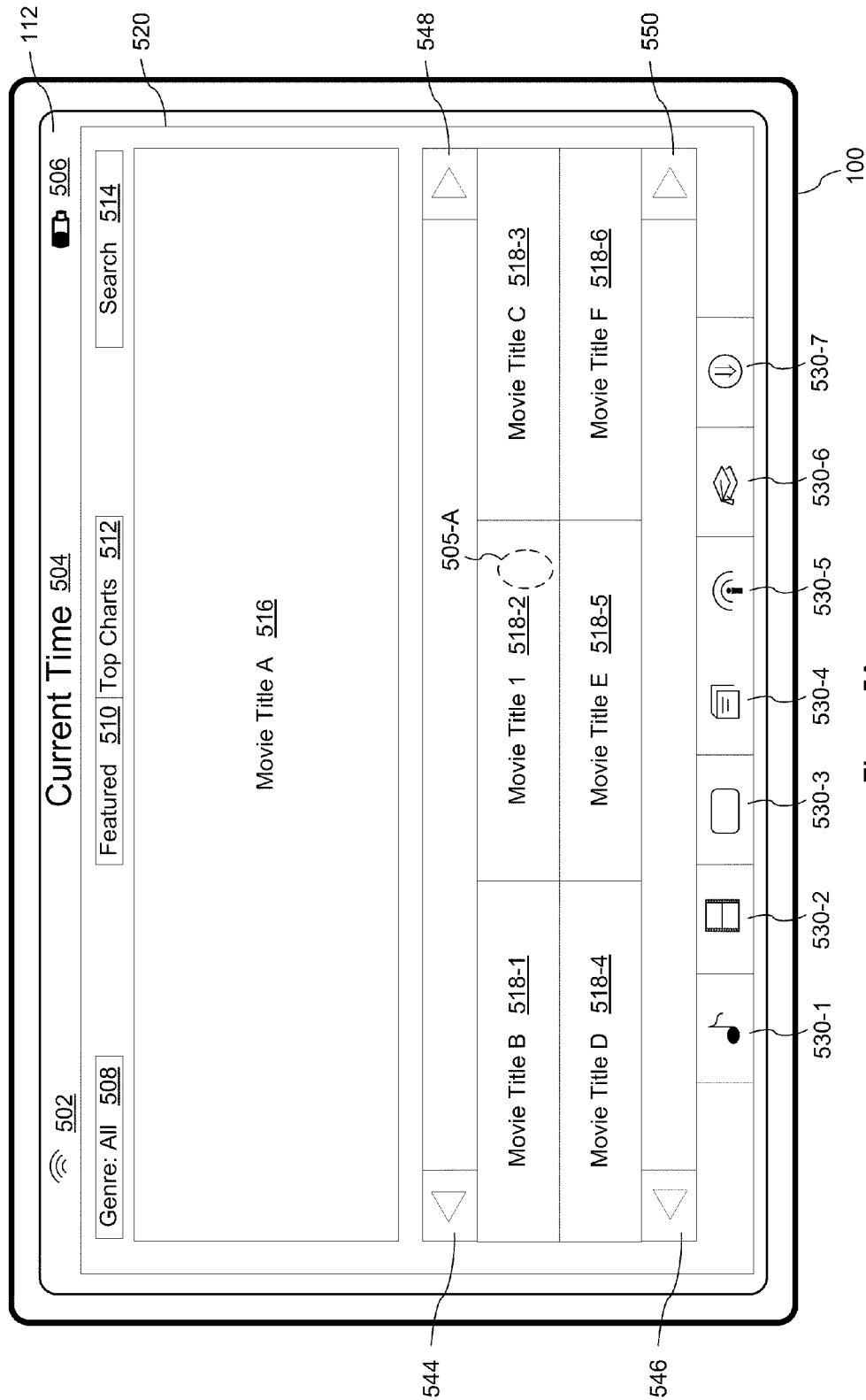
FIGS. 5A-5JJJ illustrate exemplary user interfaces for navigating through multiple viewing areas in accordance with some embodiments.

FIG. 5A depicts an exemplary user interface displaying first viewing area 520 for a digital content management application (e.g., iTunes; digital content management application 390 in FIG. 3) on touch screen 112 of multifunction device 100. In this example, first viewing area 520 includes an online multimedia store for movies. First viewing area 520 may include the following elements, or a subset or superset thereof:

- genre menu 508 that when activated (e.g., by a finger tap on the icon) initiates the display of menu items for respective genre of multimedia content (e.g., movies);
- featured menu 510 that when activated (e.g., by a finger tap on the icon) initiates the display of featured multimedia content (e.g., movies);
- top charts menu 512 that when activated (e.g., by a finger tap on the icon) initiates the display of most popular multimedia content (e.g., movies);
- search term input area 514 that when activated (e.g., by a finger tap on the icon) initiates receiving search terms for multimedia content search (e.g., for music, exemplary search terms can be song title, album title, artist or group members, etc.; for movies, exemplary search terms can be movie title, cast, director, keywords in synopsis, etc.);
- movie title 516 that when activated (e.g., by a finger tap on the icon) initiates the display of additional information about the movie title in another second viewing area; movie title 516 includes a title of a multimedia content selected based on predefined criteria; optionally, movie title 516 includes an image, a music file, or a movie file (e.g., a QuickTime file), associated with the selected multimedia content; in some embodiments, the predefined criteria includes genre, featured multimedia content, and popularity; in other embodiments, the predefined criteria include search terms received in search term input area 514;
- movie title icons (518-1, 518-2, 518-3, 518-4, 518-5, and 518-6) that when activated (e.g., by a finger tap on the icon) initiates the display of additional information about the respective movie title in another viewing area; movie title icons 518 include titles of multimedia content selected based on predefined criteria;
- multimedia type icons 530 (for example, music 530-1; movies 530-2; tv shows 530-3; books 530-4; radio 530-5; educational content 530-6, such as iTunes U; podcasts 530-7) that when activated (e.g., by a finger tap on the icon) initiates the display of an online multimedia store for the respective type of multimedia in first viewing area 520; for example, when music 530-1 is activated, first viewing area 520 displays an online multimedia store for music; similarly, when books 530-4 is activated, first viewing area 520 displays an online multimedia store for books; and
- scroll buttons (544, 546, 548, 550) to allow users to scroll through the movie titles. Left scroll buttons (544 and 546) are used to scroll left through an array of movie title icons 518. Right scroll buttons (548 and 550) are used to scroll right through the array of movie title icons 518.

The exemplary user interface depicted in FIG. 5A also includes signal intensity 502 (which indicates the intensity of the radio communication signal, such as signal for Wi-Fi, EDGE, or 3G), current time 504, and battery power indicator 506.

FIG. 5A also illustrates a detection of contact 505 on touch screen 112. In this example, contact 505 is at location 505-A on touch screen 112 corresponding to the location of movie title icon 518-2.

Figure 5B:
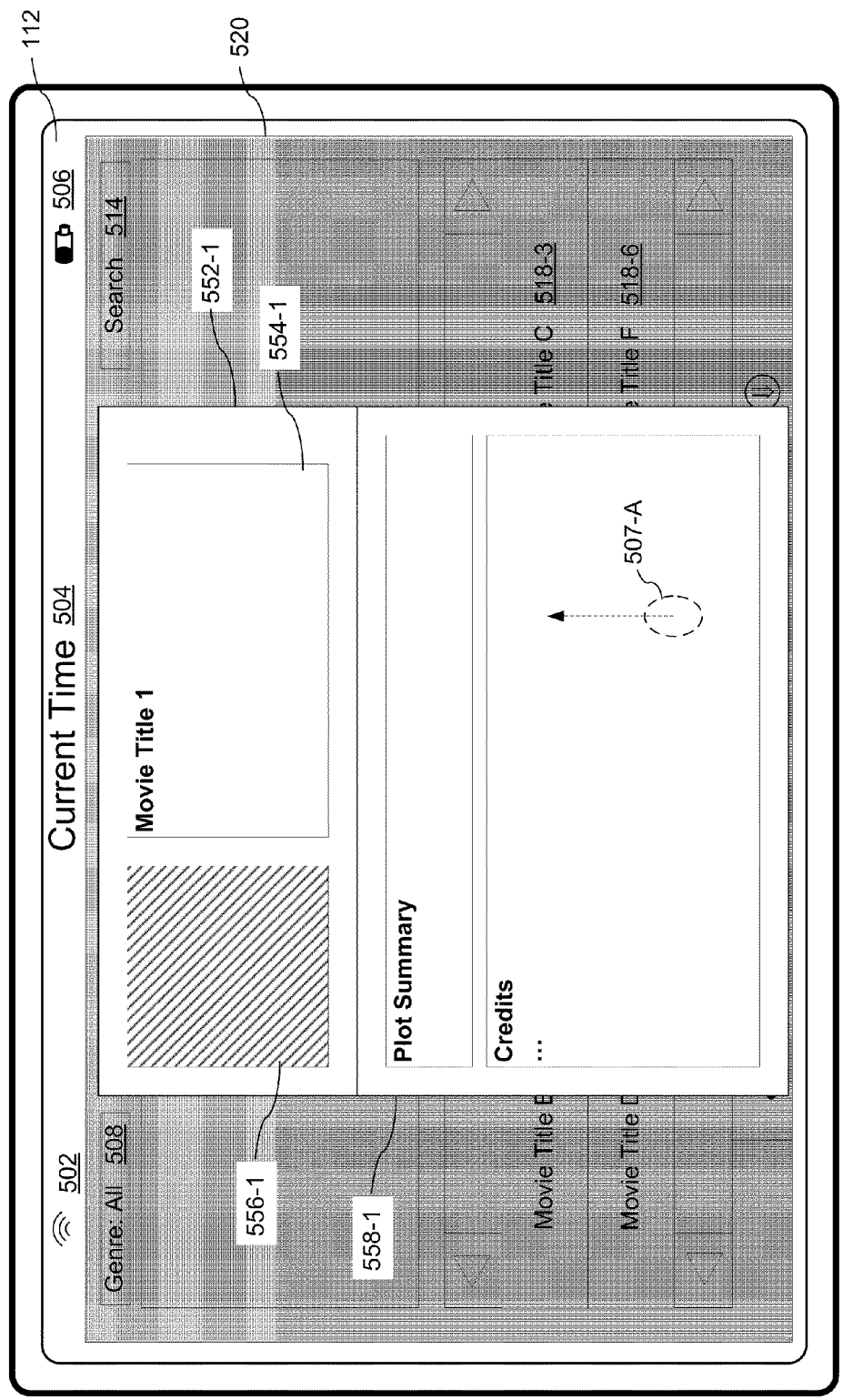

FIG. 5B illustrates overlaying second viewing area 552-1 over a portion of first viewing area 520, while displaying the remaining portion of first viewing area 520. In some embodiments, second viewing area 552-1 appears on touch screen 112 with an animation. In some embodiments, the animation includes a simultaneous zooming in and flipping motion of second viewing area 552-1.

In FIG. 5B, the remaining portion of first viewing area 520 is deemphasized. In this example, the remaining portion of first viewing area 520 is deemphasized by shading, fading, graying-out, and/or dimming.

In FIG. 5B, second viewing area 552-1 includes static content, selectable objects, and scrollable subview 558-1. A static content is neither selectable nor scrollable. In this example, the static content includes information box 556-1 (which can include an image associated with the movie) and movie title 554-1. Movie title 554-1 corresponds to movie title icon 518-2 (in FIG. 5A). In some embodiments, information box 556-1 and movie title 554-1 are selectable objects. In this example, scrollable subview 558-1 includes plot summary and movie credits. In some embodiments, scrollable subview 558-1 may include static content and/or selectable objects.

FIG. 5B also illustrates a detection of contact 507-A on scrollable subview 558-1, and movement of contact 507-A across touch screen 112.

Figure 5C:
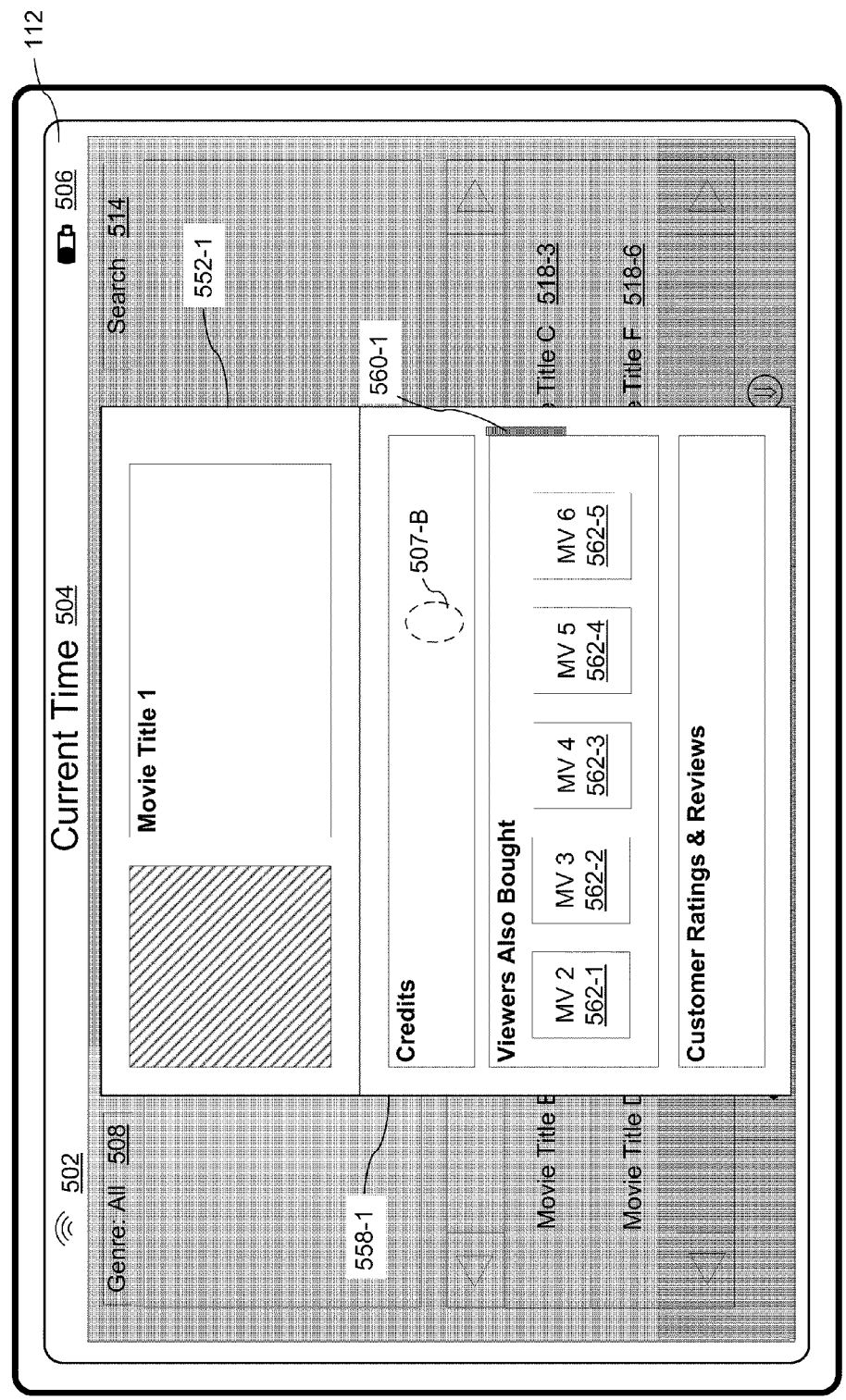

FIG. 5C illustrates that contact 507 has moved to location 507-B on touch screen 112. FIG. 5C also illustrates that scrollable subview 558-1 is scrolled in accordance with the movement of contact 507. During the scroll, scrollable subview 558-1 includes a scroll indicator 560-1 to indicate the relative position of the displayed content in the entire content displayable in scrollable subview 558-1. After scrolling, scrollable subview 558-1 displays additional information, including customer ratings and reviews, and icons for related movie titles (562-1, 562-2, 562-3, 562-4, and 562-5) (e.g., movie titles that other viewers also purchased).

Figure 5D:
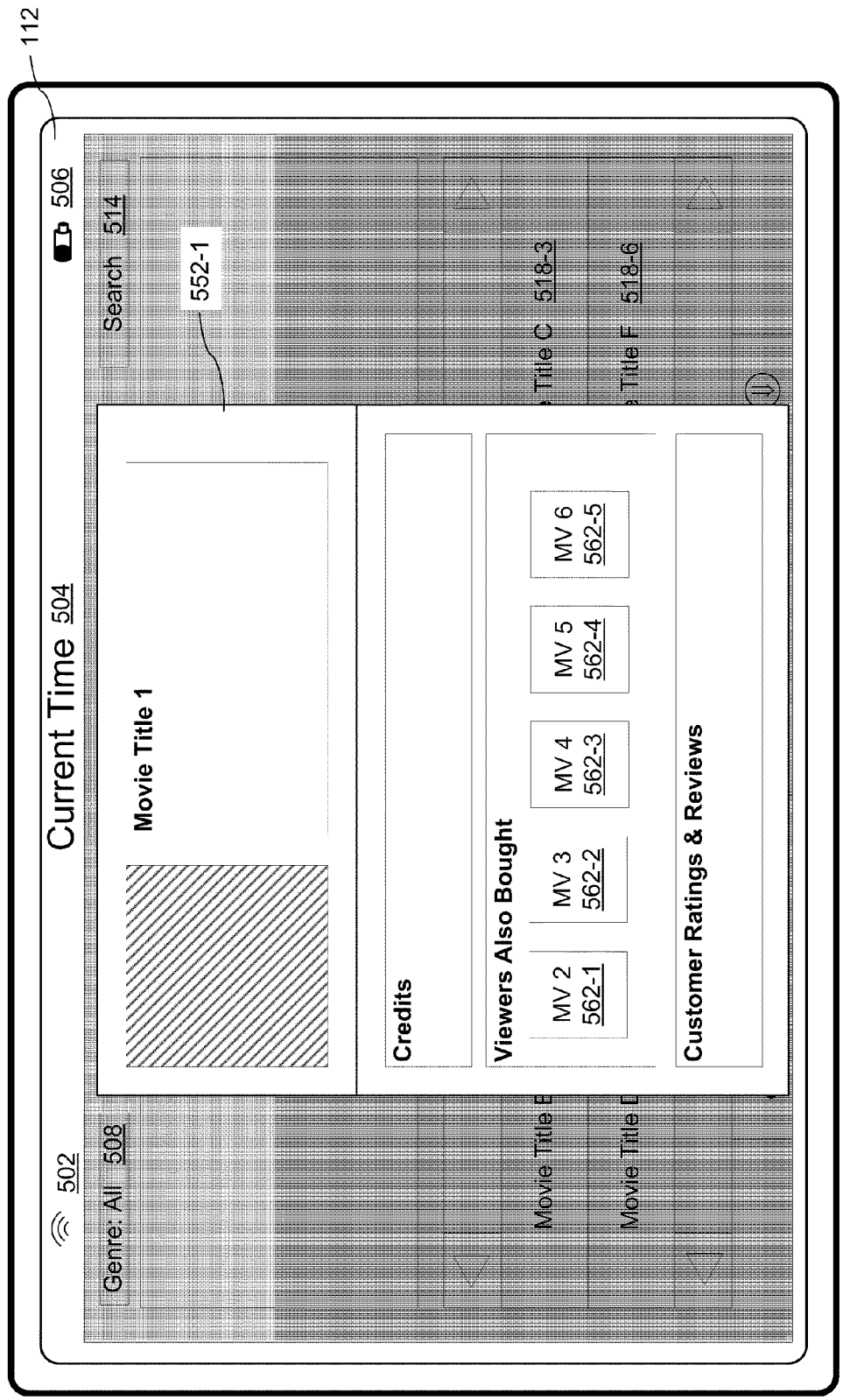

FIG. 5D illustrates second viewing area 552-1 after lift-off of contact 507. In response to detecting the lift-off of contact 507, scrollable subview 558-1 stops scrolling, and scroll indicator 560-1 (in FIG. 5C) ceases to be displayed.

Figure 5E:
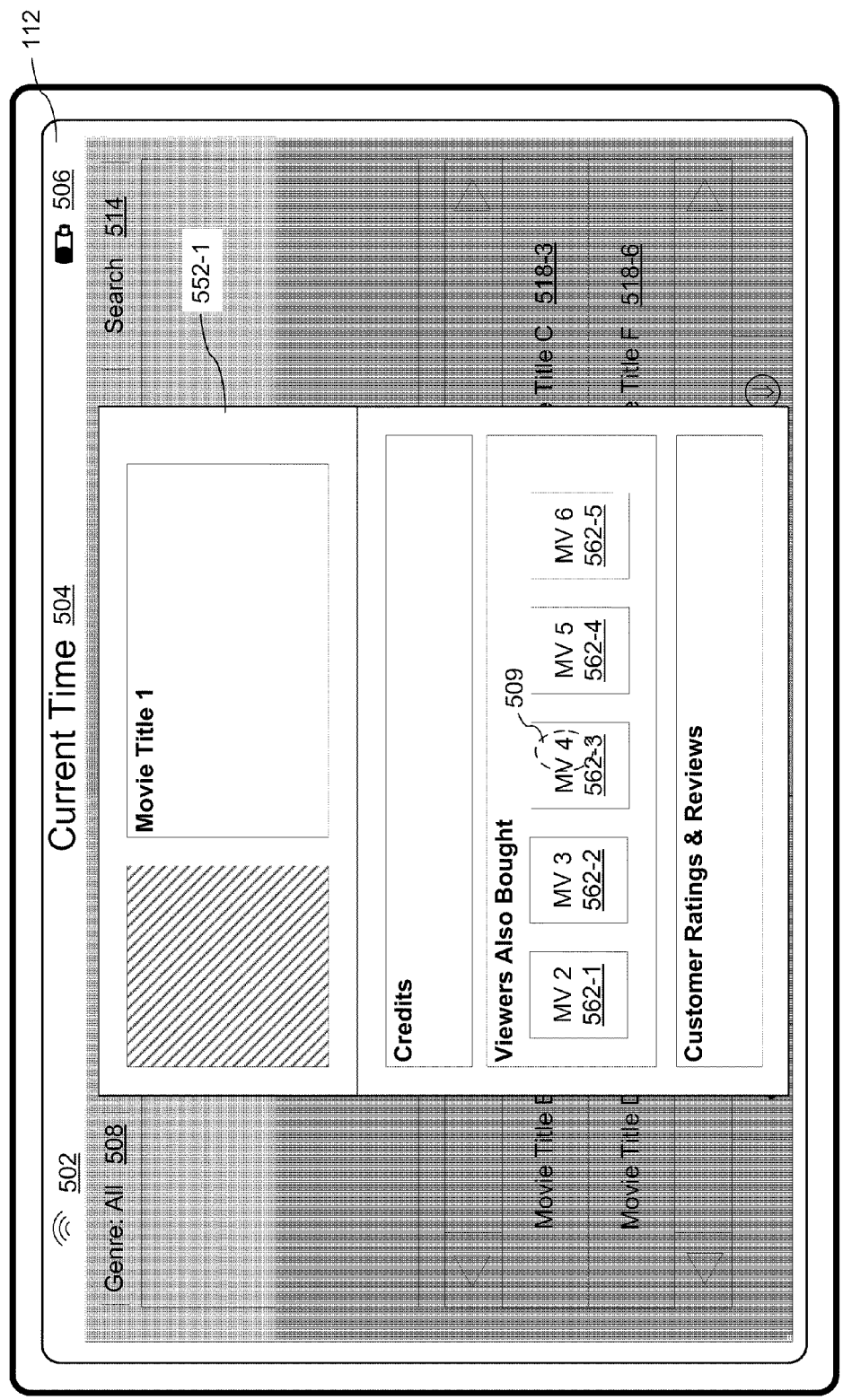

In FIG. 5E, contact 509 is detected at a location corresponding to movie title icon 562-3.

Figure 5F:
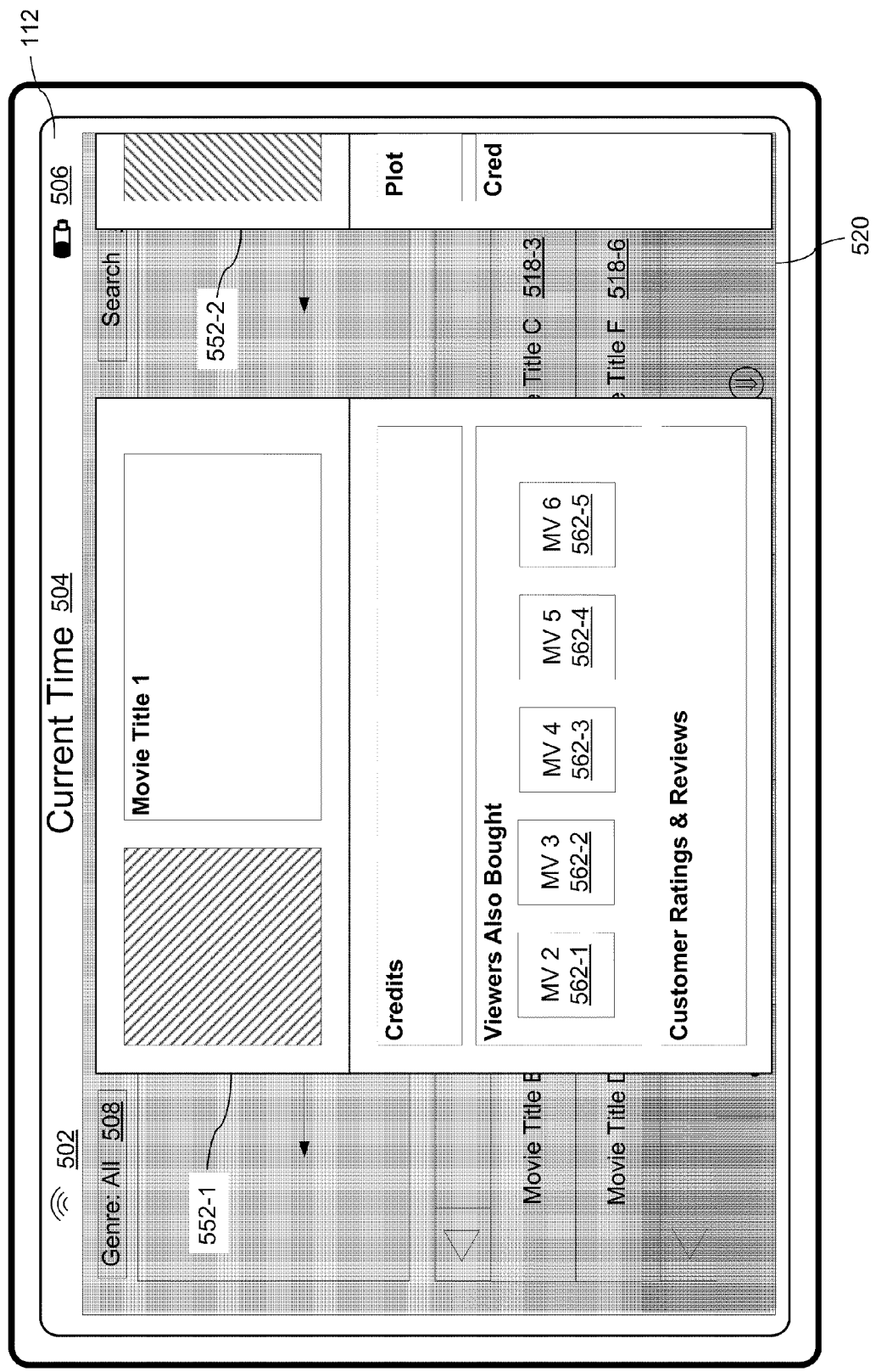
Figure 5G:
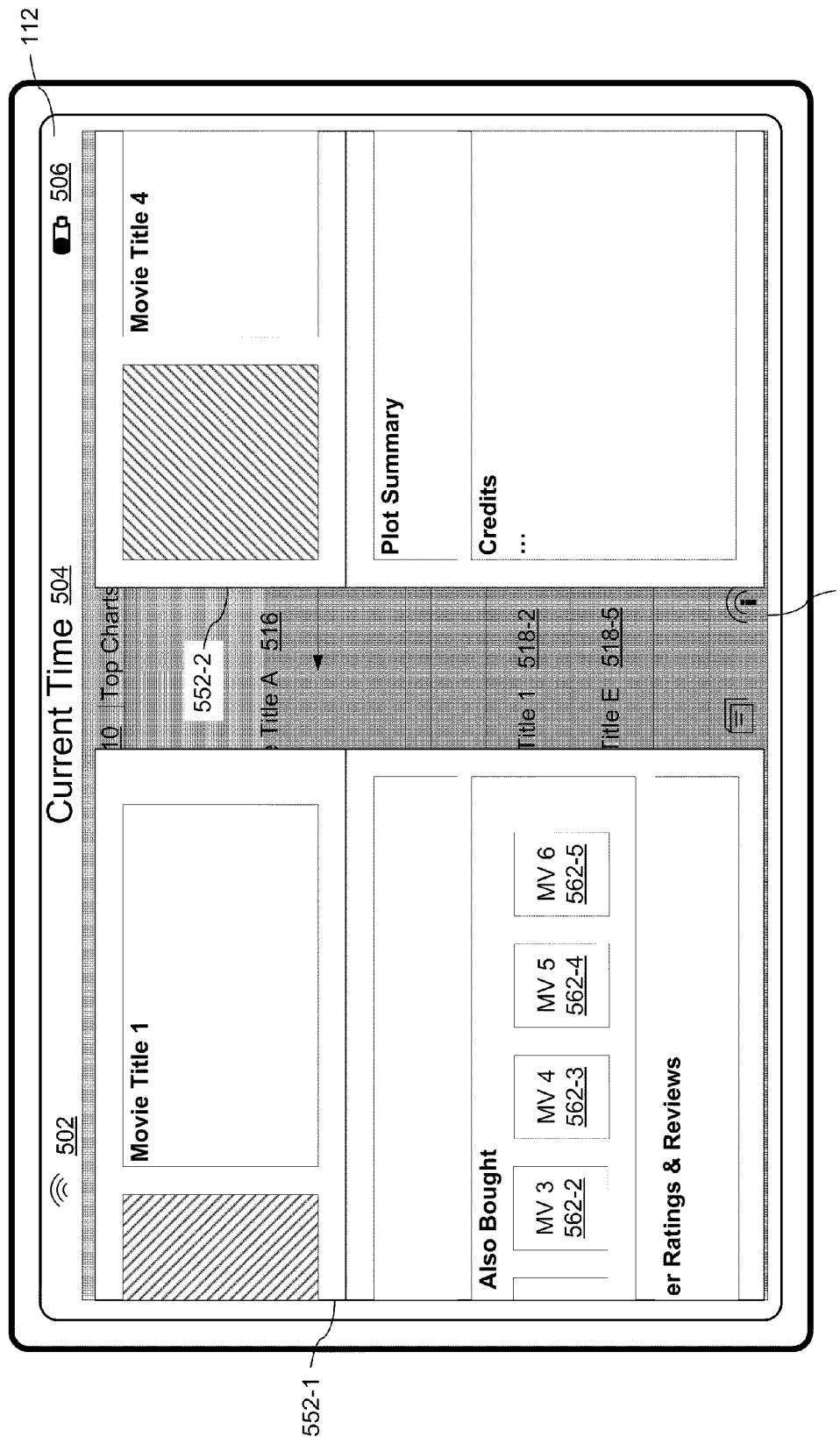
Figure 5H:
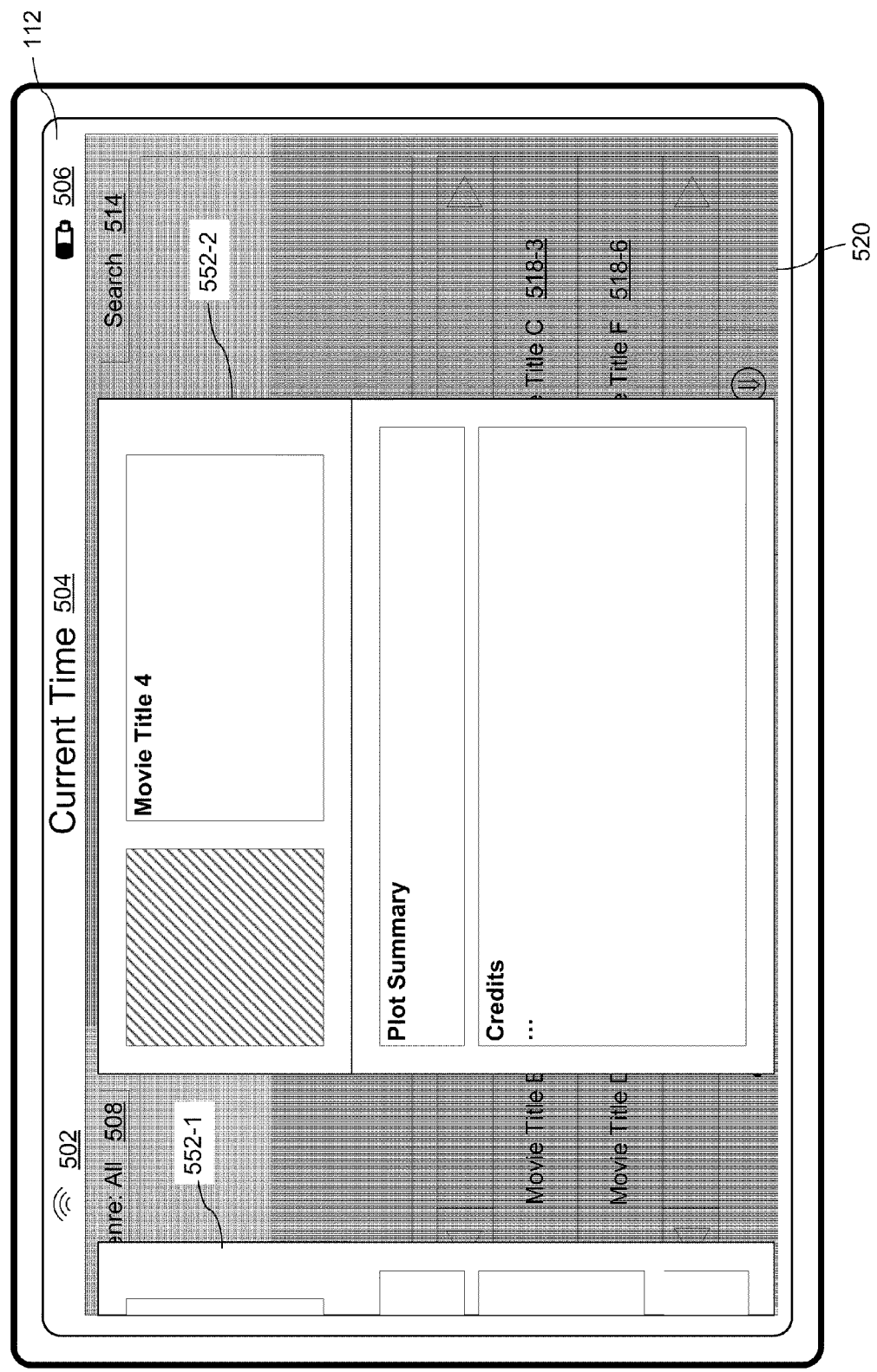

FIGS. 5F-5H illustrate overlaying third viewing area 552-2 over a portion of first viewing area 520. Third viewing area 552-2 slides in from the right edge of touch screen 112. While third viewing area 552-2 slides in, second viewing area 552-1 slides to the left edge of touch screen 112. The display of a remaining portion of first viewing area 520 is maintained.

In FIG. 5G, the second and third viewing areas (552-1 and 552-2, respectively) continue to slide during the animation. FIG. 5H illustrates the completion of the sliding animation. After the completion of the sliding animation, a portion of second viewing area 552-1 has moved off touch screen 112 and a portion of second viewing area 552-1 remains on touch screen 112.

Figure 5I:
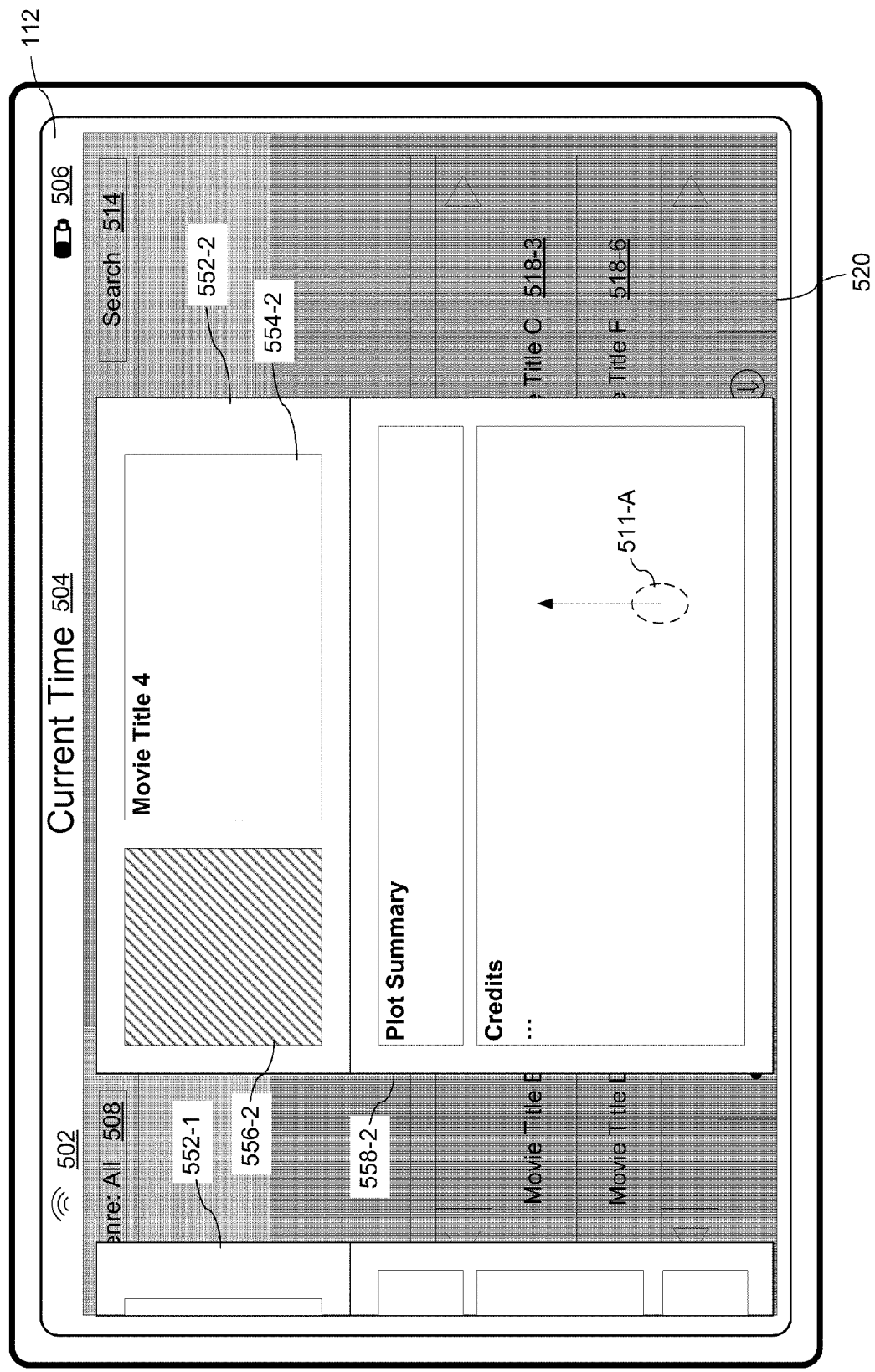

FIG. 5I illustrates overlaying third viewing area 552-2 over a portion of first viewing area 520, while displaying a remaining portion of first viewing area 520. As described with reference to FIG. 5B, the remaining portion of first viewing area 520 is deemphasized. Like second viewing area 552-1 in FIG. 5B, third viewing area 552-2 also includes static content, selectable objects, and scrollable subview 558-2. Information box 556-2 and movie title 554-2 correspond to movie title icon 562-3 (in FIG. 5E).

FIG. 5I also illustrates a detection of contact 511-A on scrollable subview 558-2, and movement of contact 511-A across touch screen 112.

Figure 5J:
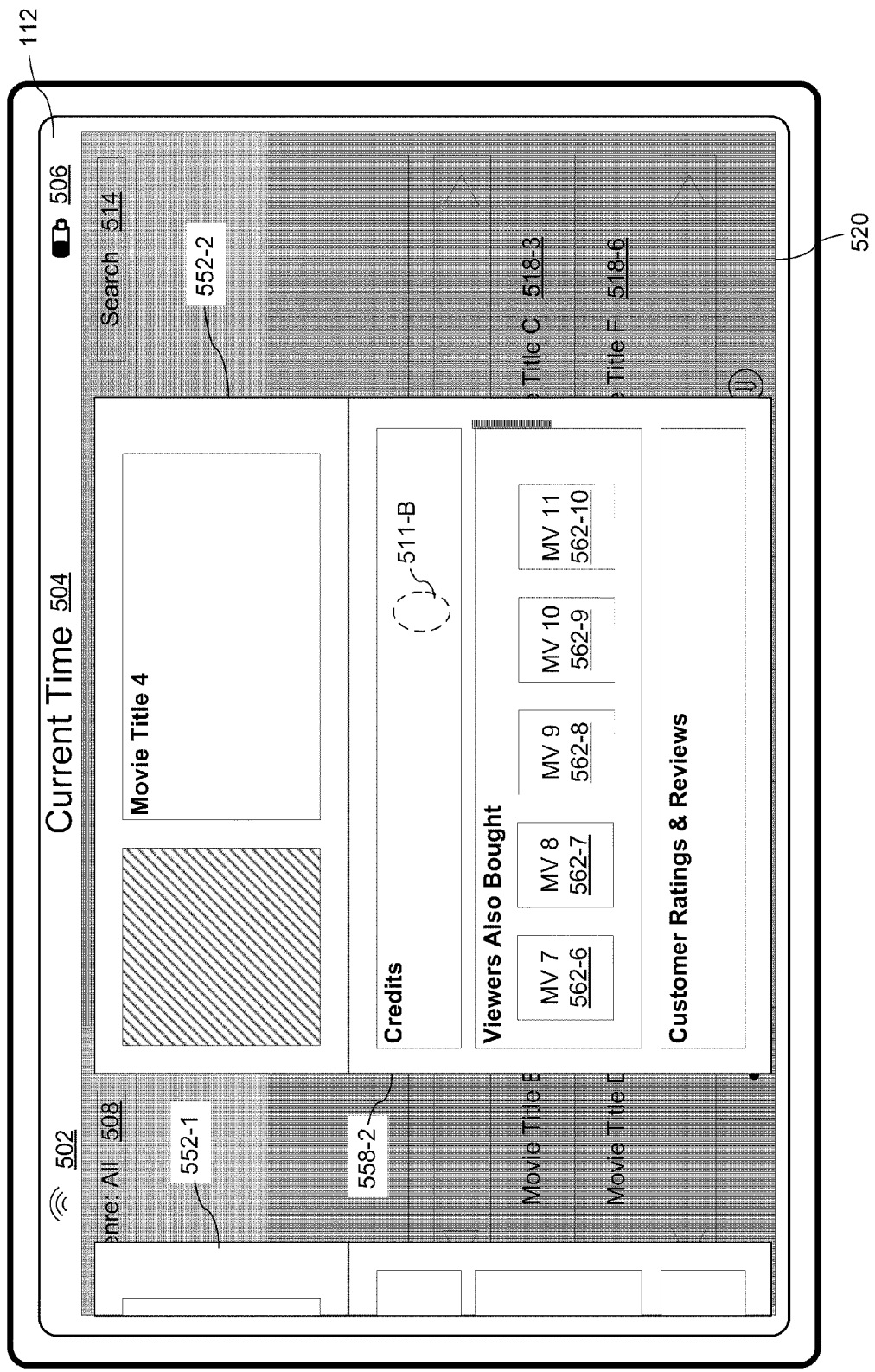

FIG. 5J illustrates that contact 511 has moved to location 511-B on touch screen 112. In FIG. 5J, scrollable subview 558-2 scrolls in an analogous manner to subview 558-1, as described above with reference to FIGS. 5B and 5C. After scrolling, scrollable subview 558-2 displays additional information, including icons for related movie titles (562-6, 562-7, 562-8, 562-9, and 562-10).

Figure 5K:
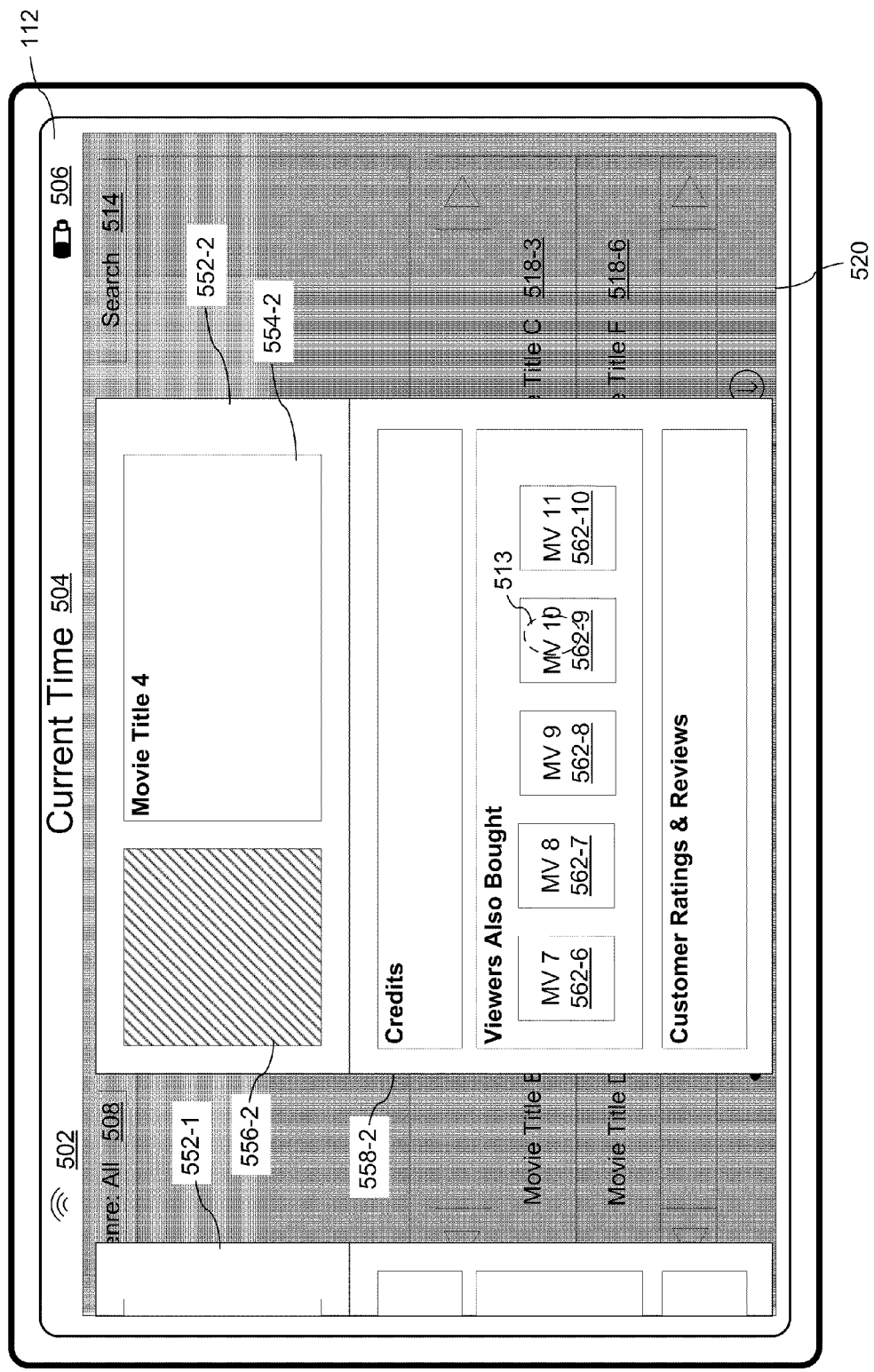

In FIG. 5K, contact 513 is detected at a location corresponding to movie title icon 562-9.

Figure 5L:
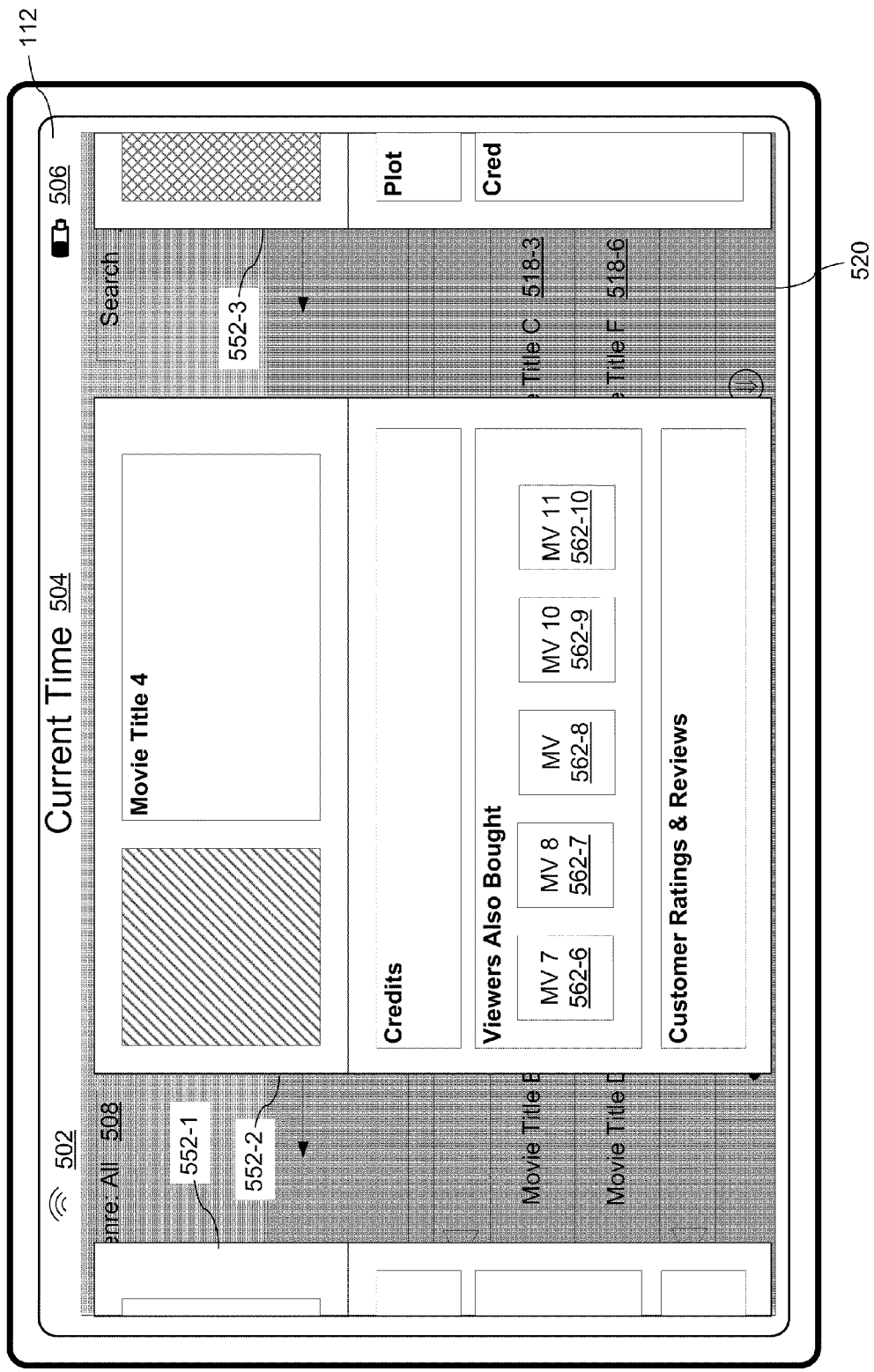
Figure 5M:
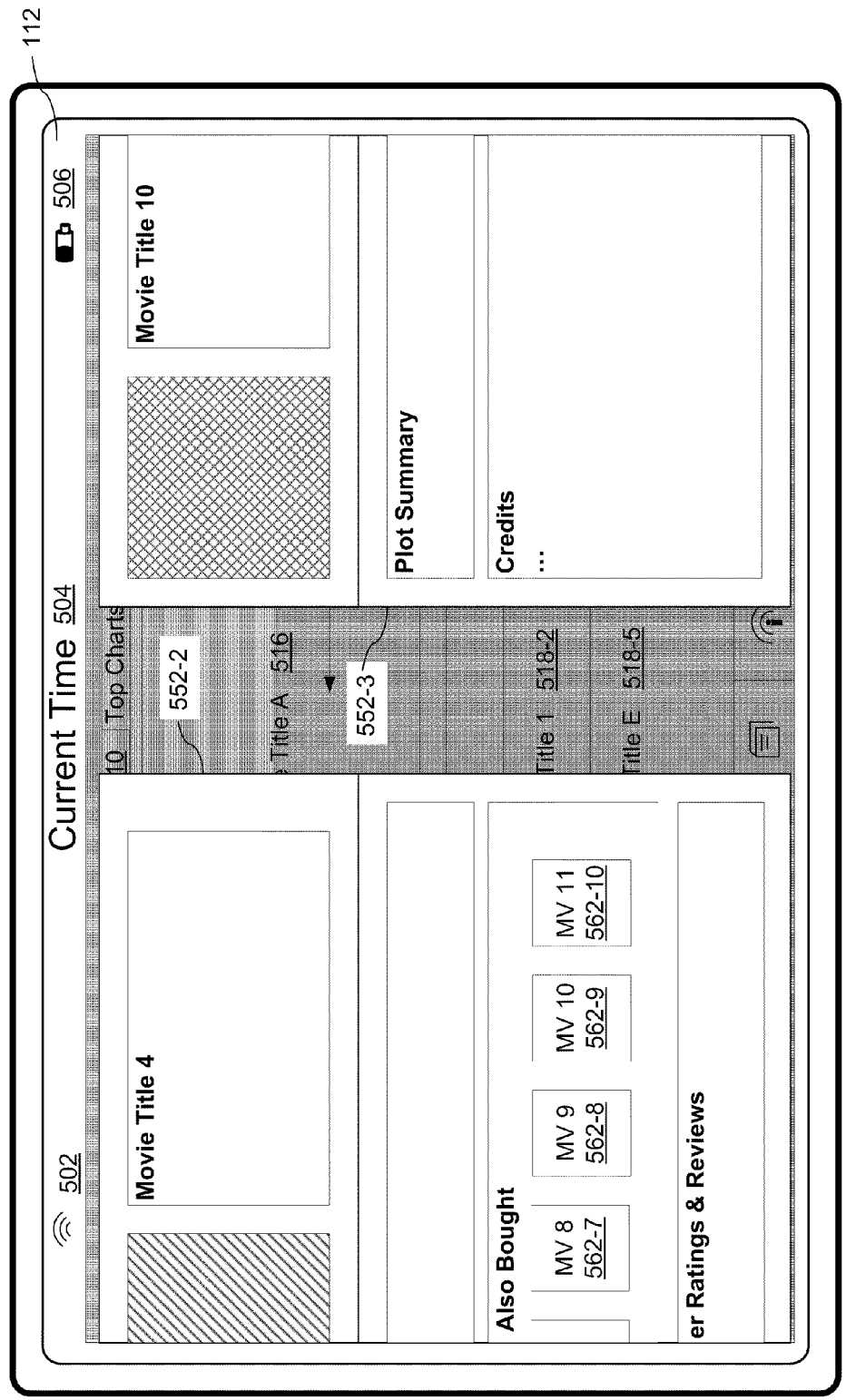
Figure 5N:
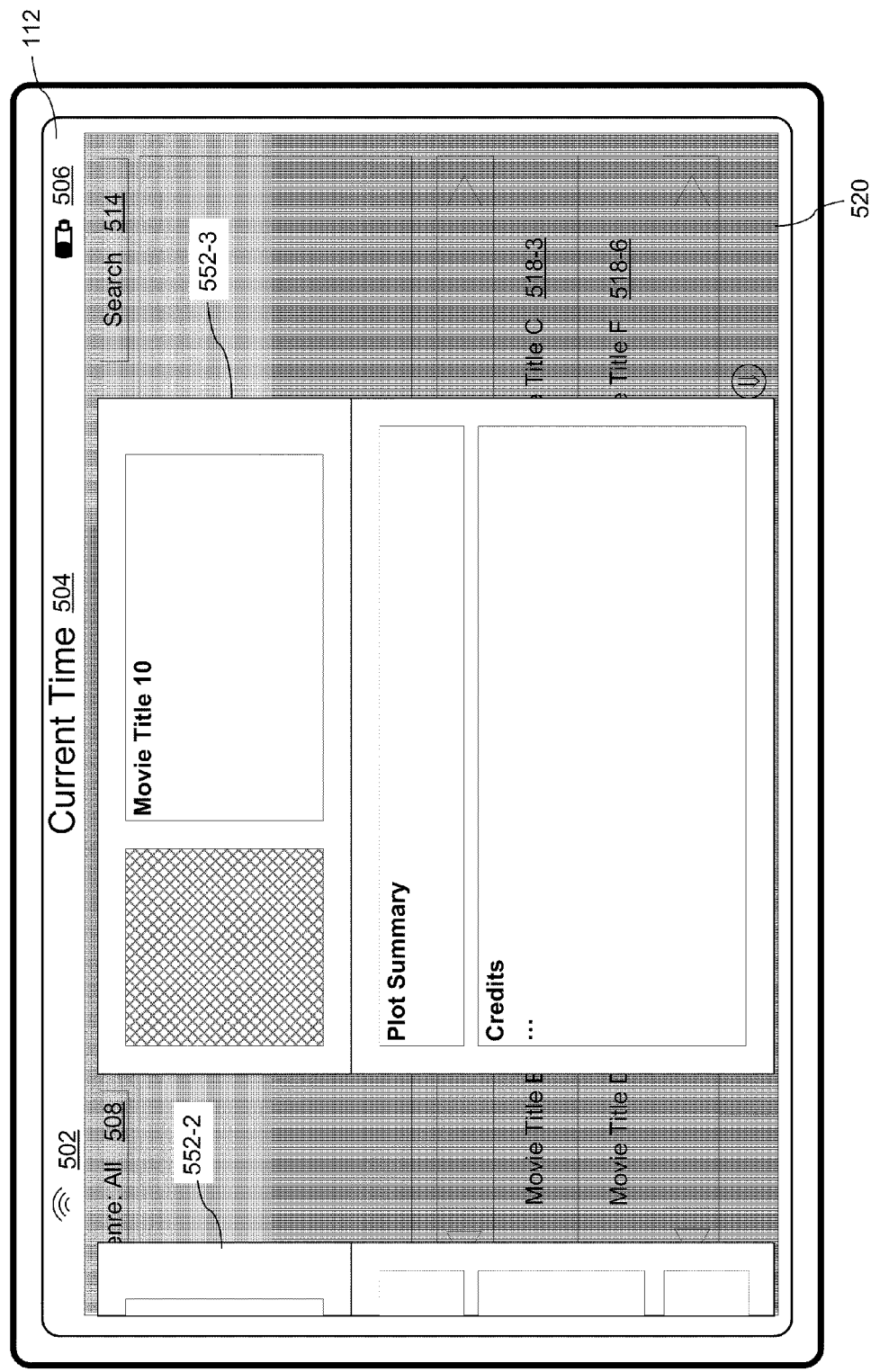

FIGS. 5L-5N illustrate overlaying fourth viewing area 552-3 over a portion of first viewing area 520. Fourth viewing area 552-3 slides in from the right edge of touch screen 112. While fourth viewing area 552-3 slides in, third viewing area 552-2 slides to the left edge of touch screen 112. Second viewing area 552-1 slides off of the left edge of touch screen 112 and ceases to be displayed. The display of a remaining portion of first viewing area 520 is maintained.

In FIG. 5M, the third and fourth viewing areas (552-2 and 552-3) continue to slide during the animation. FIG. 5N illustrates the completion of the sliding animation. After the completion of the sliding animation, a portion of third viewing area 552-2 has moved off touch screen 112 and a portion of third viewing area 552-2 remains on touch screen 112.

Figure 5O:
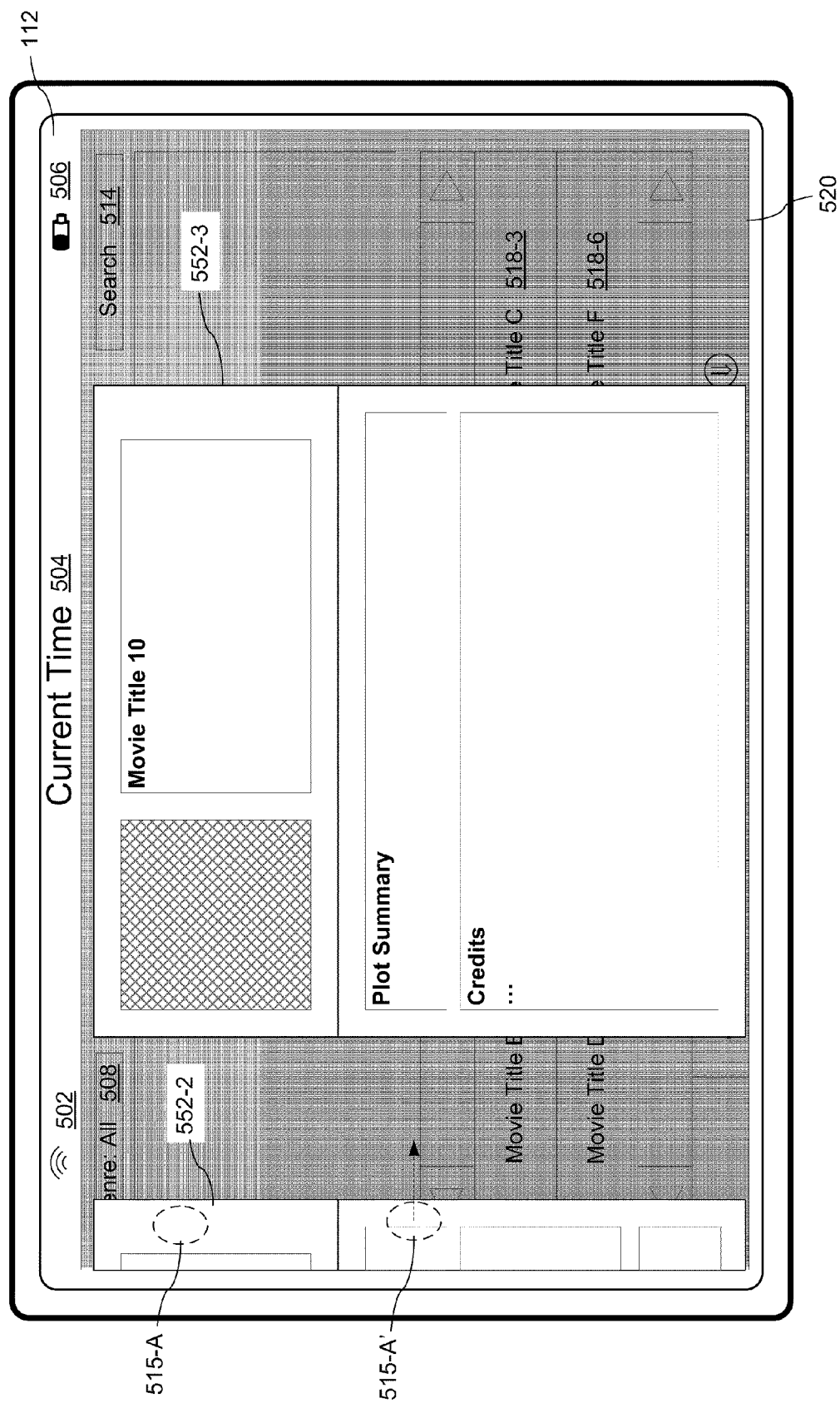

FIGS. 5O-5R illustrate a back-tracking operation in accordance with some embodiments. FIG. 5O illustrates a detection of contact 515-A at a location corresponding to the portion of third viewing area 552-2 that remains on the display 112. In some embodiments, swipe gesture 515-A' is detected at a location corresponding to third viewing area 552-2.

Figure 5P:
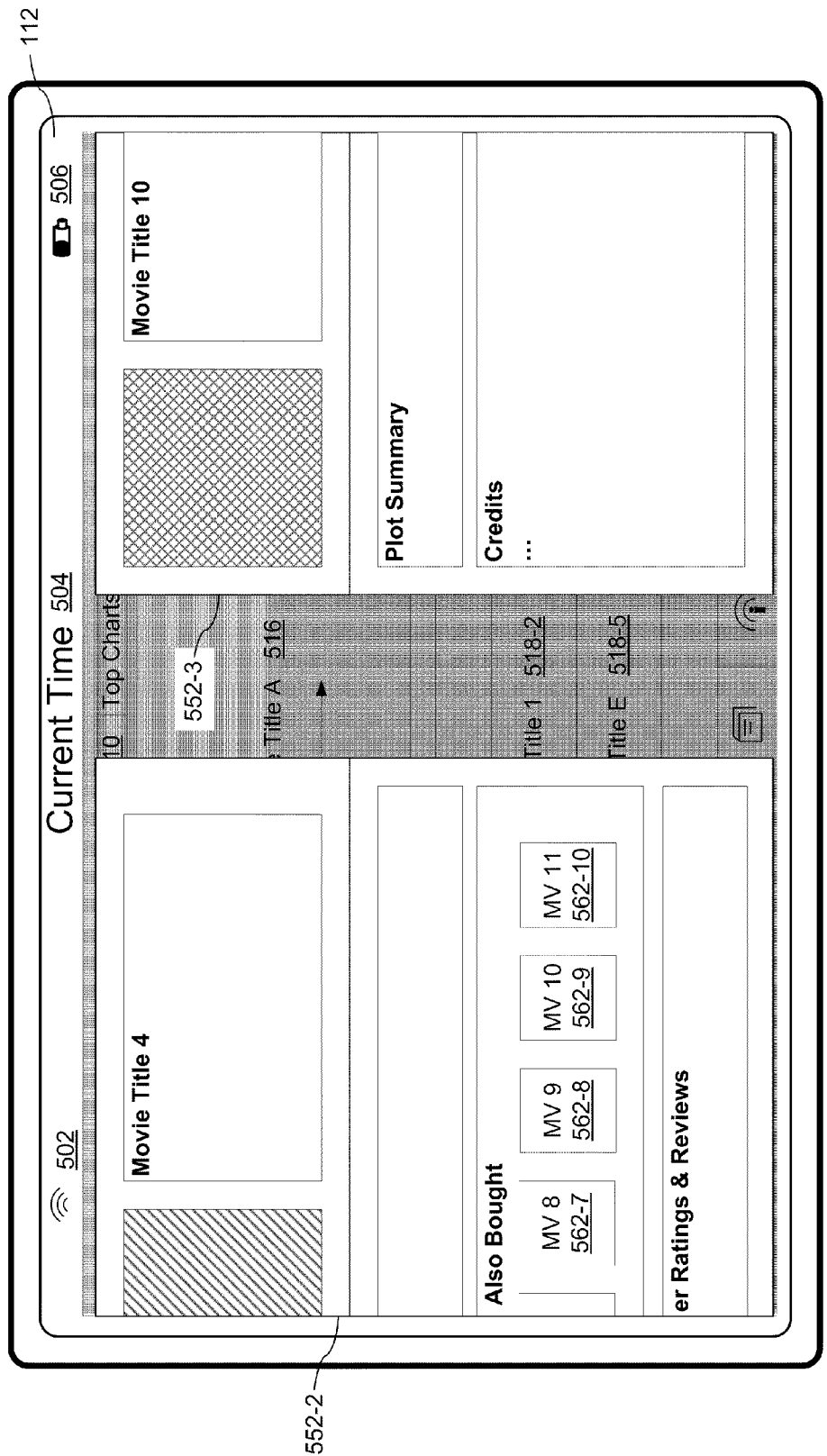
Figure 5Q:
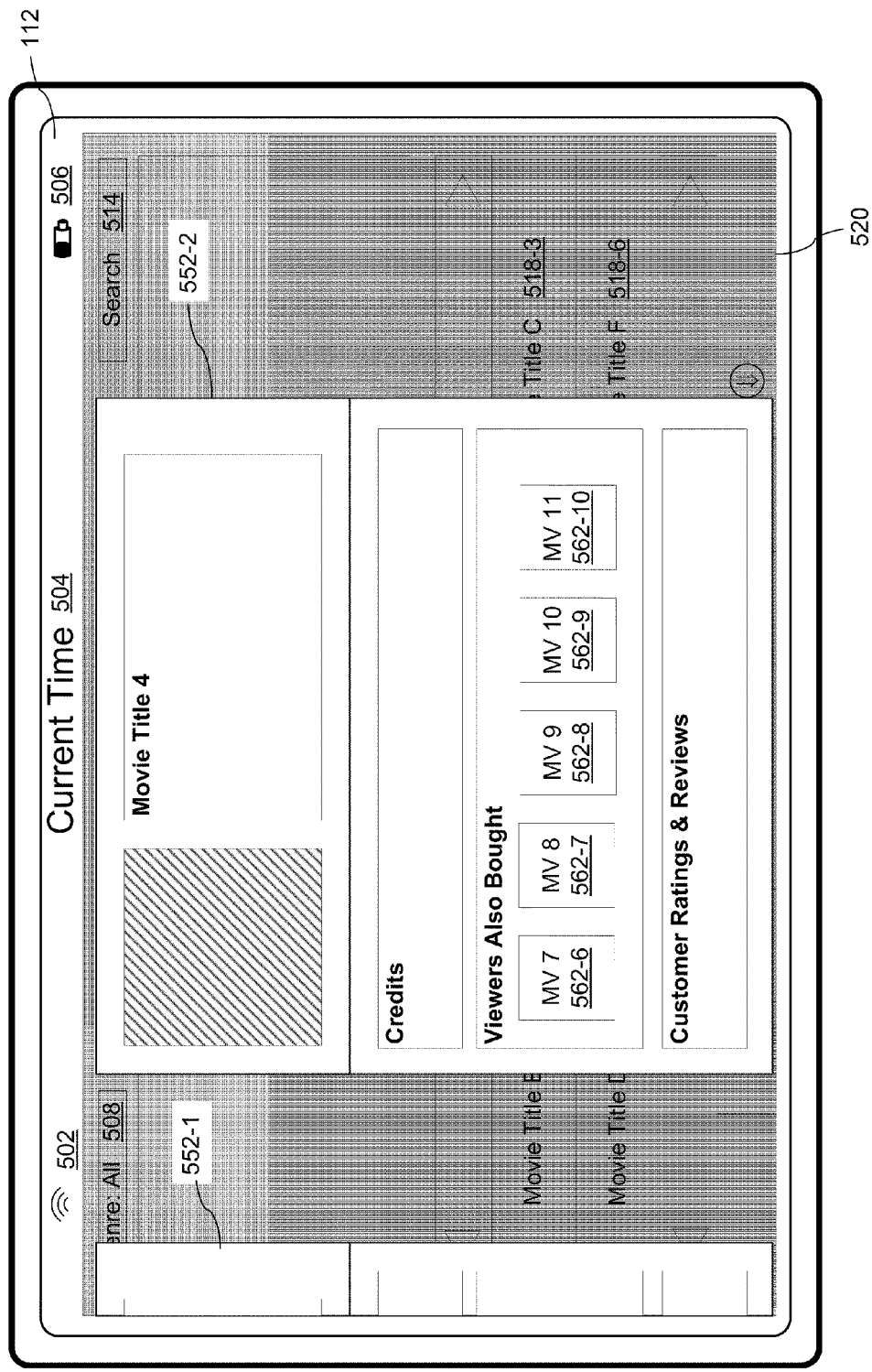
Figure 5R:
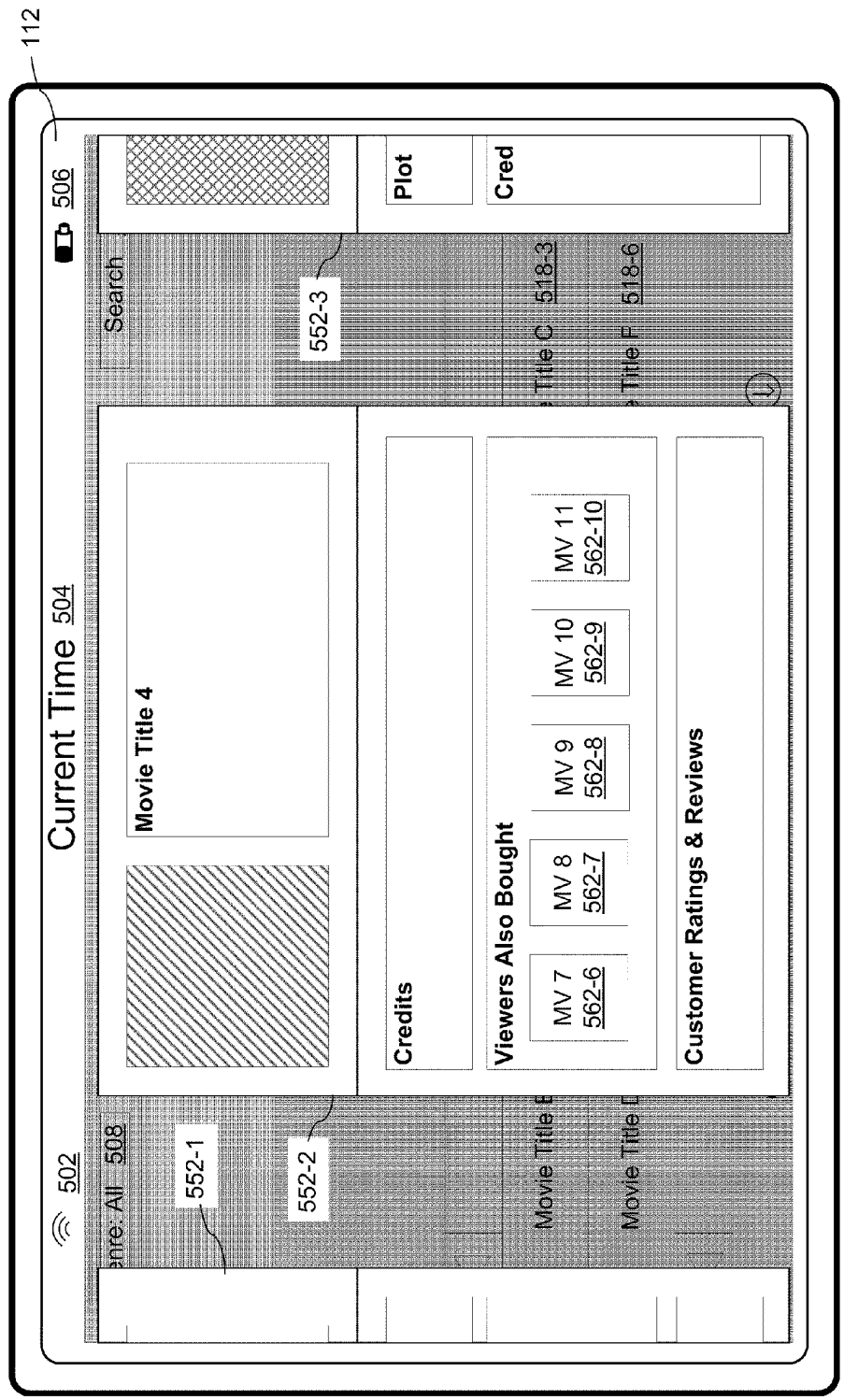

In FIG. 5P, in response to detecting contact 515-A or swipe gesture 515-A', the third and fourth viewing areas (552-2 and 552-3, respectively) slide toward the right edge of touch screen 112. FIG. 5Q illustrates the completion of the sliding animation in accordance with some embodiments. In FIG. 5Q, the fourth viewing area (552-3) moves off of the right edge of touch screen 112 and ceases to be displayed. A portion of the second viewing area (552-1) slides in from the left edge of touch screen 112. FIG. 5R illustrates the completion of the sliding animation in accordance with alternate embodiments. In FIG. 5R, a portion of fourth viewing area 552-3 has moved off touch screen 112 and a portion of fourth viewing area 552-3 remains on touch screen 112.

Figure 5S:
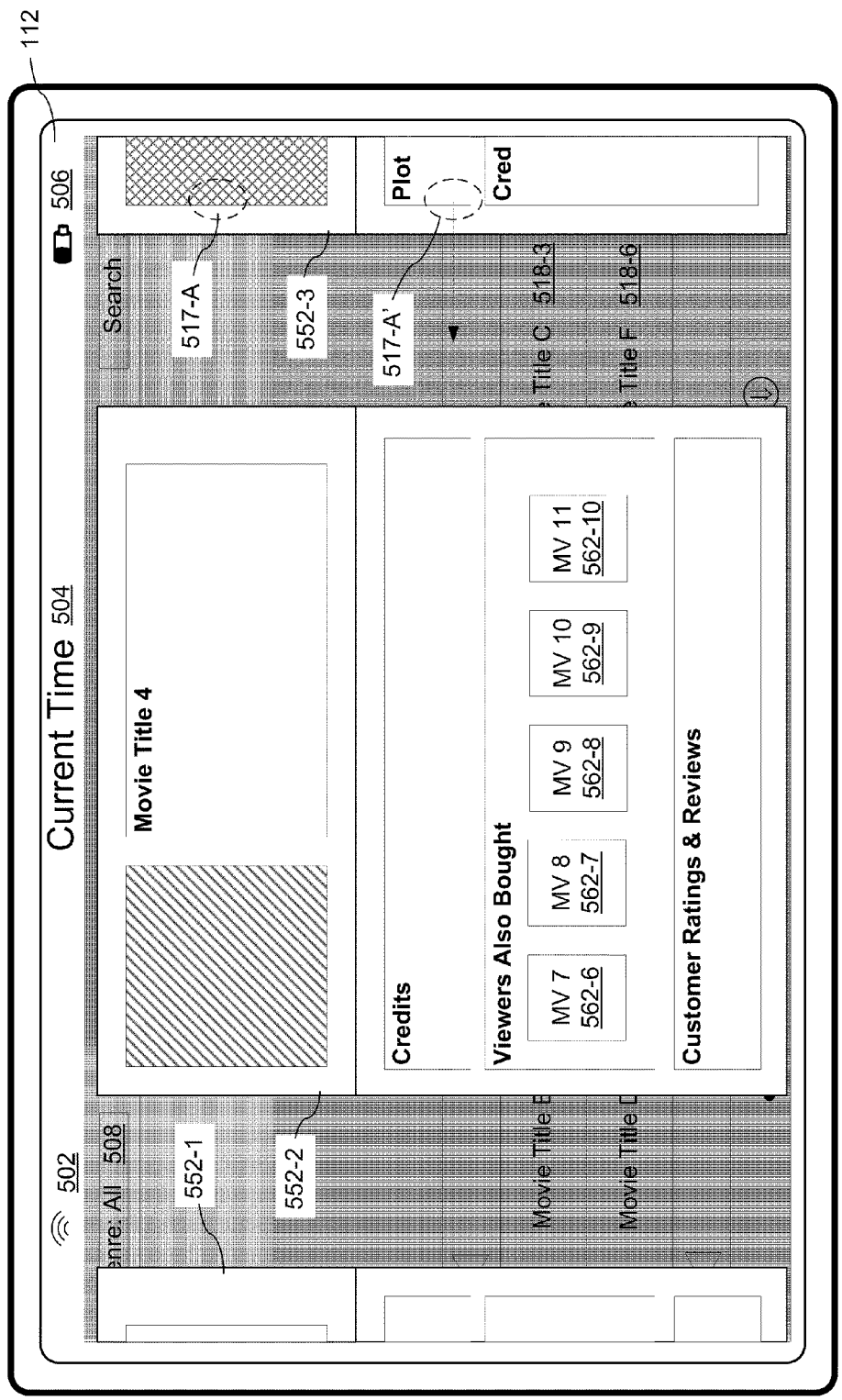
Figure 5T:
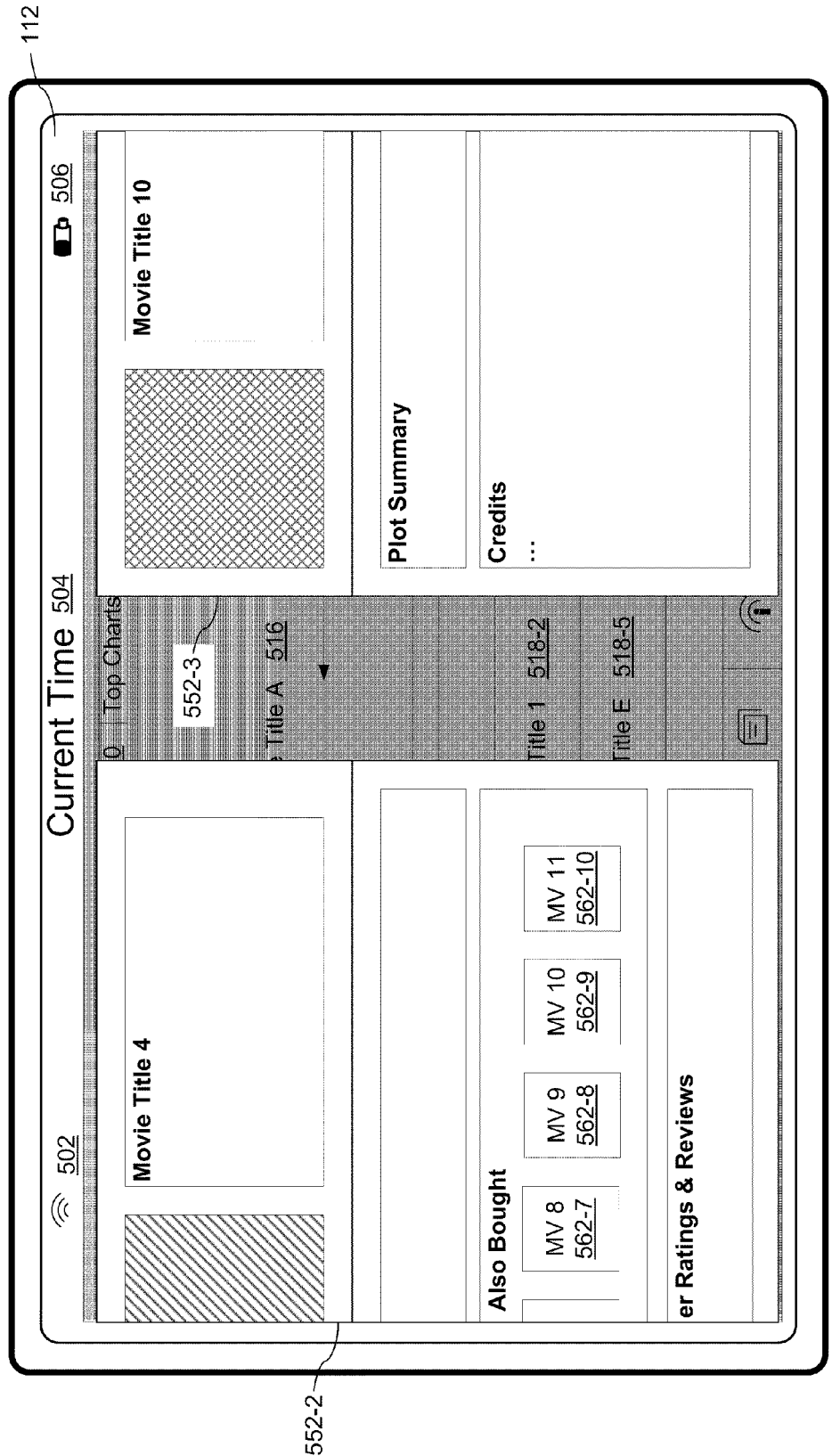
Figure 5U:
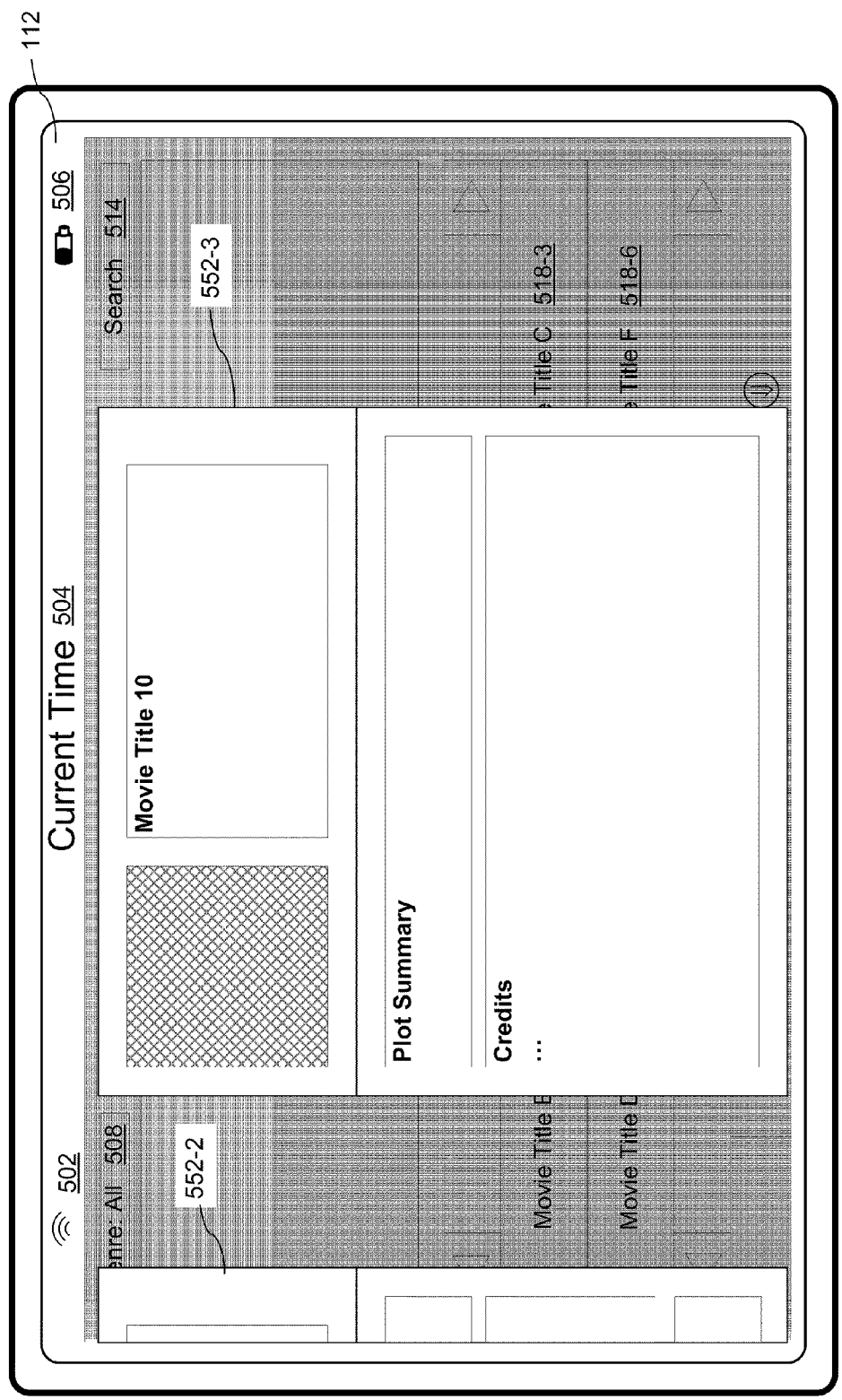

FIGS. 5S-5U illustrate a forward-tracking operation in accordance with some embodiments. FIG. 5S illustrates a detection of contact 517-A at a location corresponding to the portion of fourth viewing area 552-3 that remains on the display 112. In some embodiments, swipe gesture 517-A' is detected at a location corresponding to fourth viewing area 552-3.

In FIG. 5T, in response to detecting contact 517-A or swipe gesture 517-A', the third and fourth viewing areas (552-2 and 552-3) slide toward the left edge of touch screen 112. The second viewing area (552-1) has slid off of the left edge of touch screen 112 and ceases to be displayed. FIG. 5U illustrates the completion of the sliding animation in accordance with some embodiments. In FIG. 5U, after the completion of the sliding animation, no viewing area is displayed on the right edge of touch screen 112.

Figure 5V:
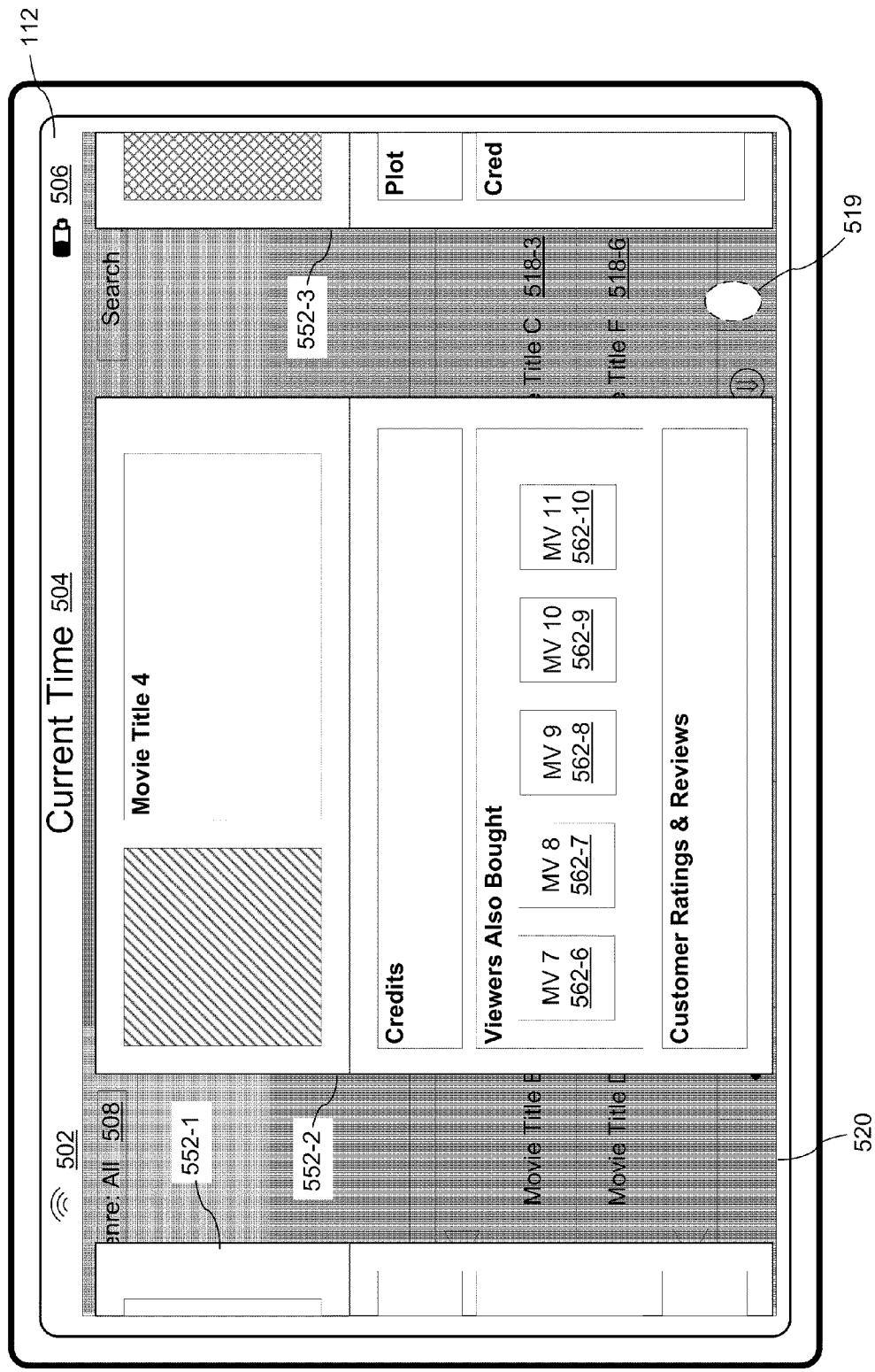
Figure 5W:
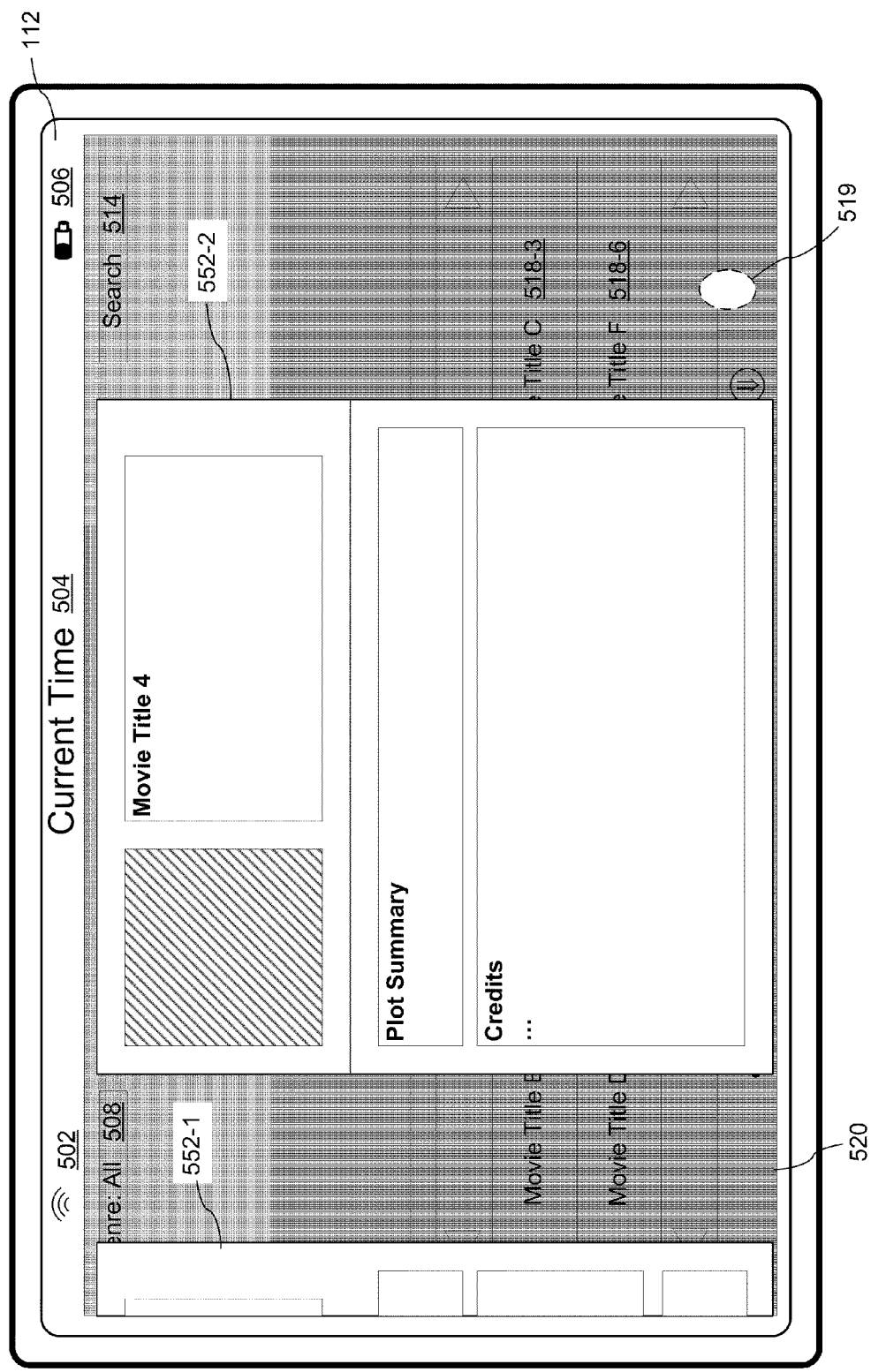
Figure 5X:
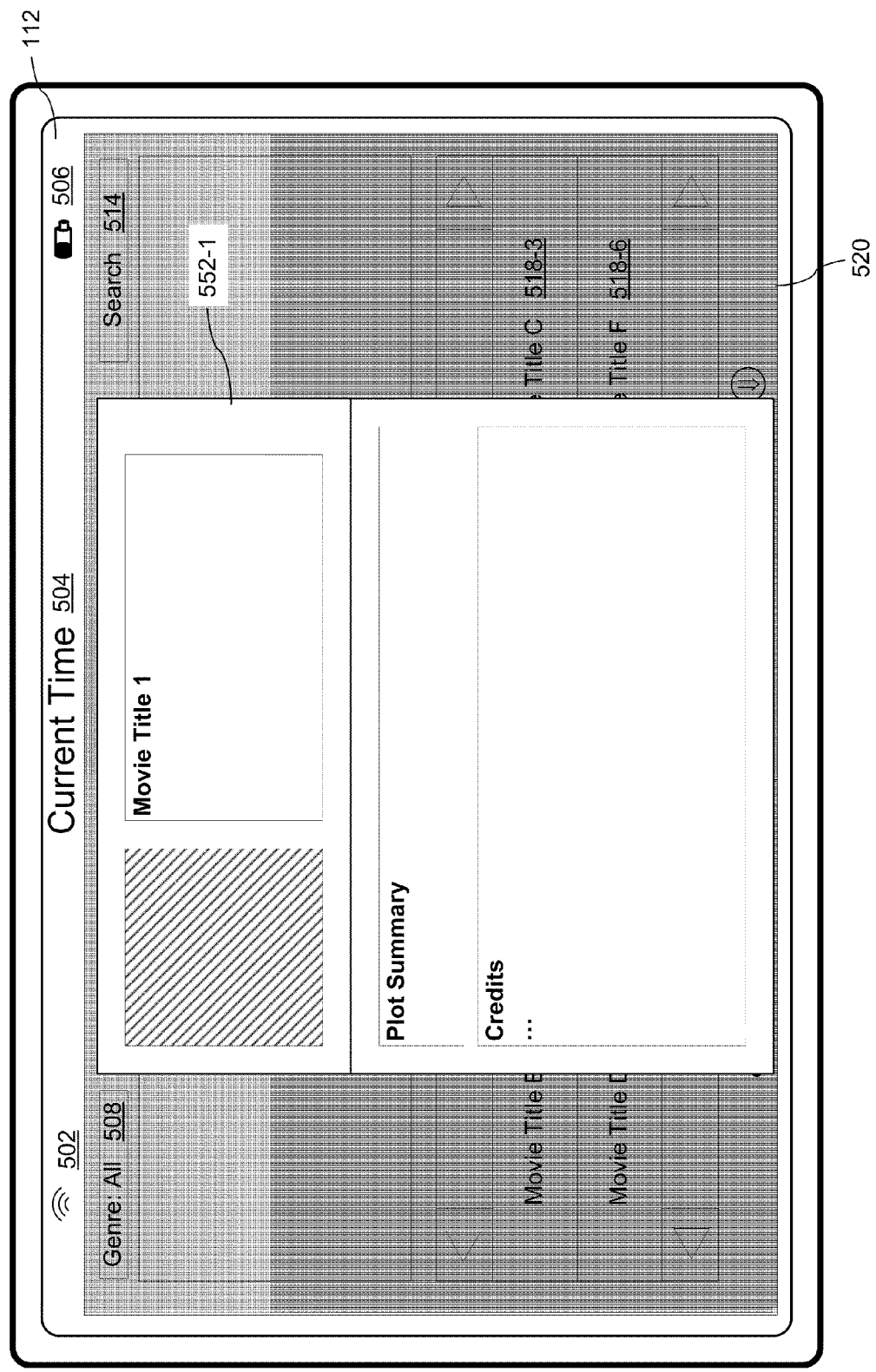
Figure 5Y:
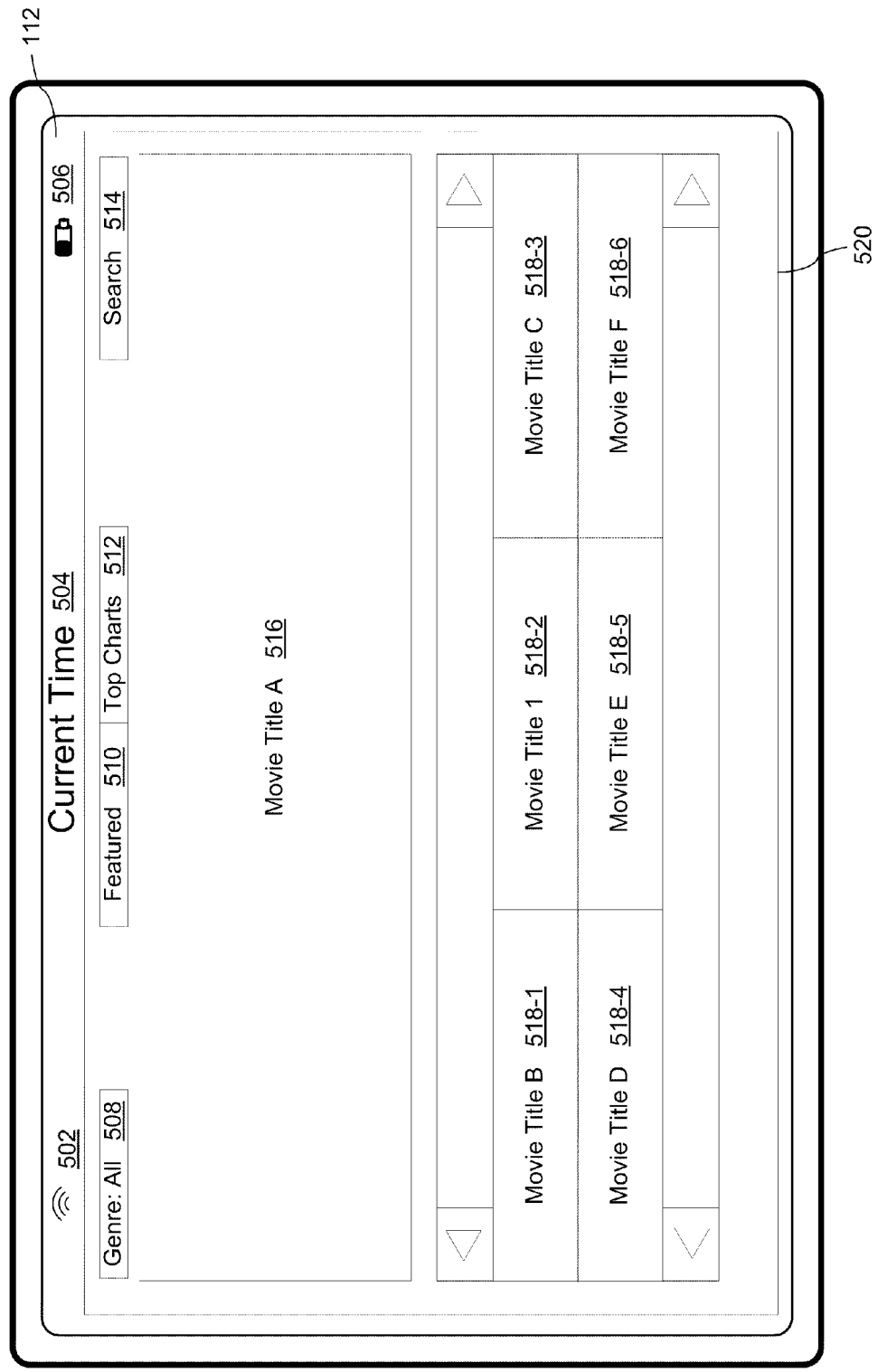

FIGS. 5V-5Y illustrate the termination of overlaying multiple viewing areas. In FIGS. 5V-5X, contact 519 is detected at a location corresponding to a remaining portion of first viewing area 520. Regardless of the number of displayed viewing areas overlaid on first viewing area 520, FIG. 5Y illustrates that, in response to detecting contact 519, all viewing areas 552 (for example, 552-1, 552-2, and 552-3) overlaid on first viewing area 520 cease to be displayed. In some embodiments, all viewing areas 552 (for example, 552-1, 552-2, and 552-3) overlaid on first viewing area 520 are closed. FIG. 5Y also illustrates that first viewing area 520 ceases to be deemphasized.

Figure 5Z:
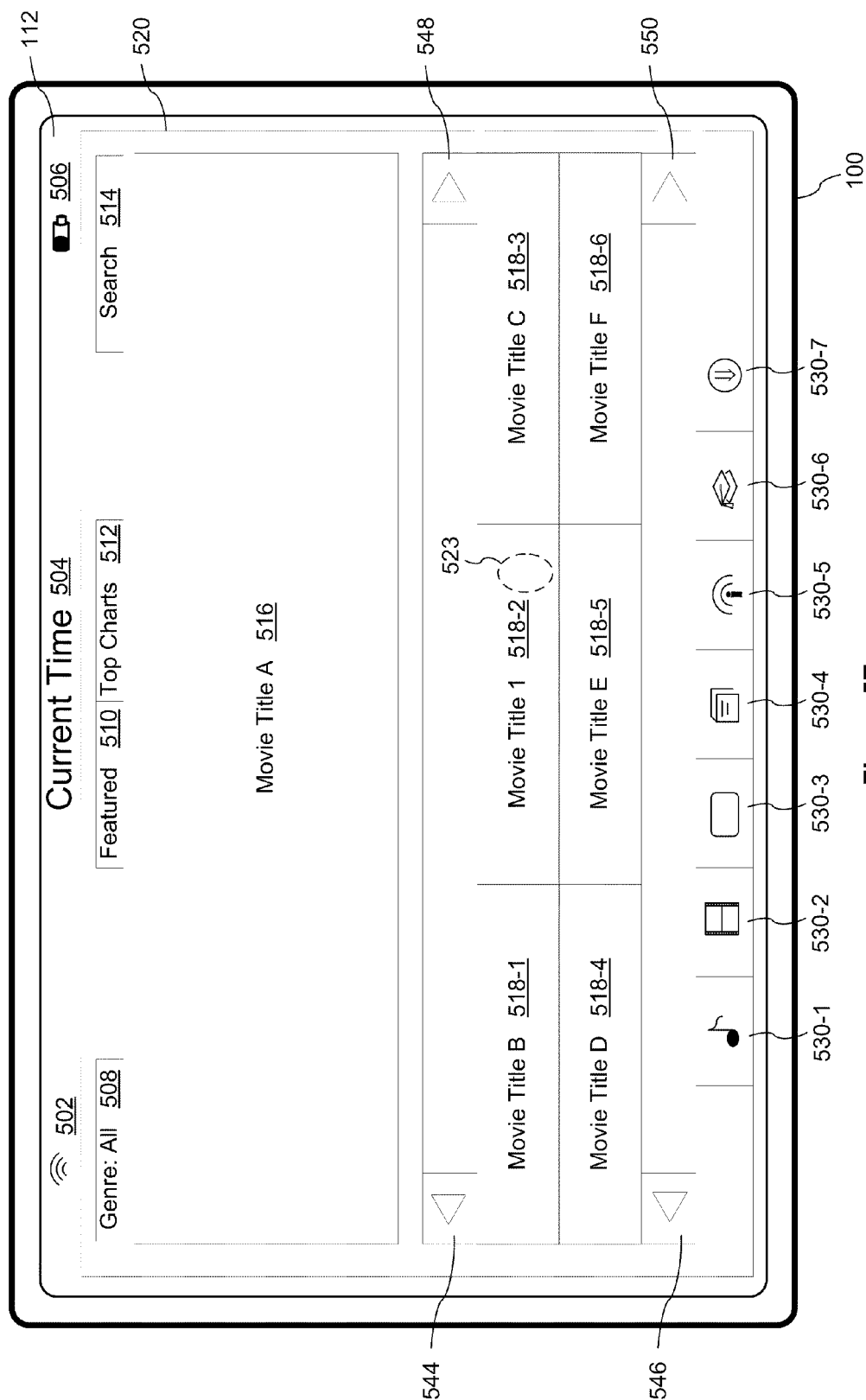
Figure 5A:
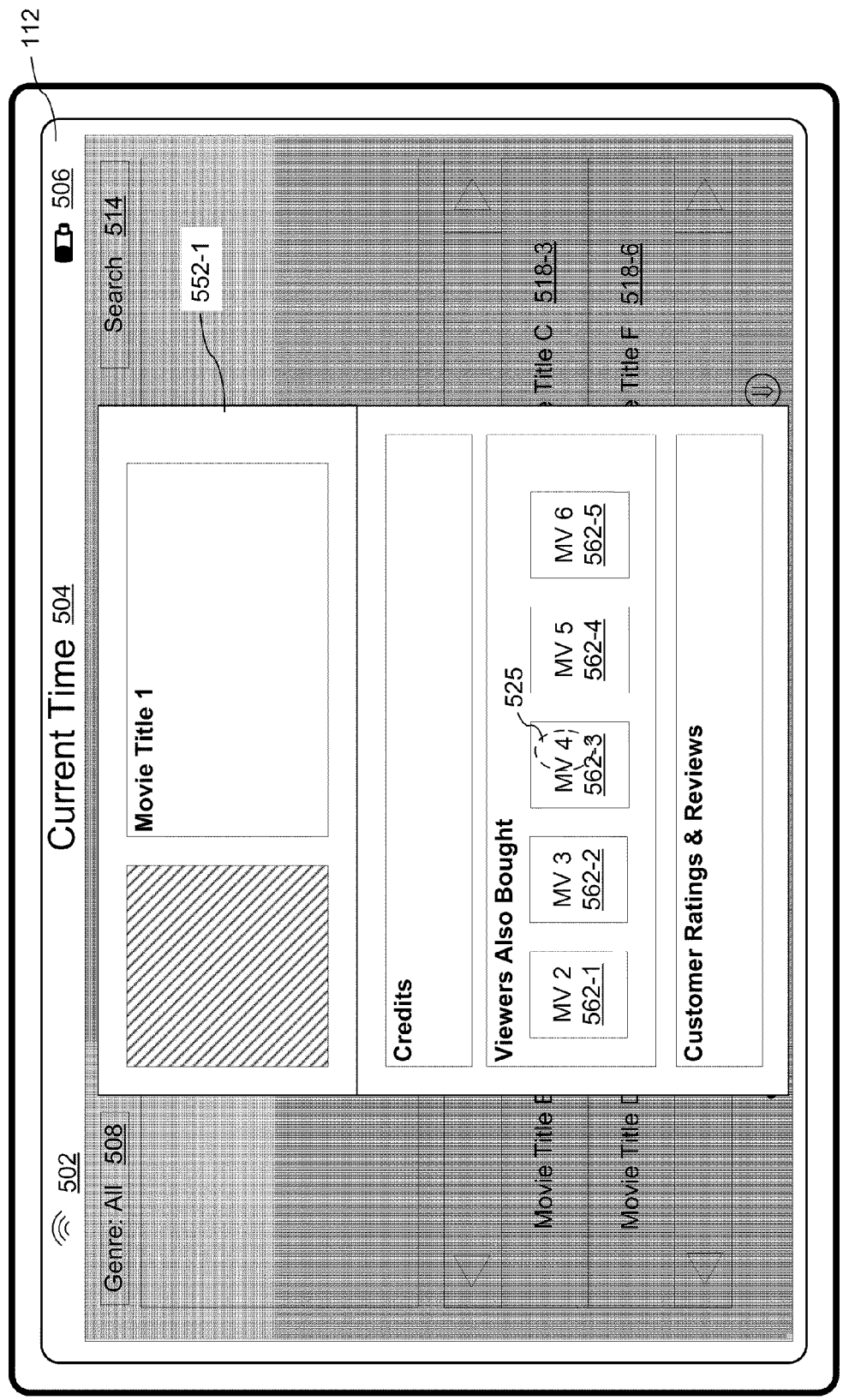
Figure 5B:
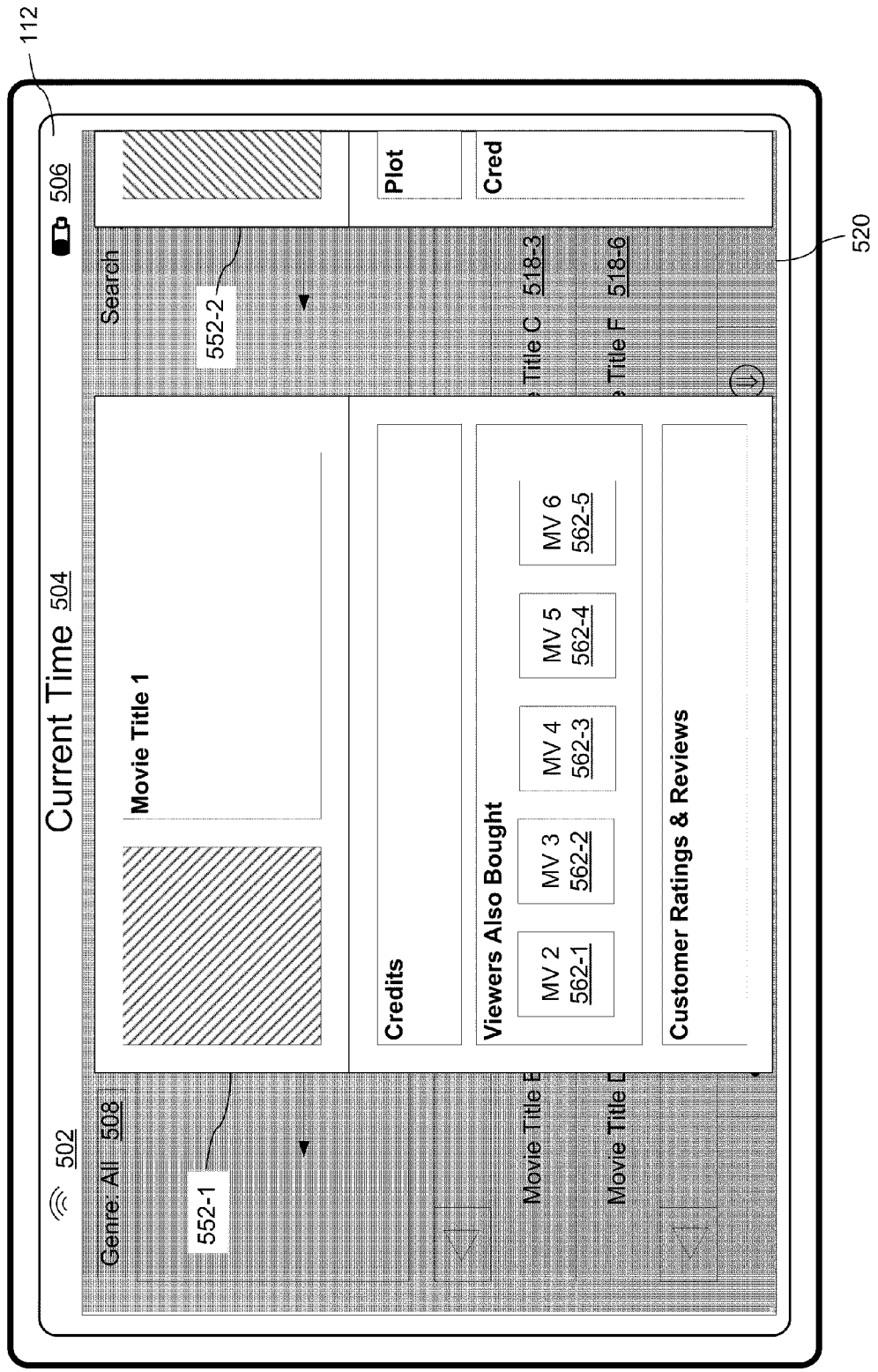
Figure 5C:
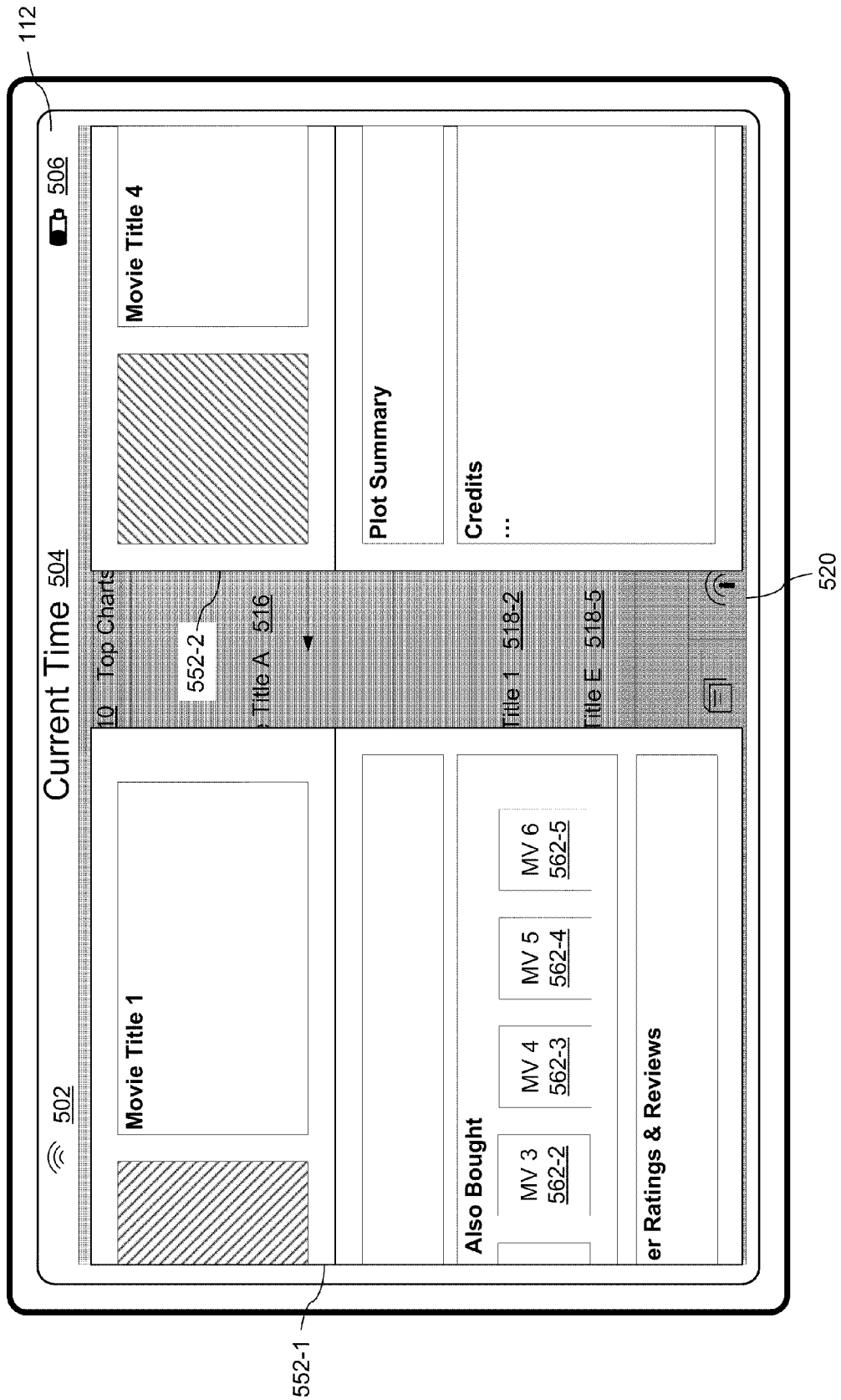
Figure 5D:
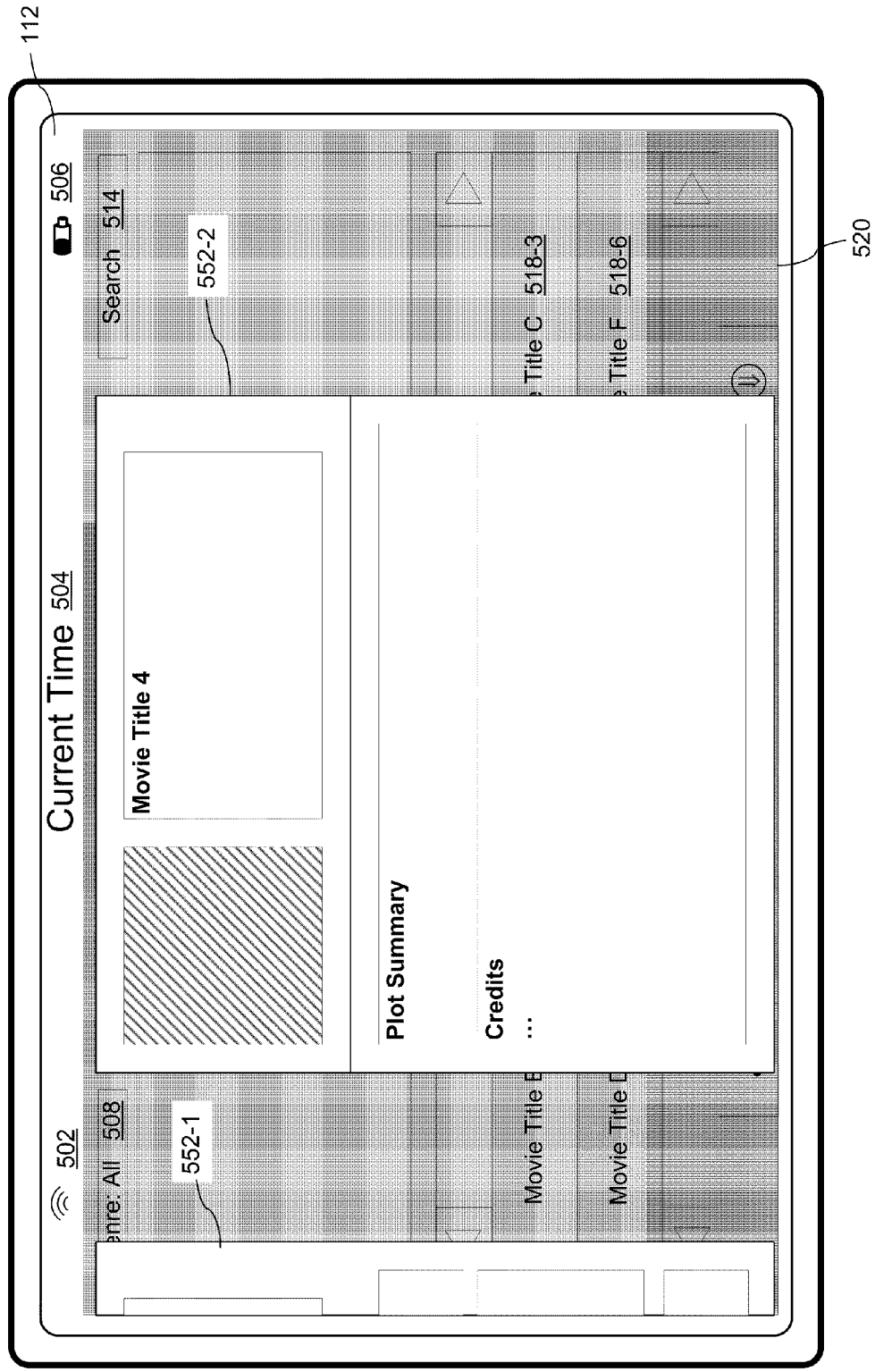
Figure 5E:
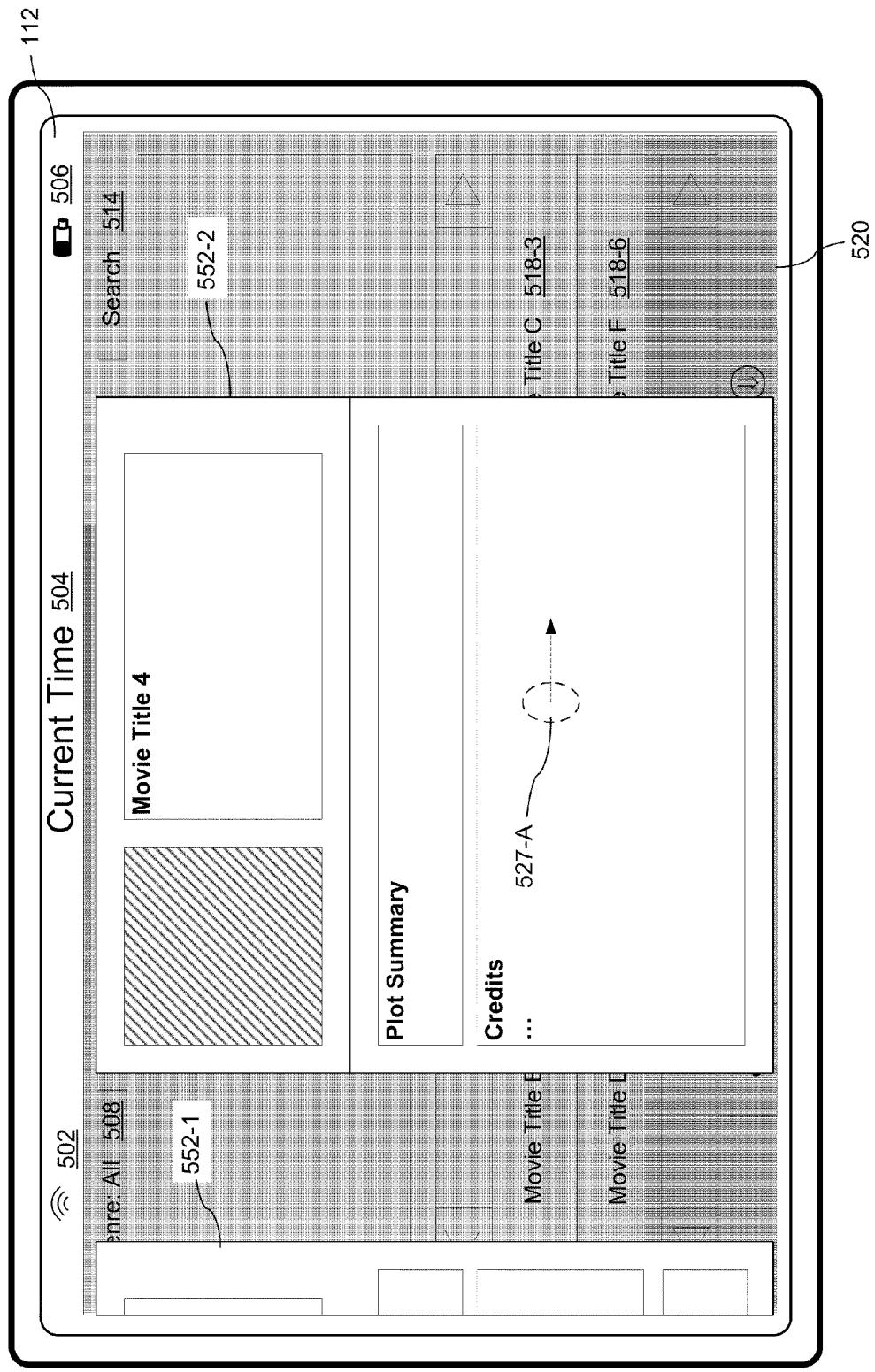
Figure 5F:
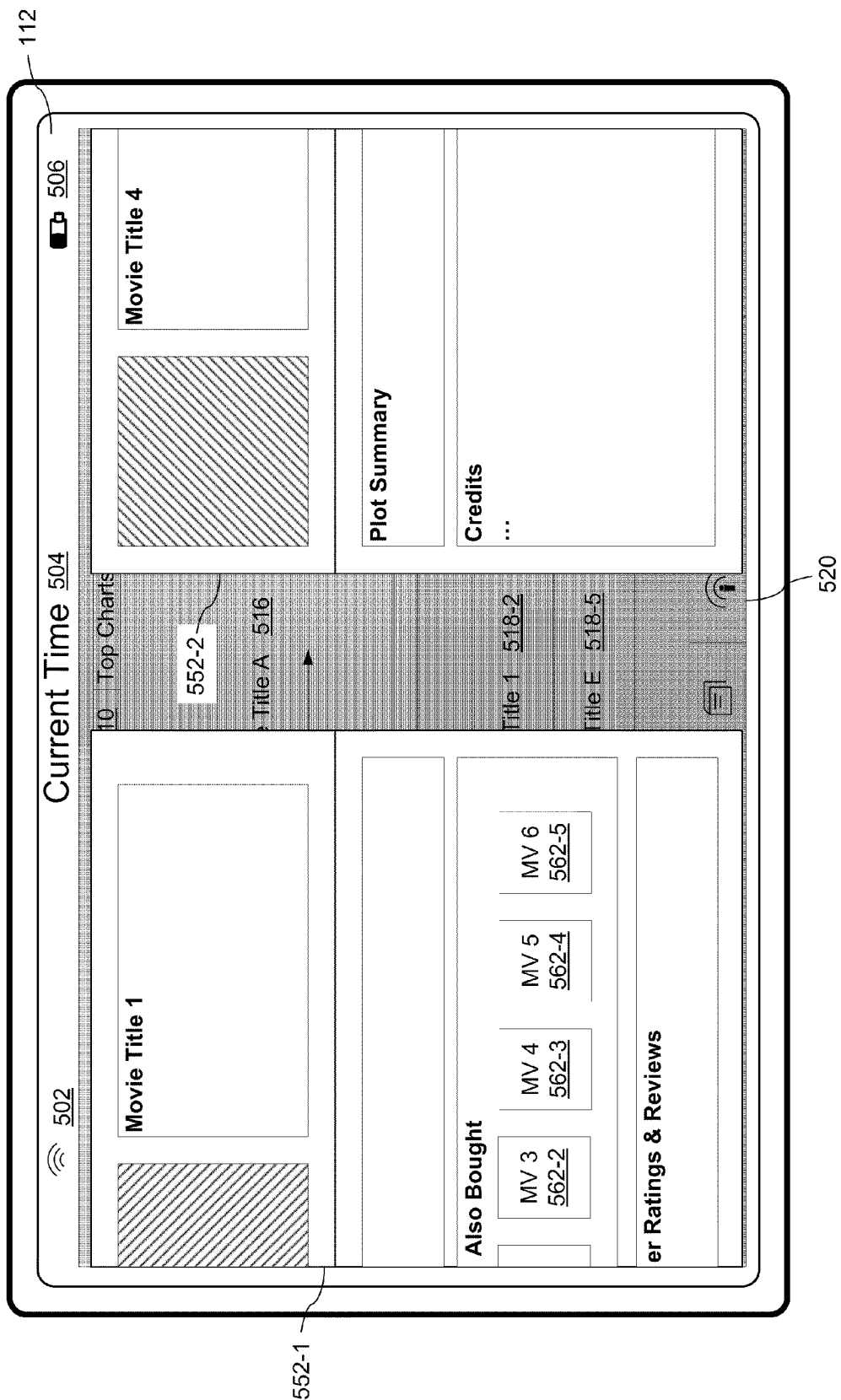
Figure 5G:
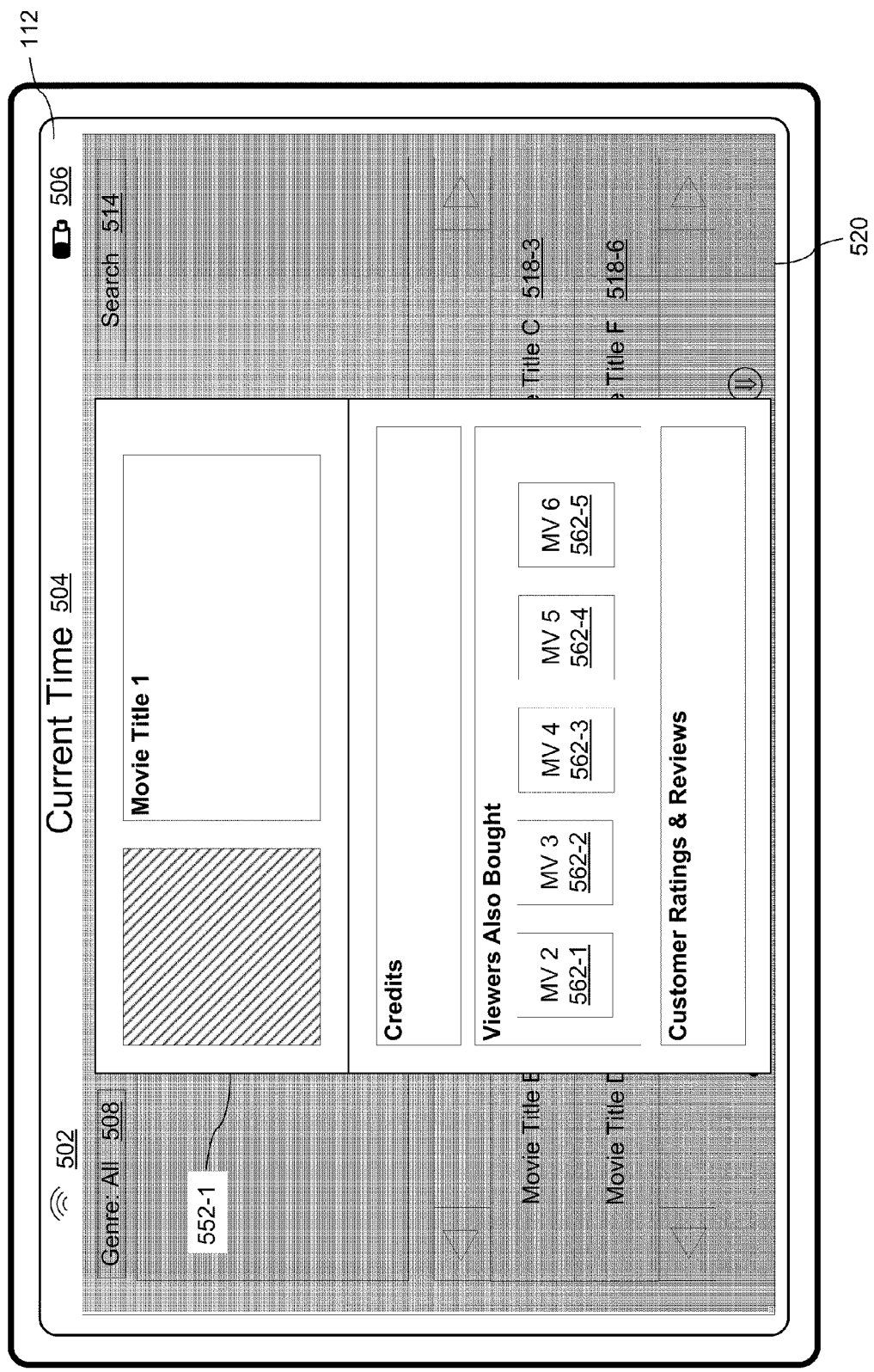
Figure 5H:
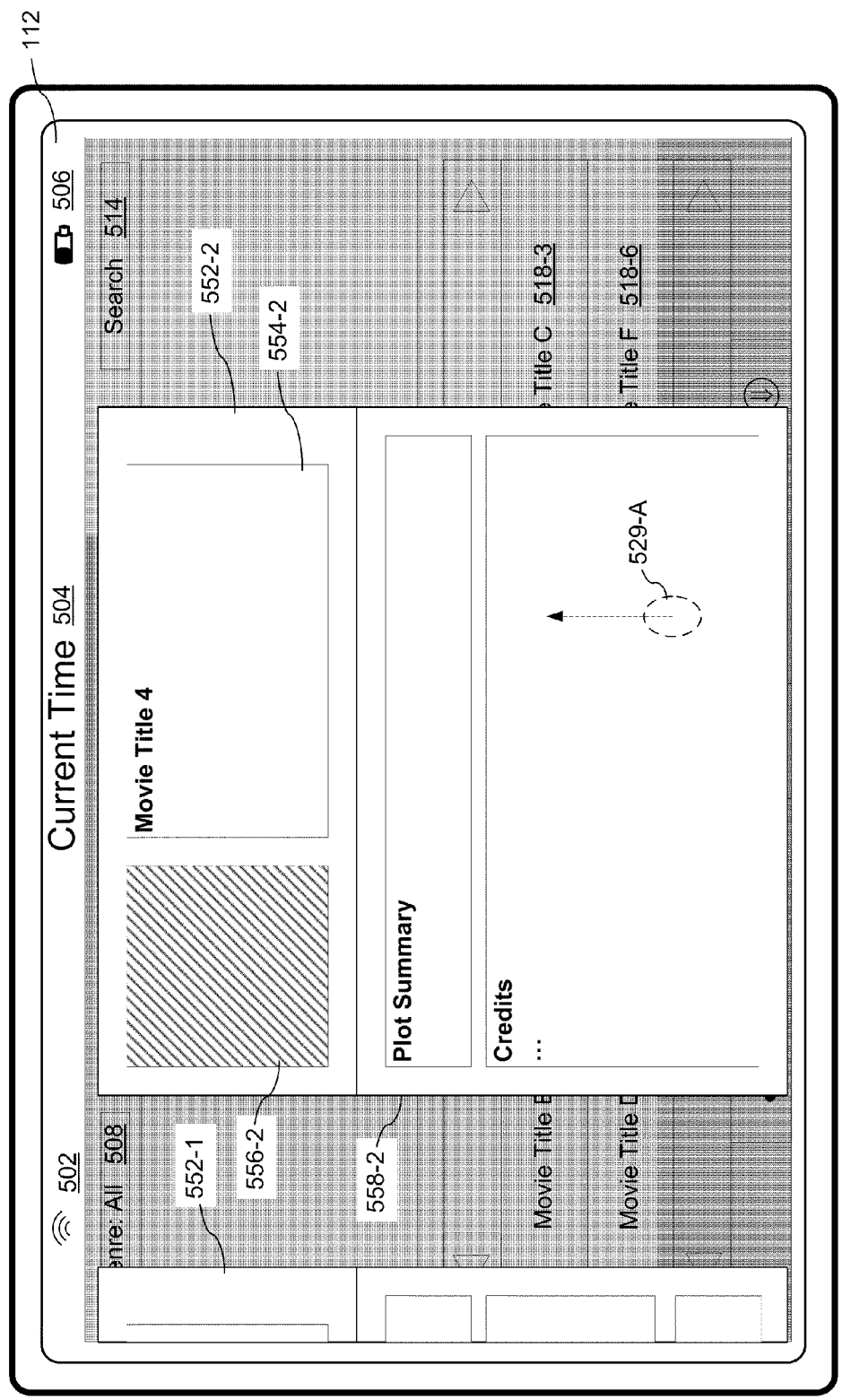
Figure 5I:
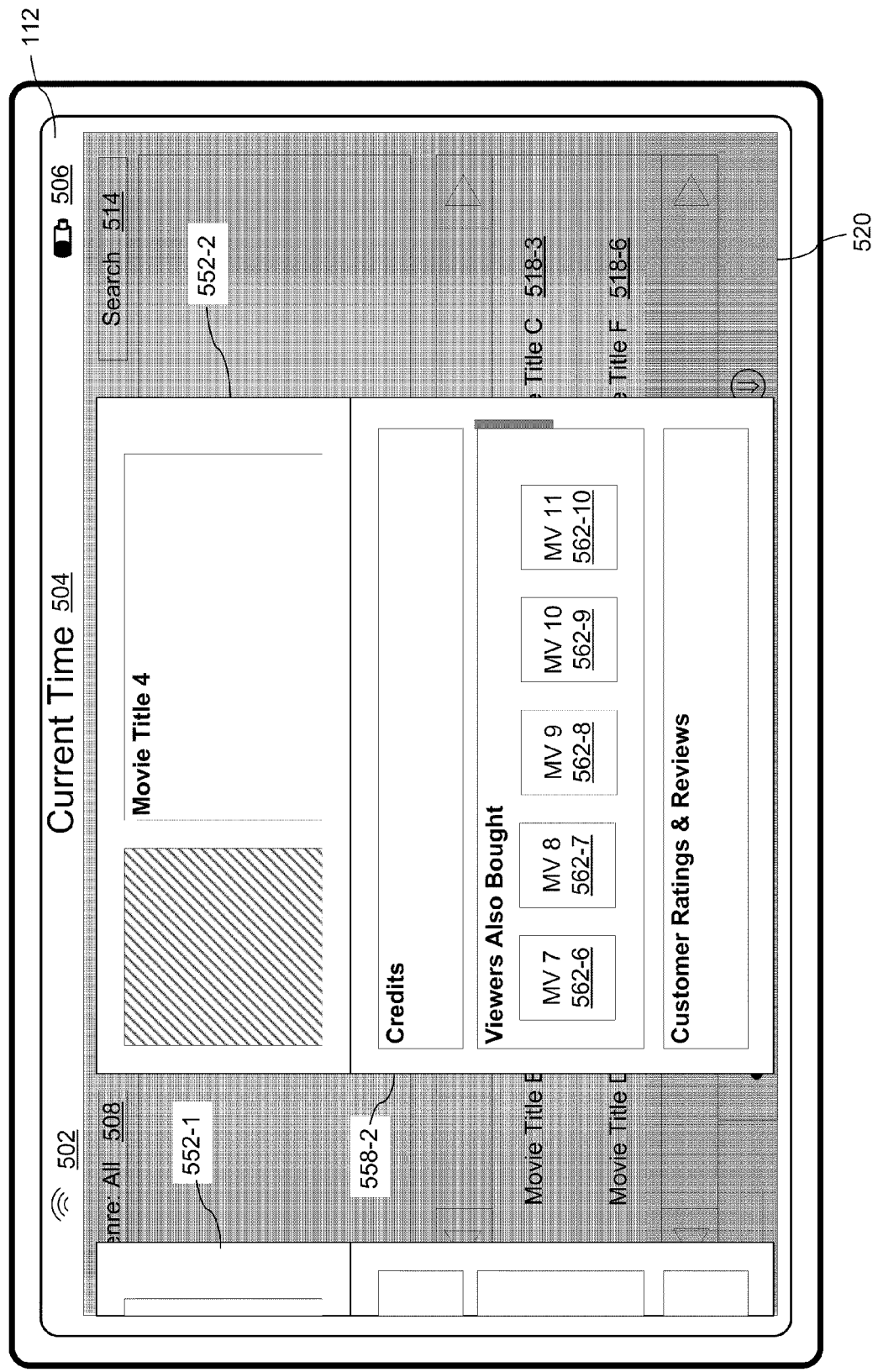
Figure 5J:
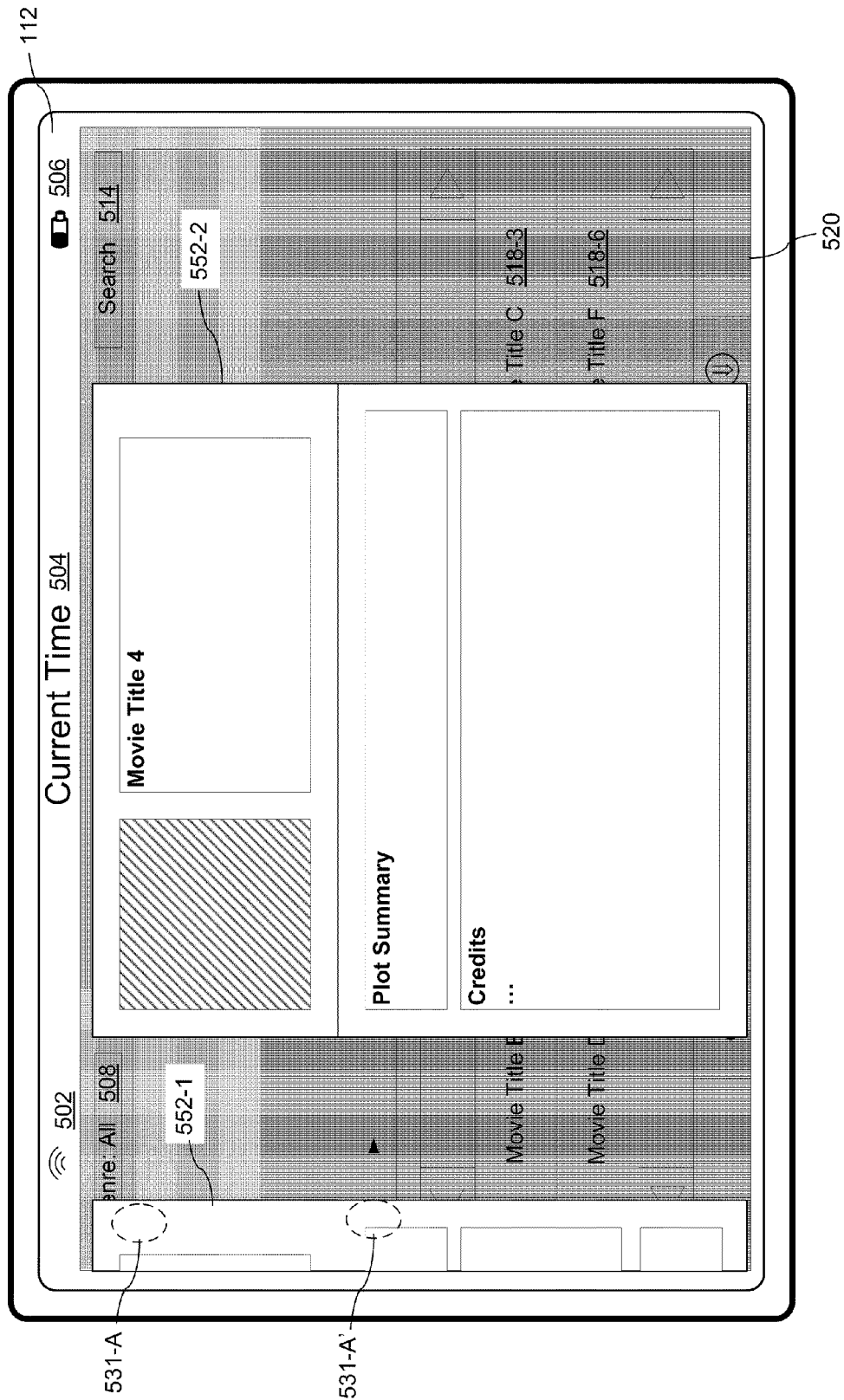
Figure 5K:
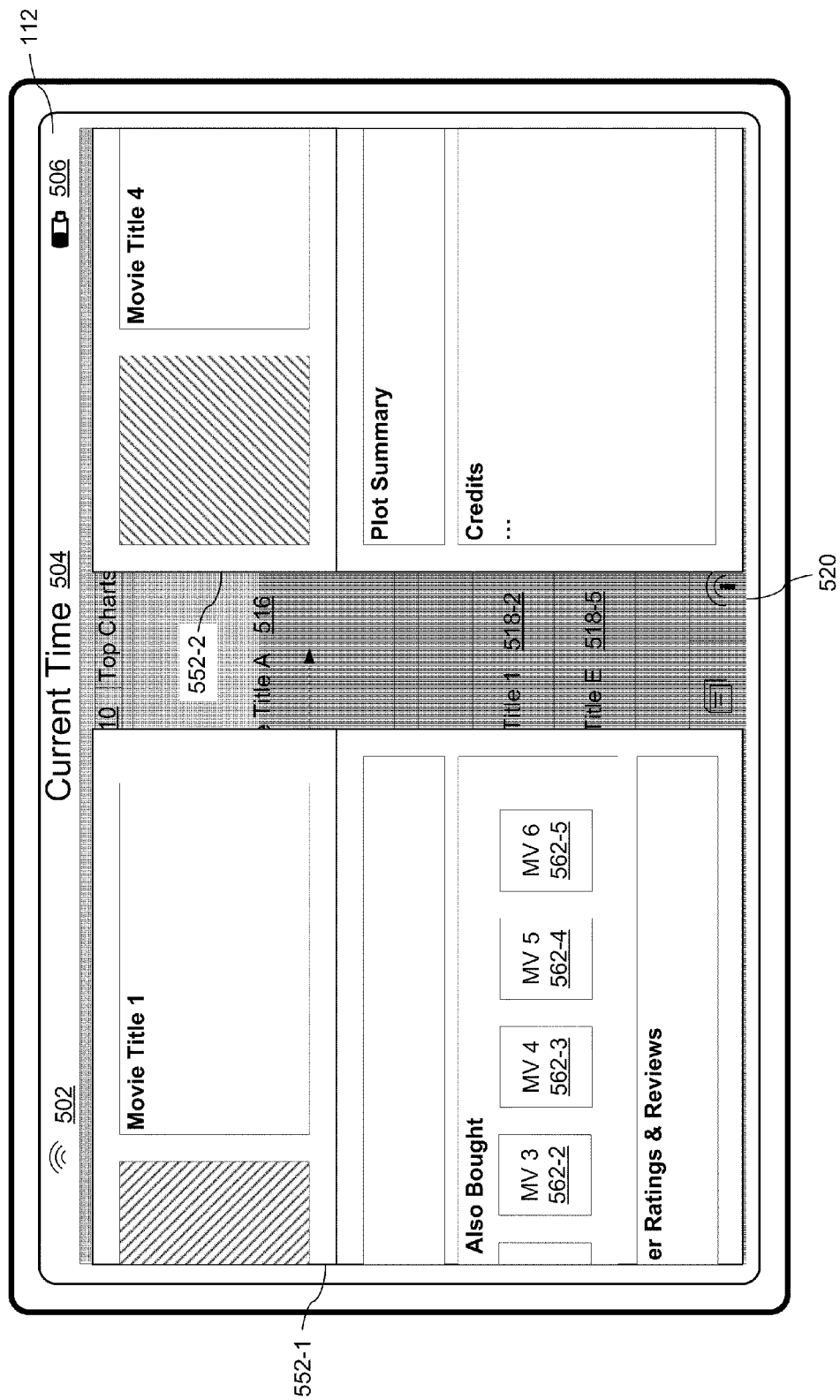
Figure 5L:
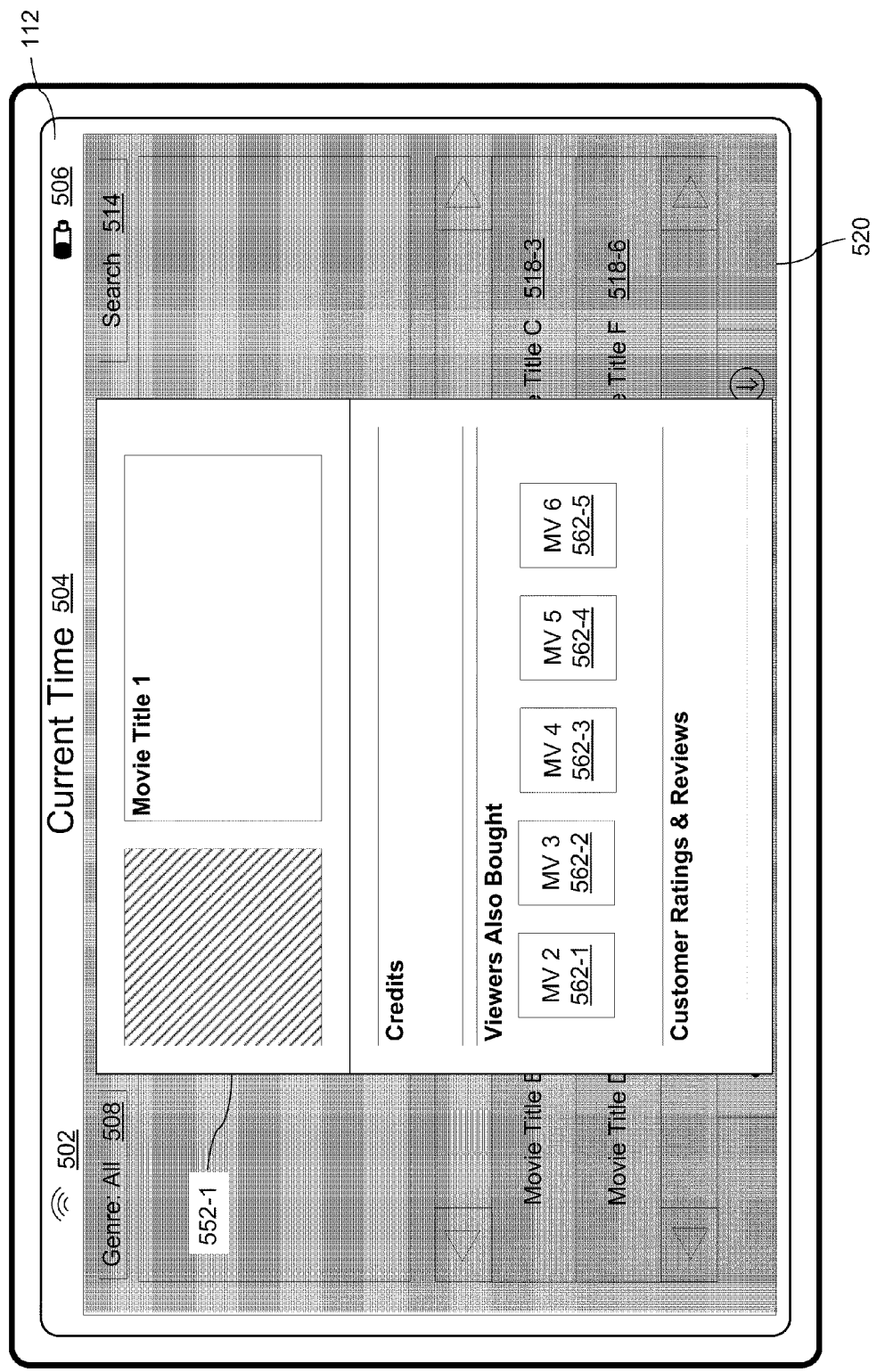
Figure 5M:
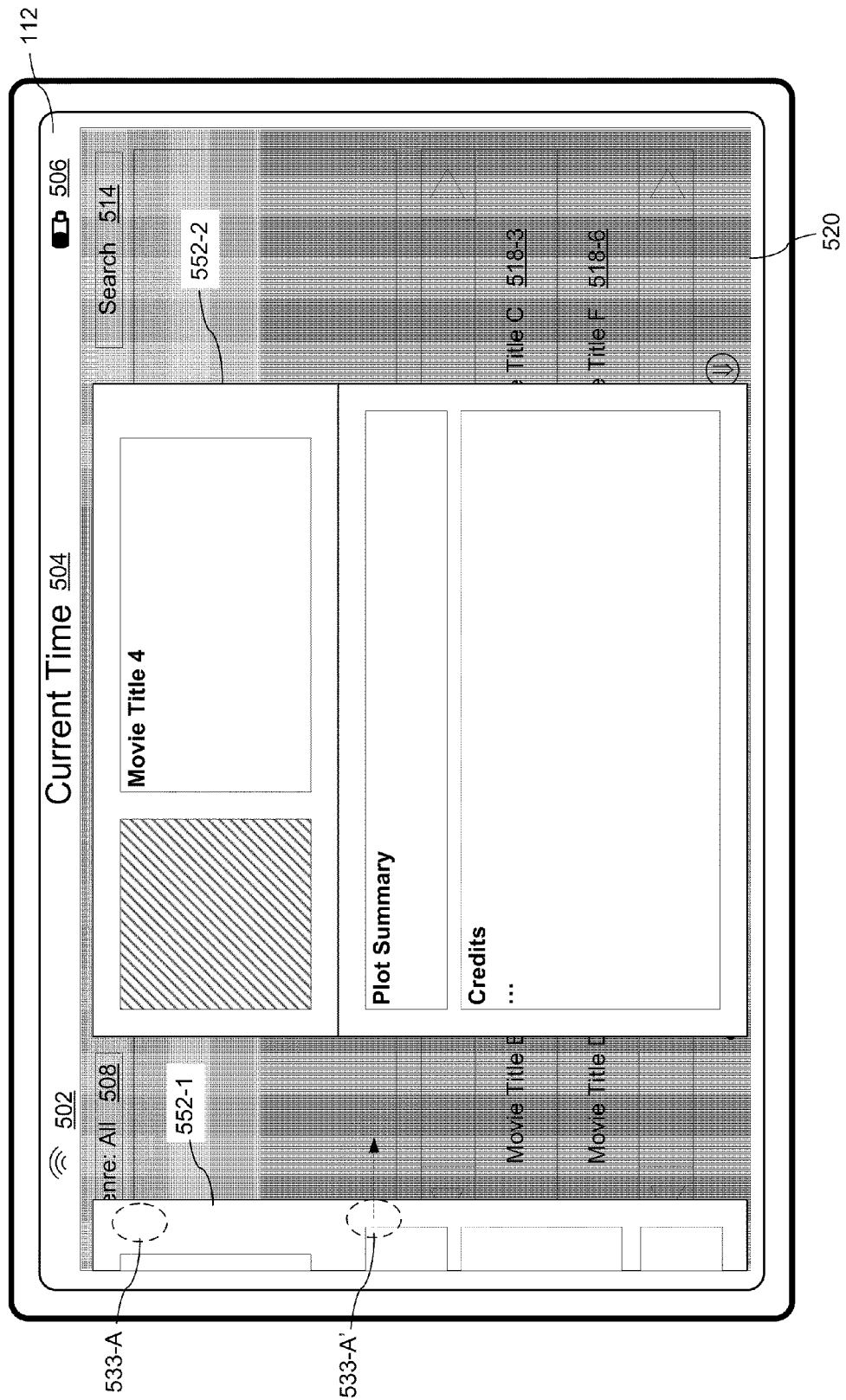
Figure 5O:
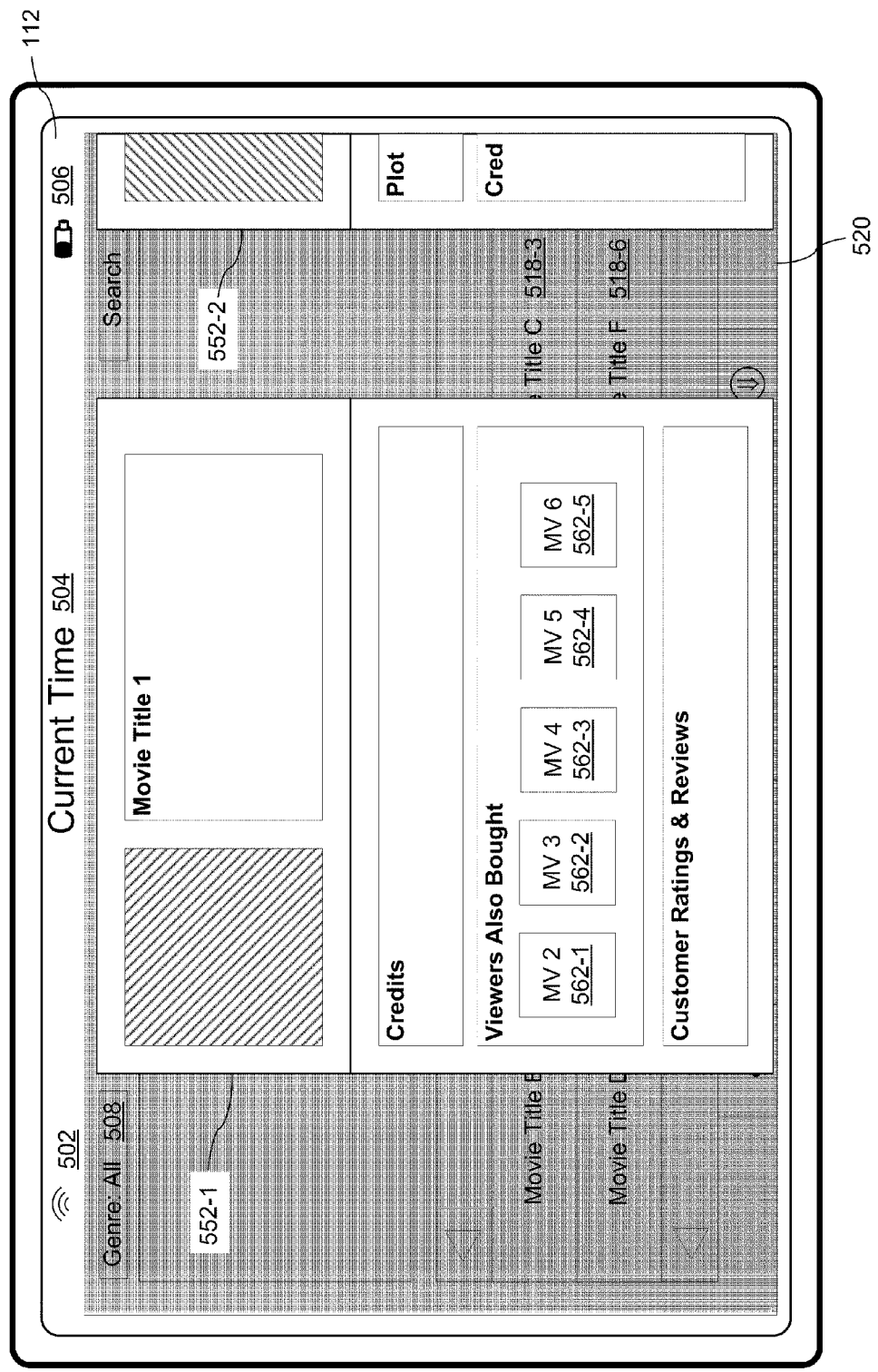
Figure 5P:
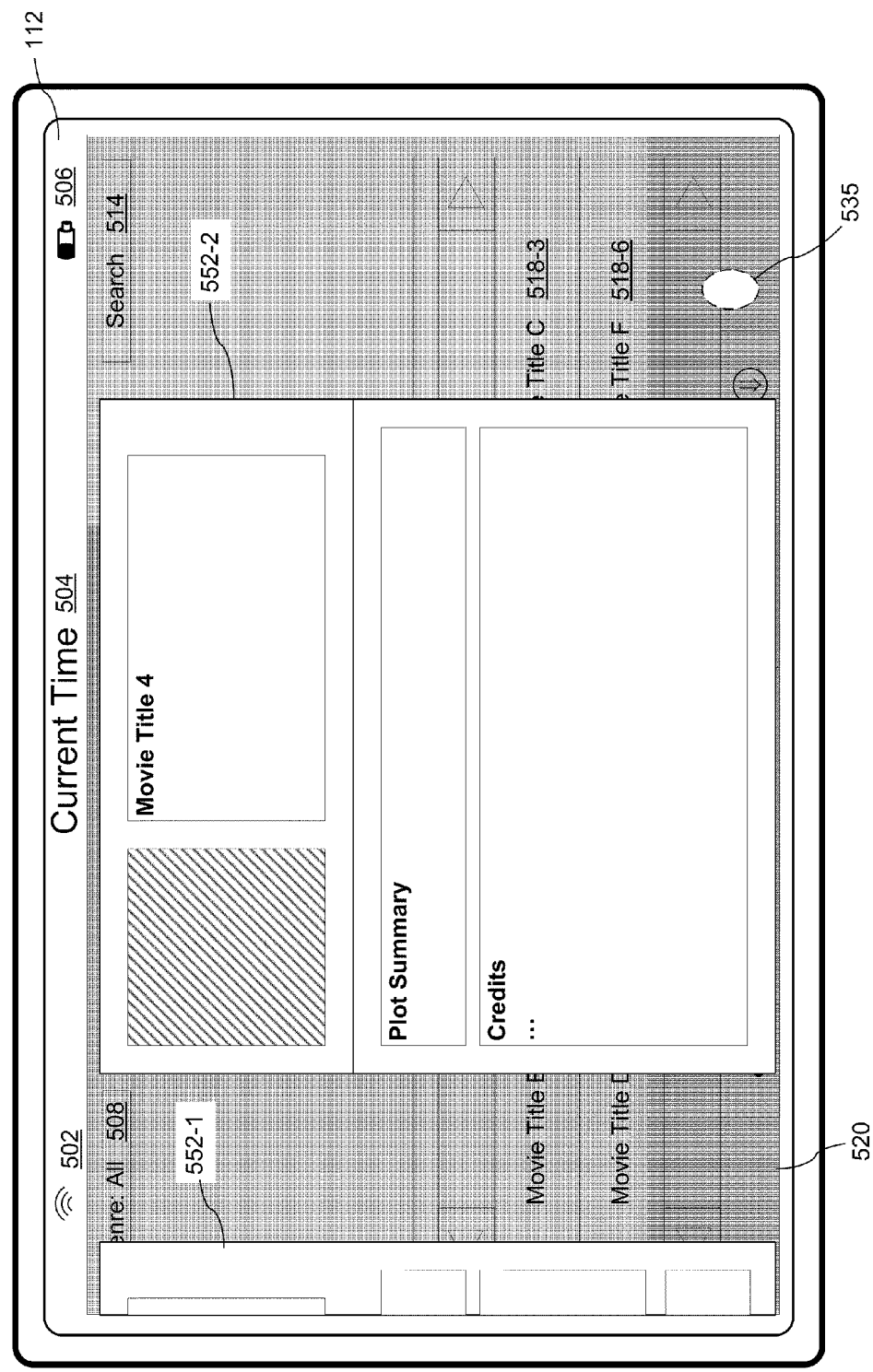
Figure 5Q:
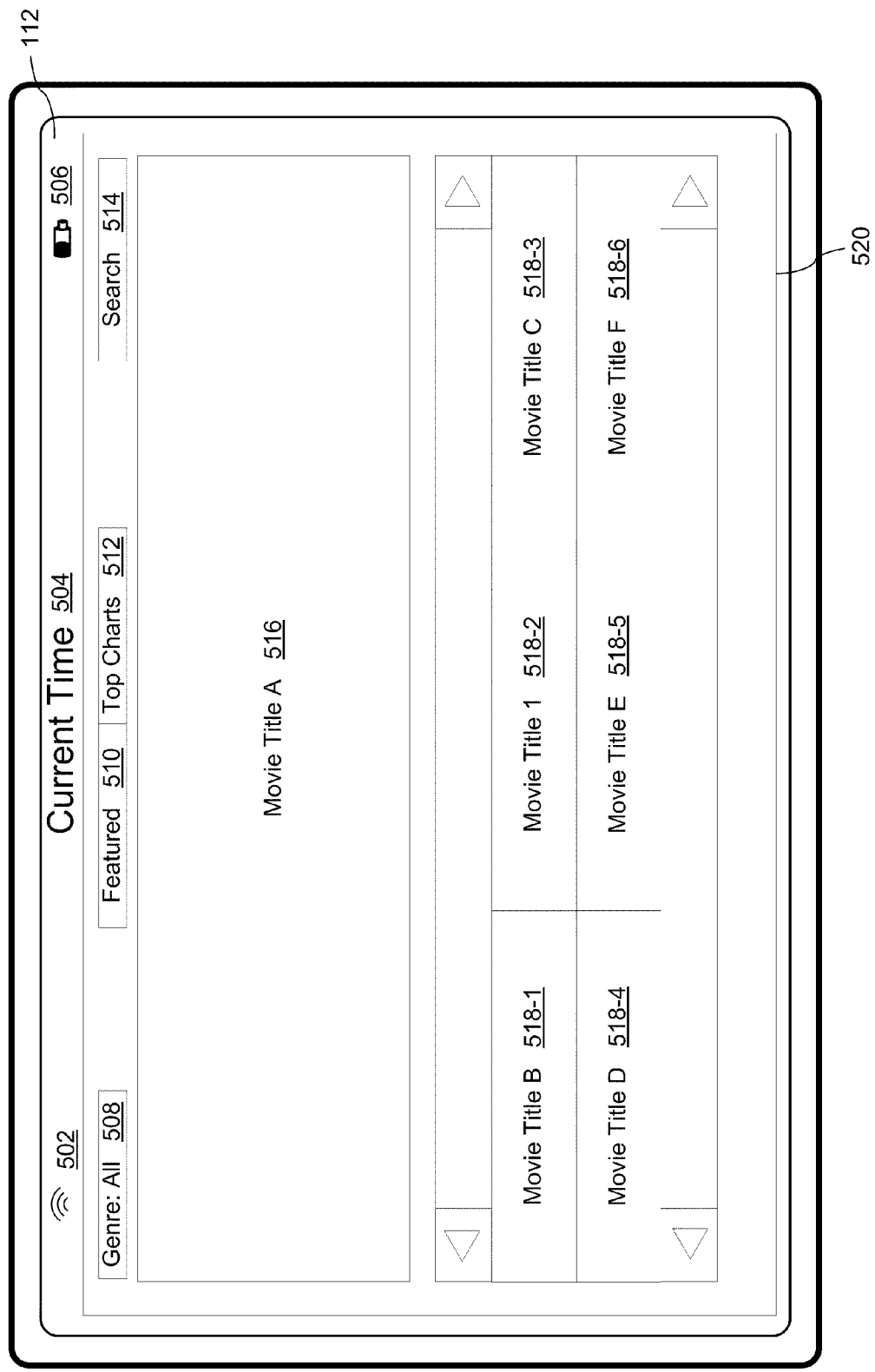
Figure 5R:
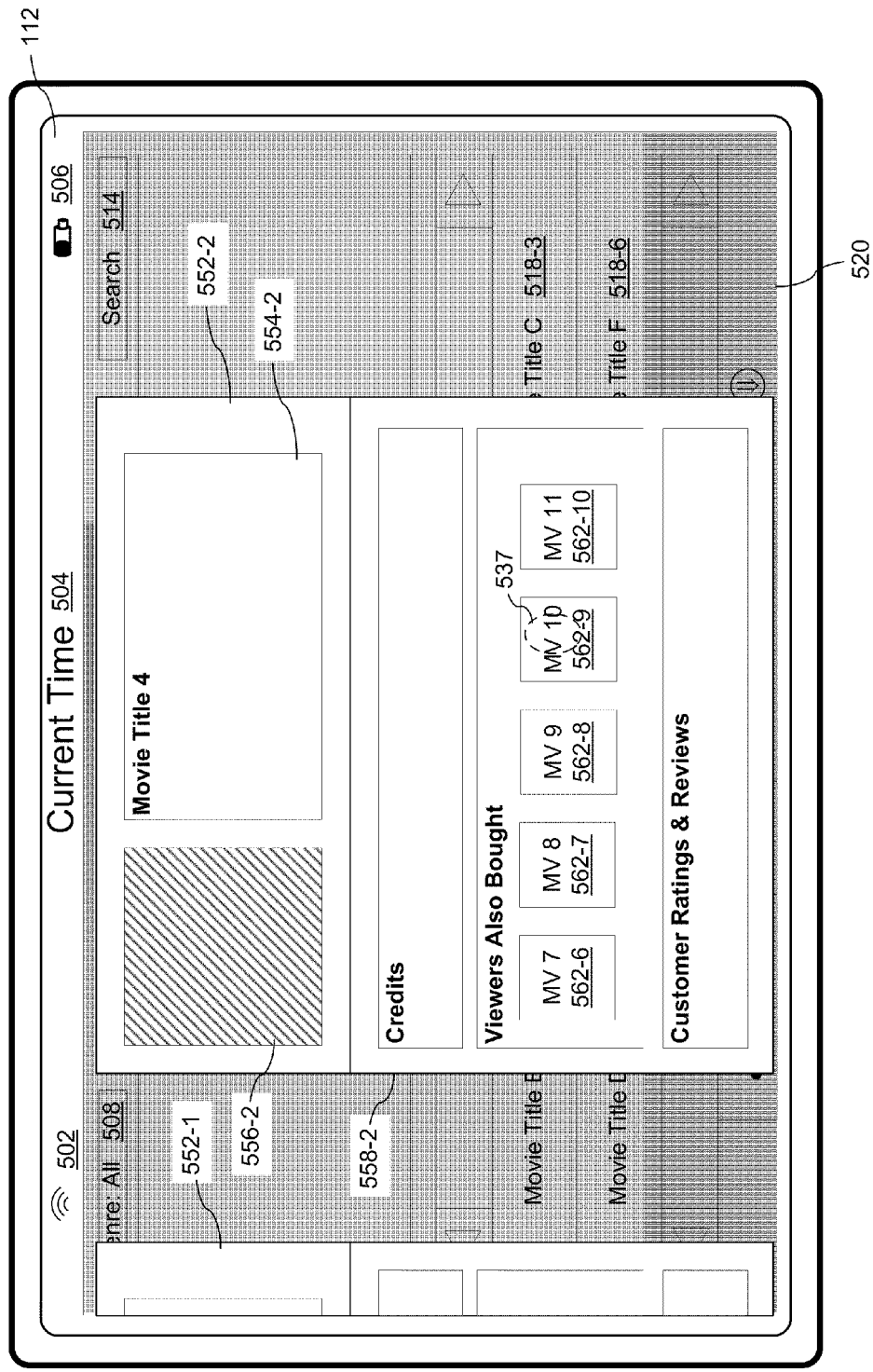
Figure 5S:
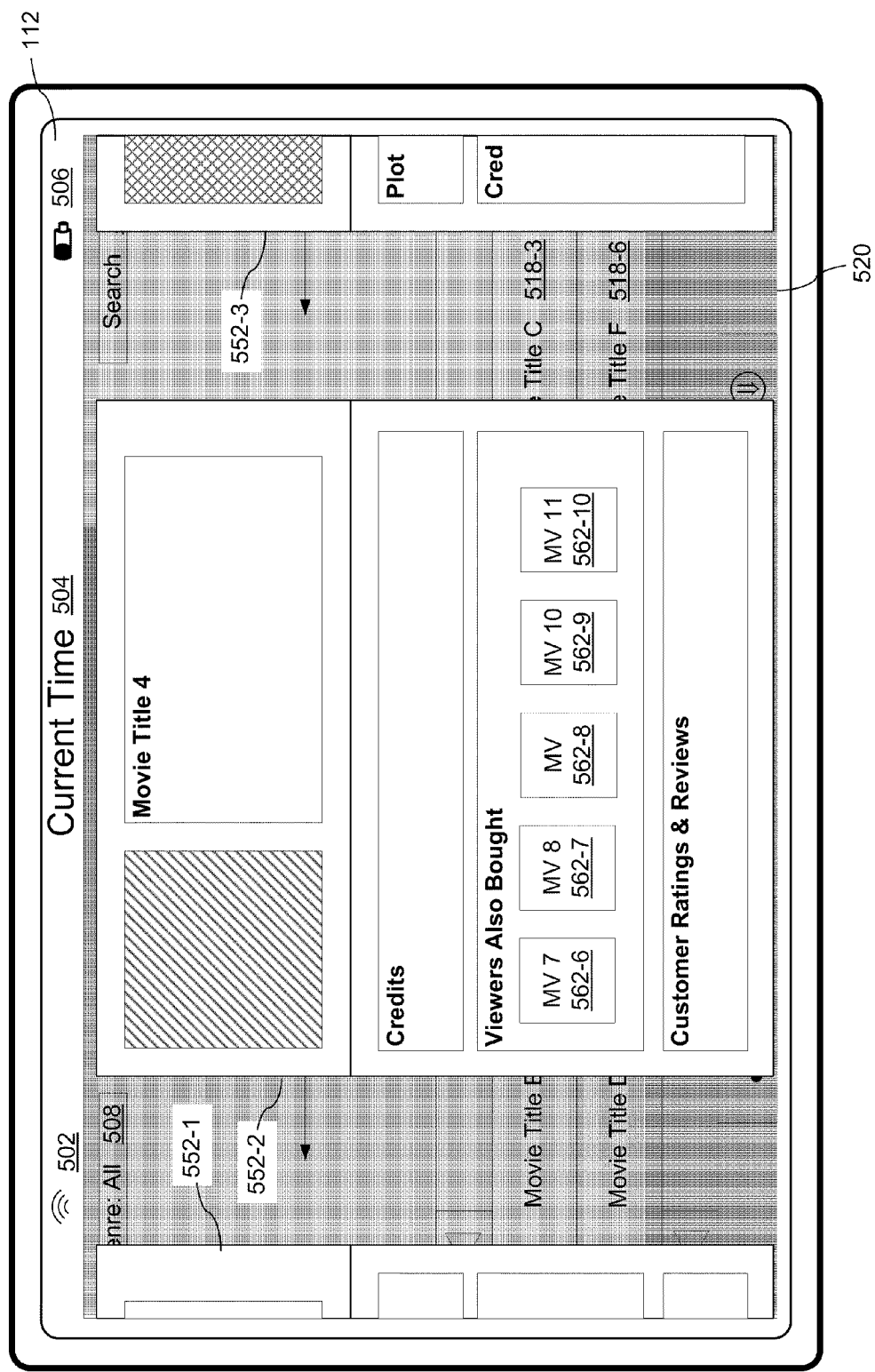
Figure 5T:
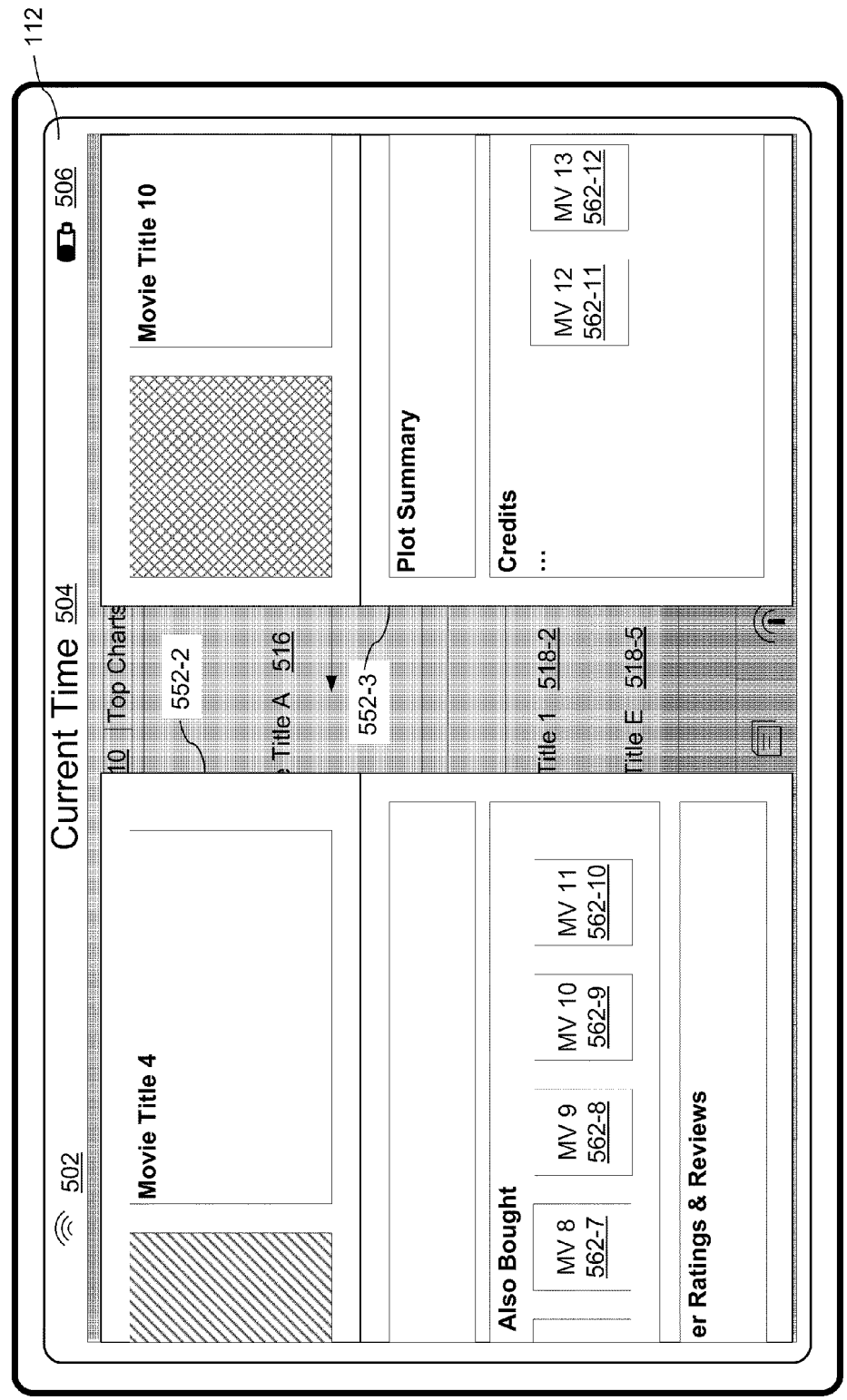
Figure 5U:
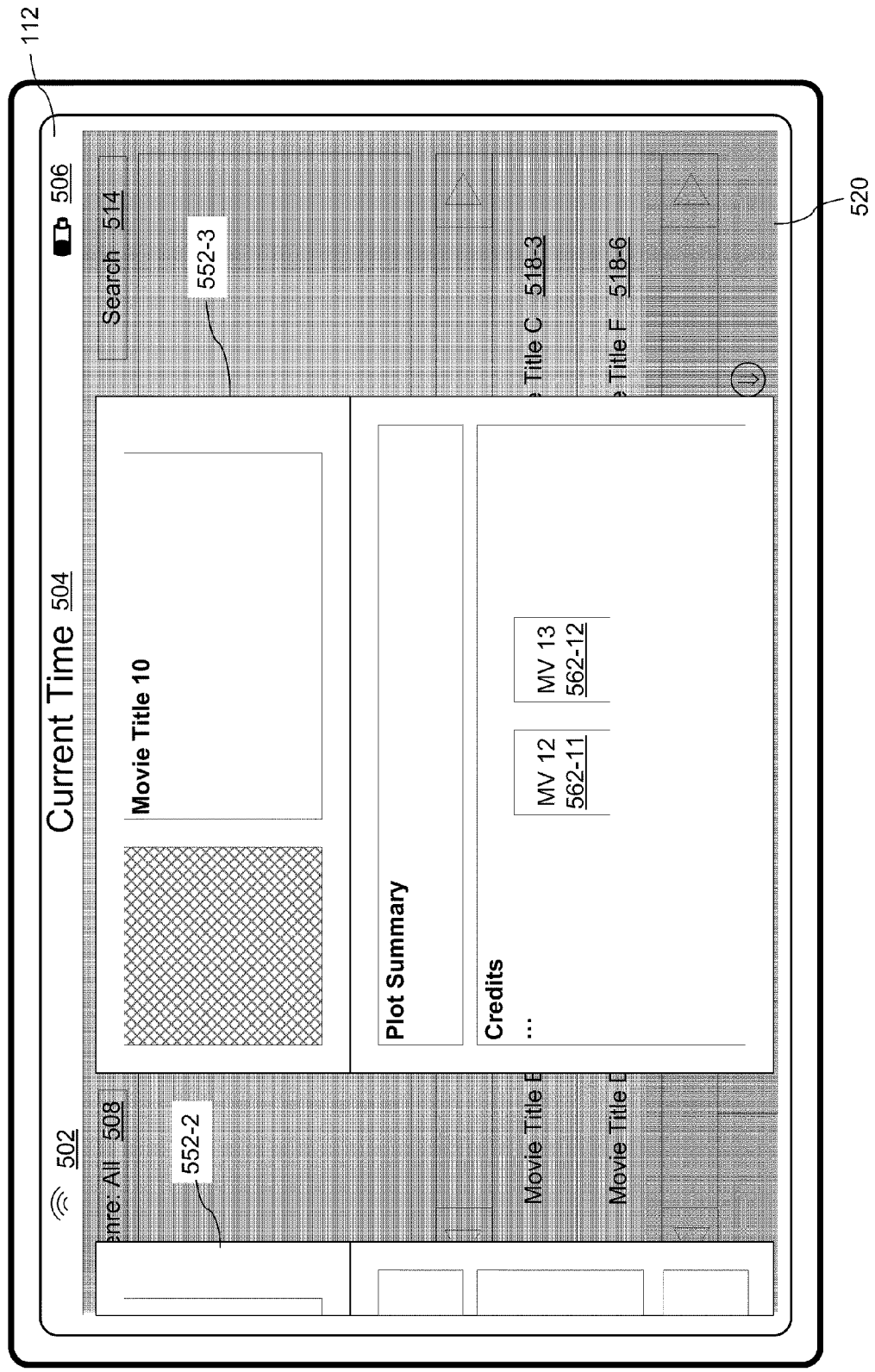
Figure 5V:
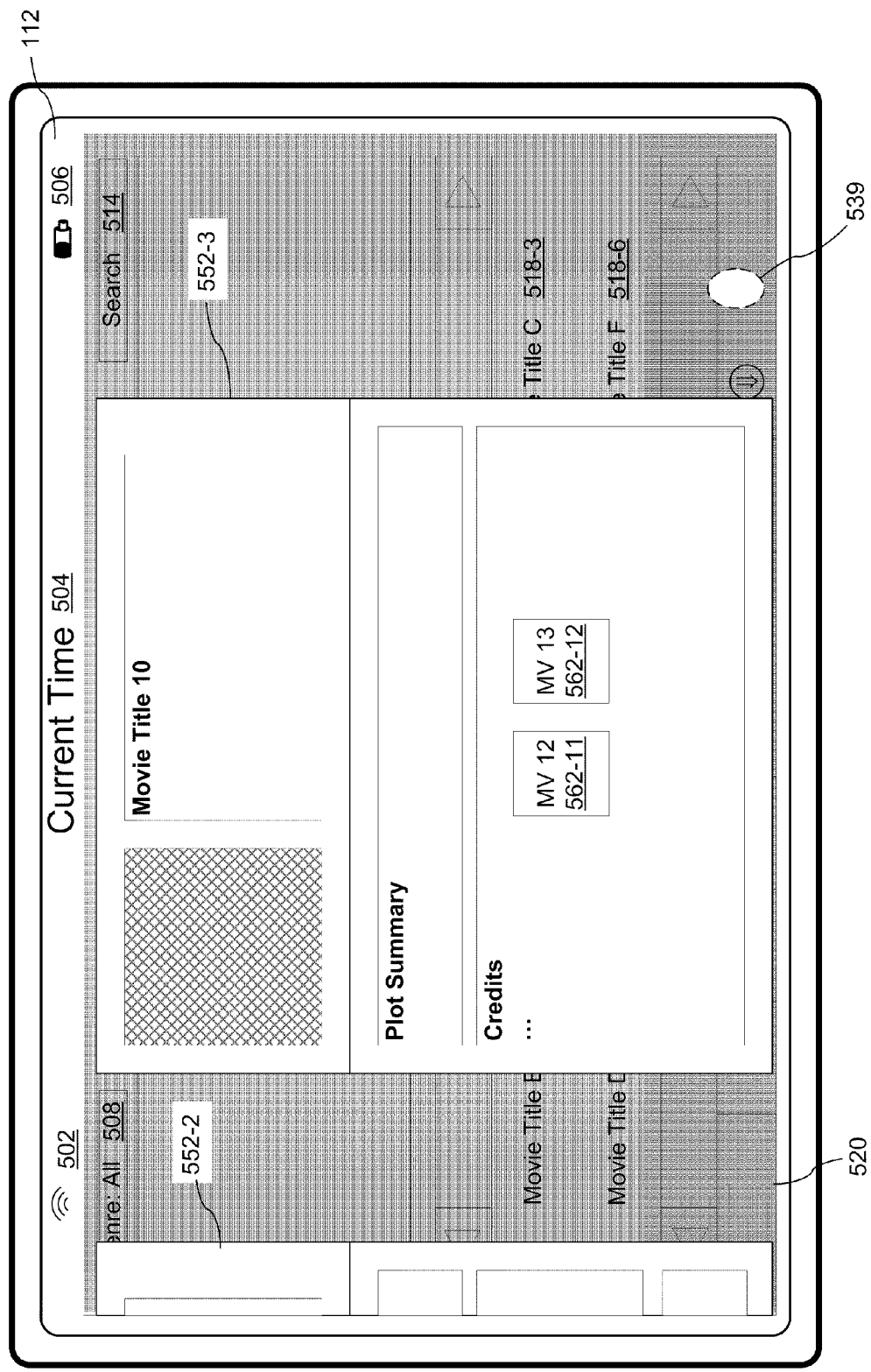
Figure 5W:
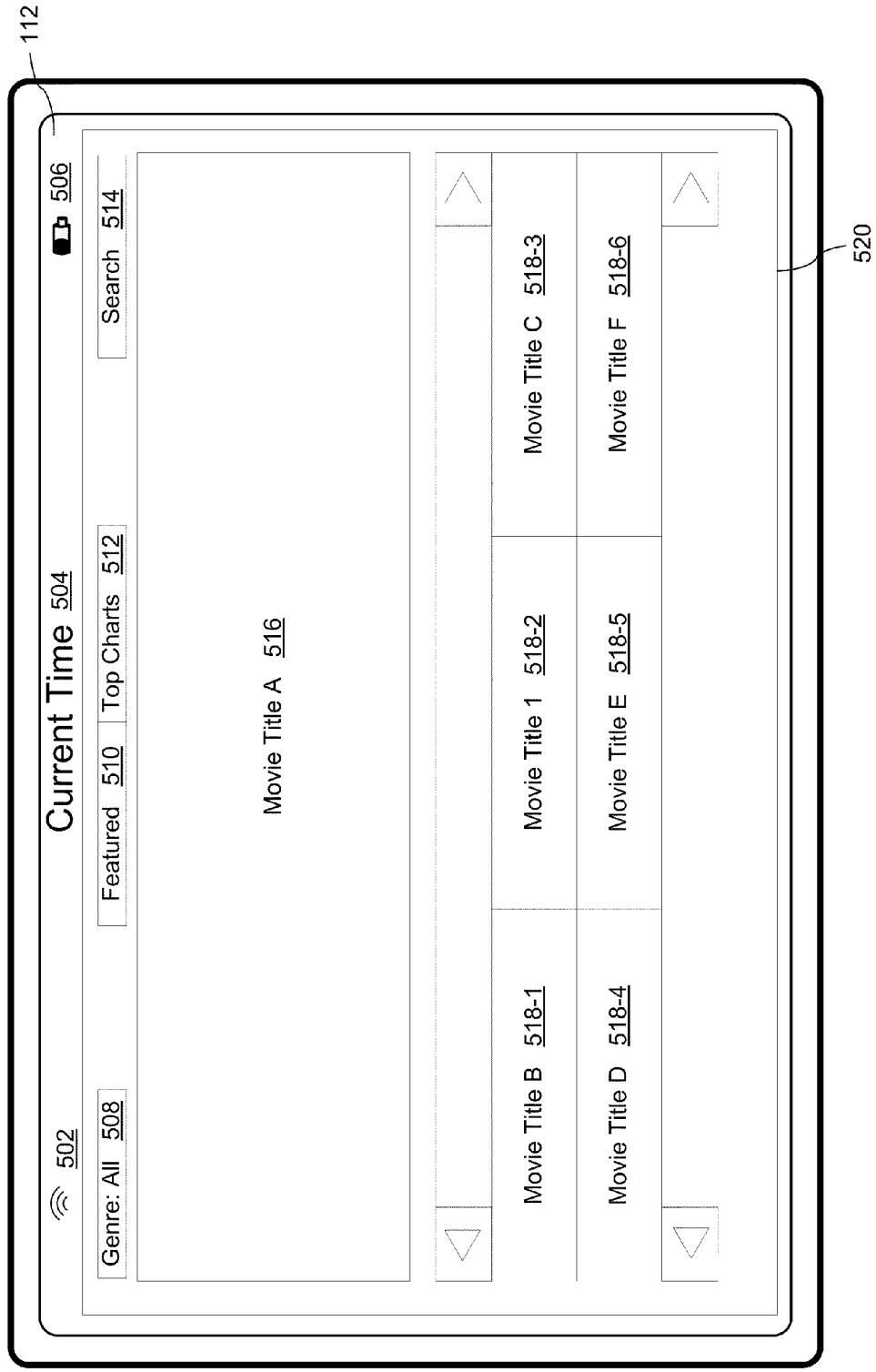
Figure 5X:
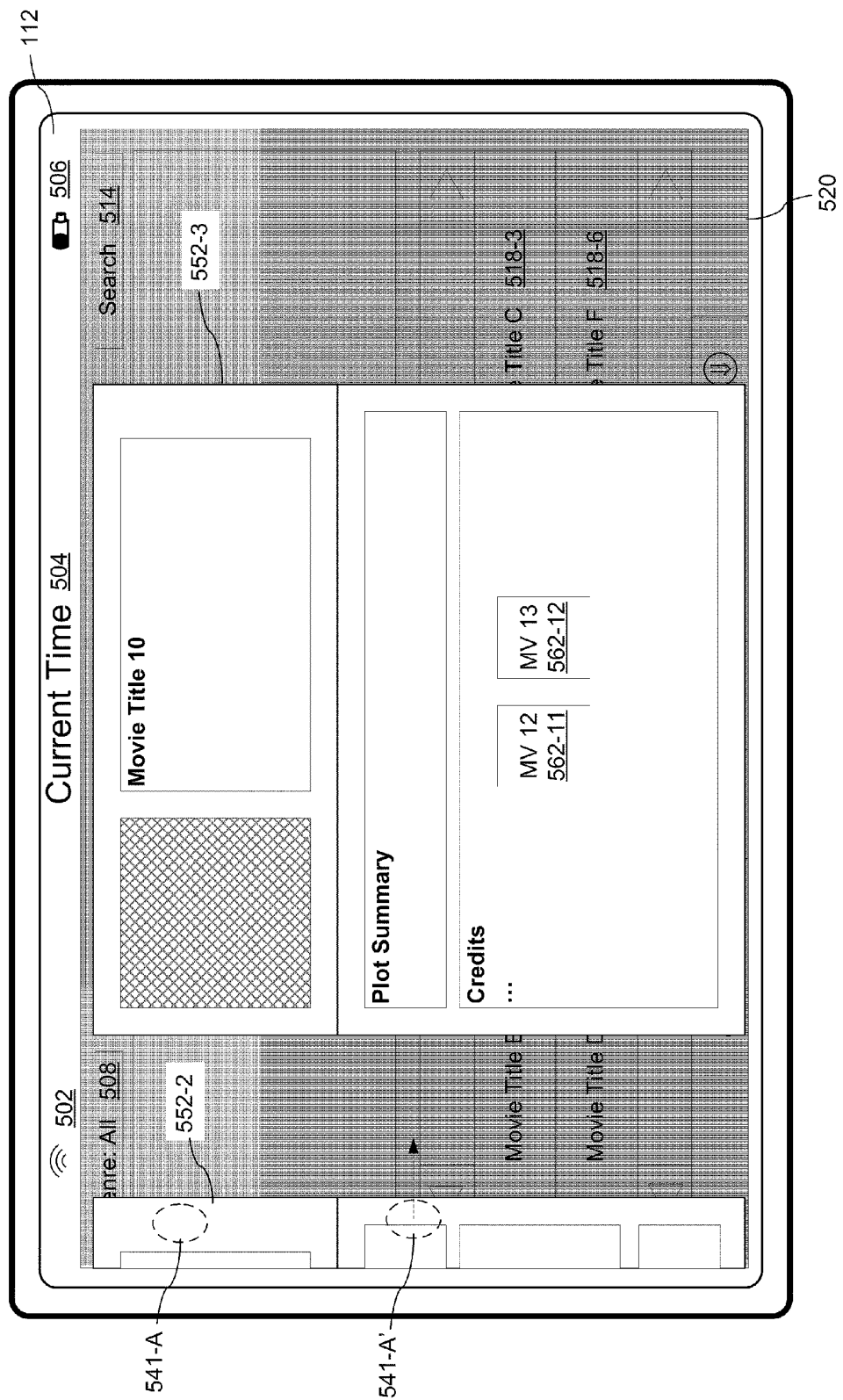
Figure 5Y:
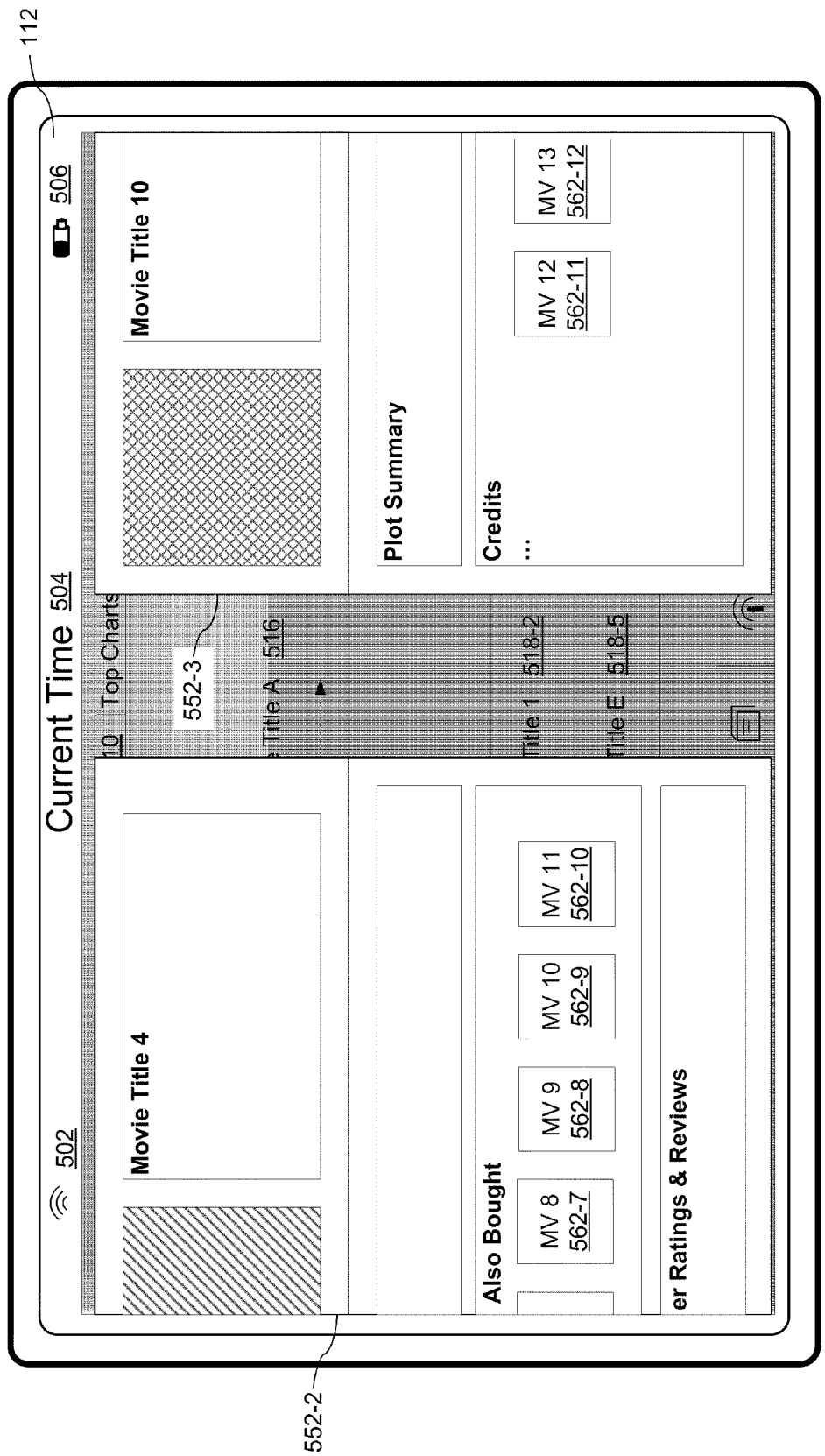
Figure 5Z:
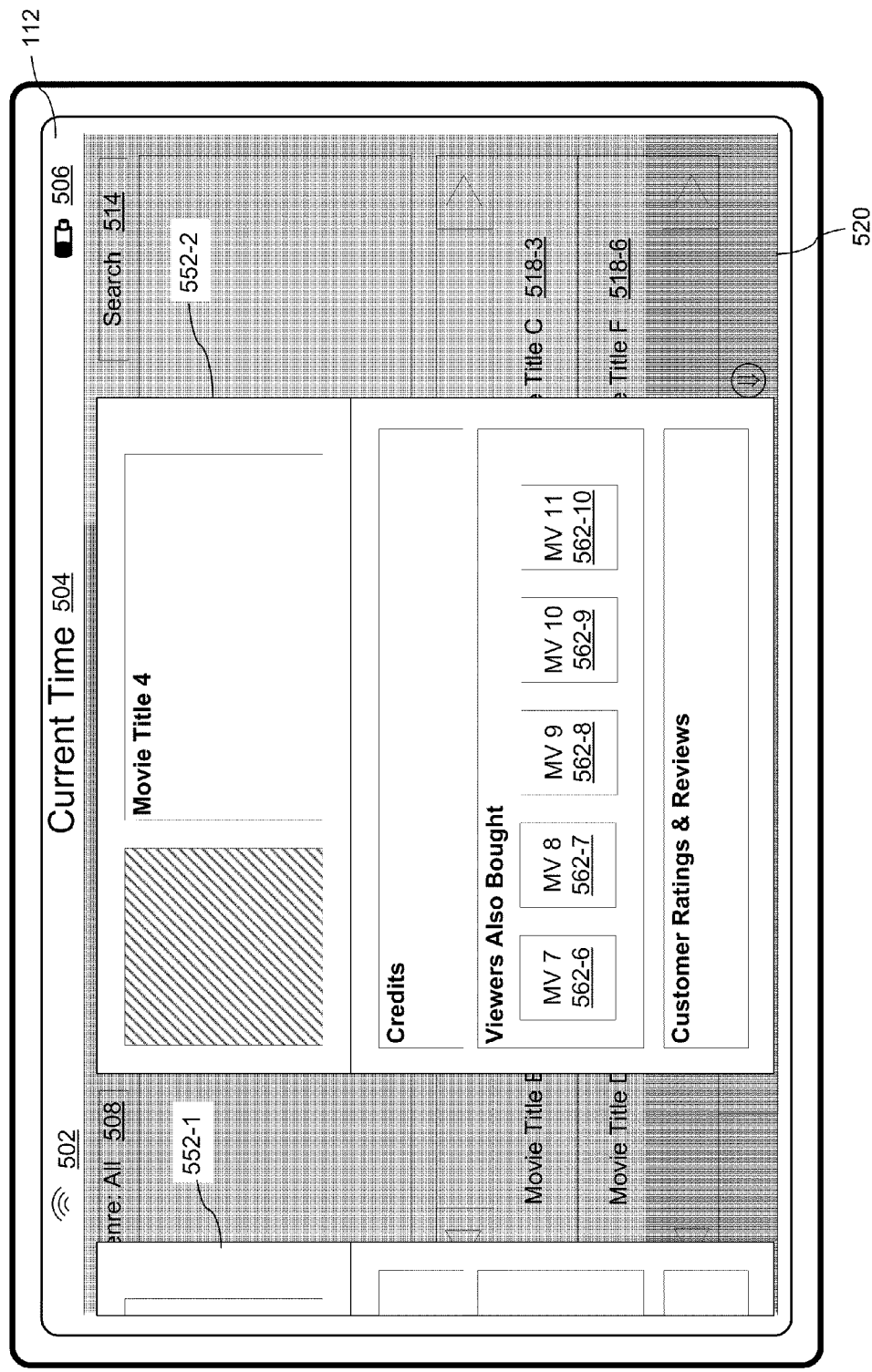
Figure 6A:
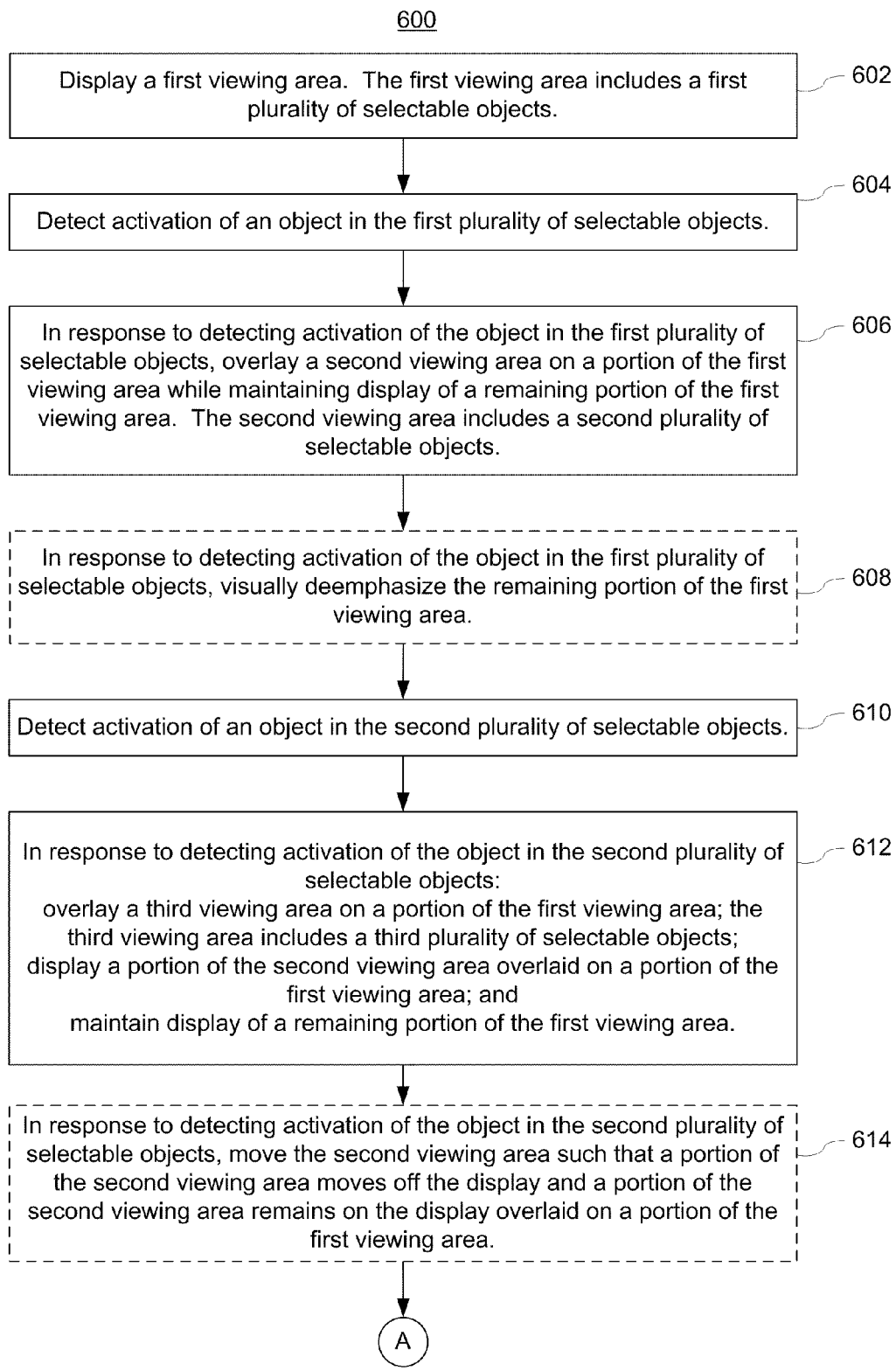
Figure 6B:
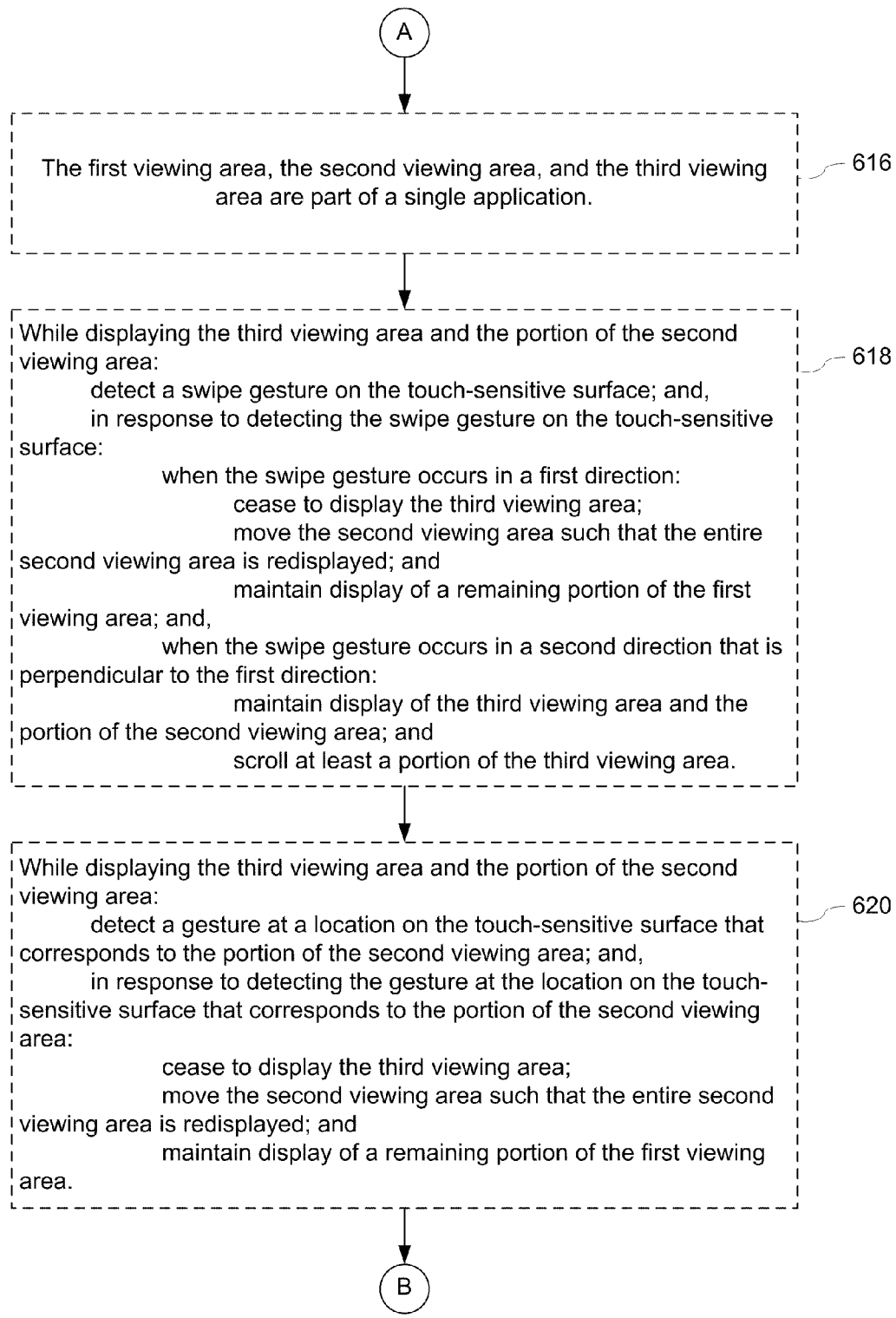
Figure 6C:
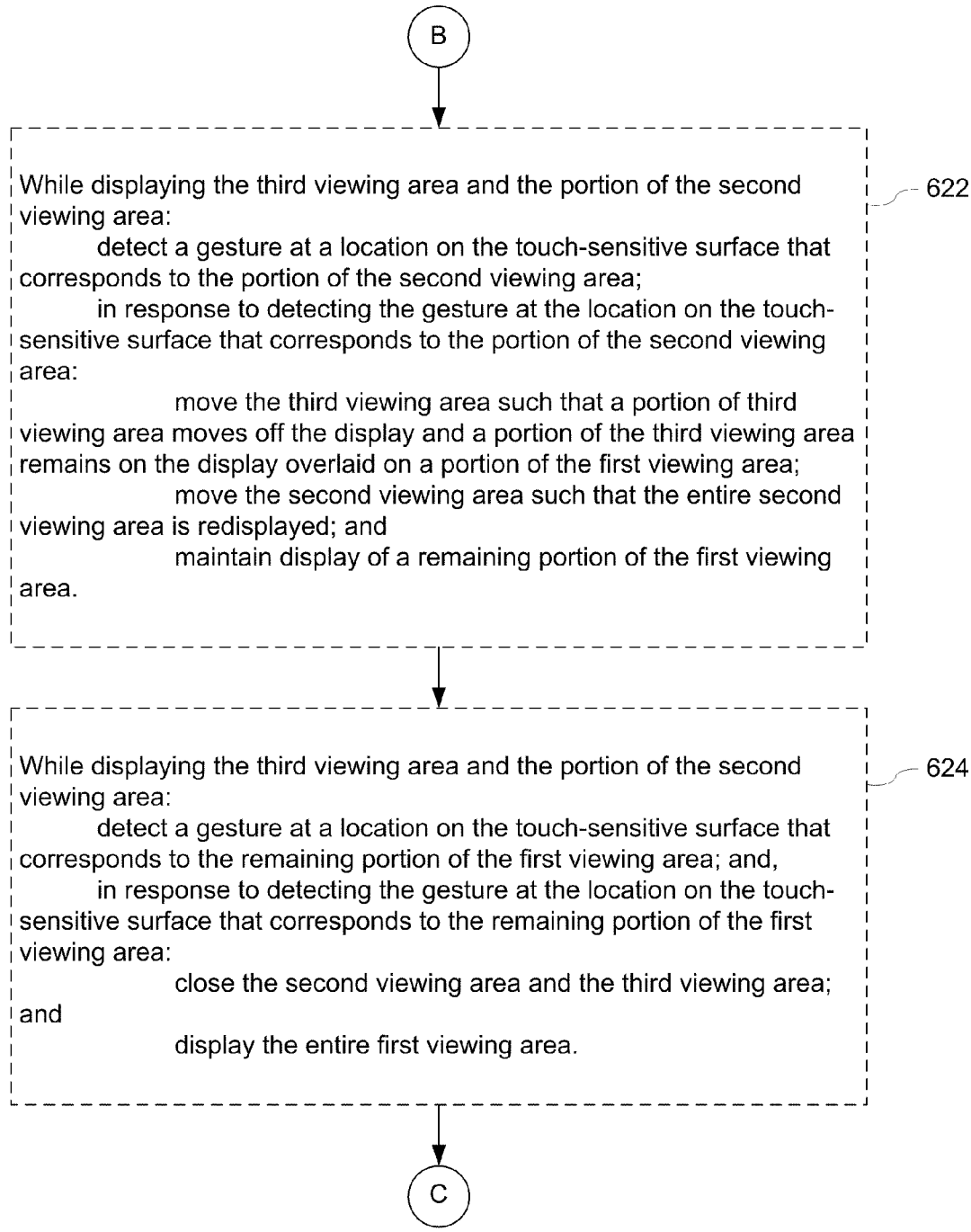
Figure 6E:
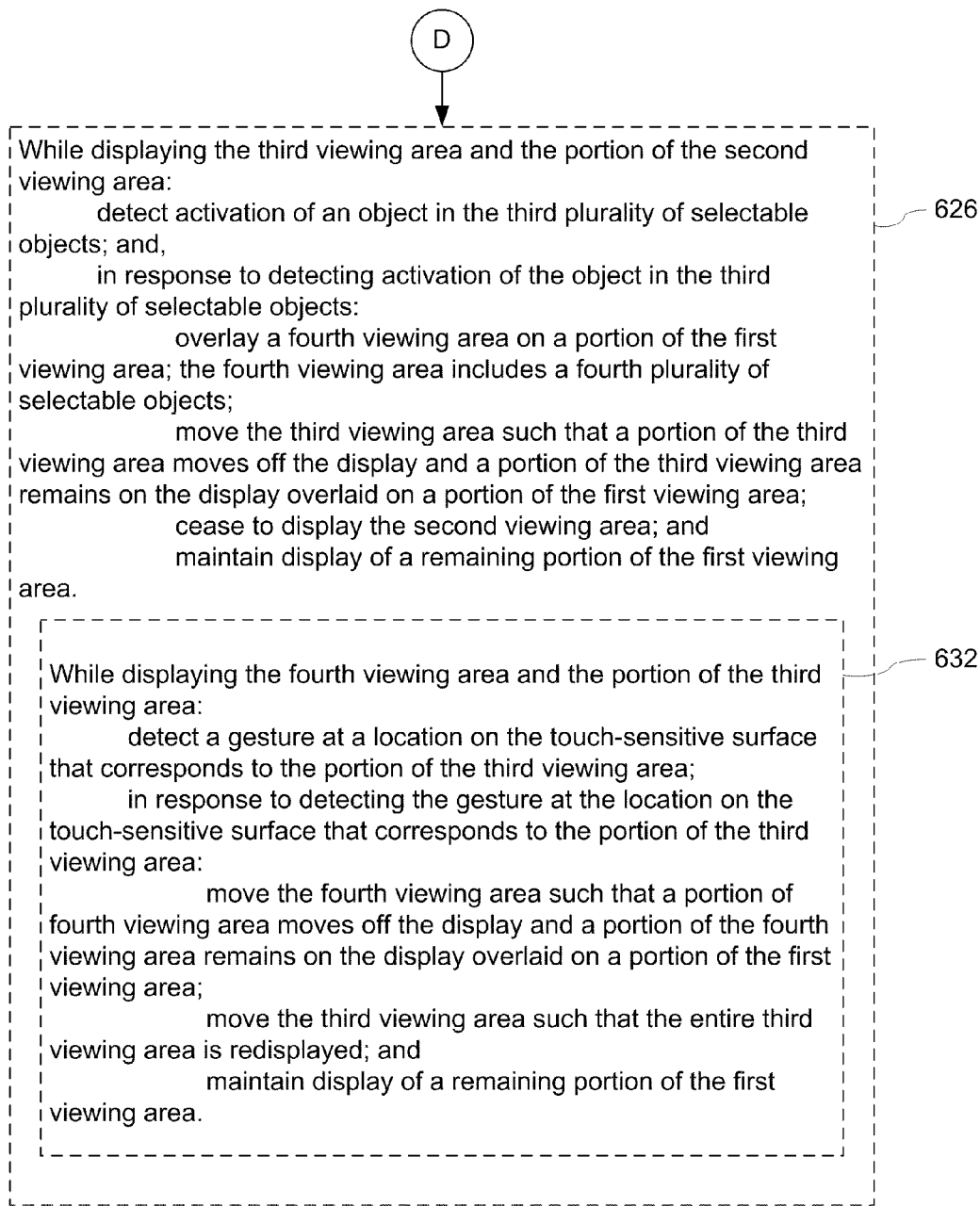

FIGS. 5Z-5JJJ illustrate additional exemplary user interfaces for navigating through multiple viewing areas in accordance with some embodiments. Note that details of the user interfaces described above (e.g., FIGS. 5A-5Y) are also applicable in an analogous manner to the figures described below. For brevity, these details are not repeated below.

FIGS. 5Z-5DD illustrate exemplary user interfaces associated with overlaying a third viewing area. In FIG. 5Z, contact 523 is detected at a location on touch screen 112 that corresponds to the location of movie title icon 518-2. FIG. 5AA illustrates overlaying second viewing area 552-1 over a portion of first viewing area 520. In FIG. 5AA, contact 525 is detected at a location on touch screen 112 that corresponds to the location of movie title icon 562-3. FIGS. 5BB-5DD illustrate an animation of overlaying third viewing area 552-2 over a portion of first viewing area 520.

FIGS. 5EE-5II illustrate exemplary user interfaces associated with swipe gestures. In FIG. 5EE, horizontal swipe gesture 527-A is detected at a location on touch screen 112 that corresponds to third viewing area 552-2. FIGS. 5FF-5GG illustrate a back-tracking operation, resulting in display of entire second viewing area 552-1. In FIG. 5HH, vertical swipe gesture 529-A is detected at a location on touch screen 112 that corresponds to third viewing area 552-2. FIG. 5HH-5II illustrate that a portion of third viewing area 552-2 (e.g., 558-2) is scrolled.

In FIGS. 5JJ-5LL, a back-tracking operation is illustrated in accordance with some embodiments. FIG. 5JJ illustrates a detection of contact 531-A at a location corresponding to a portion of second viewing area 552-1. In some embodiments, swipe gesture 531-A' is detected at a location corresponding to a portion of second viewing area 552-1. FIGS. 5KK-5LL illustrate a sliding animation of second and third viewing areas 552-1 and 552-2. In FIG. 5LL, third viewing area 552-2 ceases to be displayed. In some embodiments, third viewing area 552-2 is closed.

In FIGS. 5MM-5OO, a back-tracking operation is illustrated in accordance with some embodiments. FIG. 5MM illustrates a detection of contact 533-A at a location corresponding to a portion of second viewing area 552-1. In some embodiments, swipe gesture 533-A' is detected at a location corresponding to a portion of second viewing area 552-1. FIGS. 5NN-5OO illustrate a sliding animation of second and third viewing areas 552-1 and 552-2. In FIG. 5OO, a portion of third viewing area 552-2 remains on the display.

FIGS. 5PP-5QQ illustrate exemplary user interfaces associated with returning to the first viewing area. In FIG. 5PP, contact 535 is detected at a location on touch screen 112 that corresponds to a portion of first viewing area 520. In FIG. 5QQ, second viewing area 552-1 and third viewing area 552-2 are closed, and entire first viewing area 520 is displayed.

FIGS. 5RR-5UU illustrate exemplary user interfaces associated with overlaying a fourth viewing area. In FIG. 5RR, contact 537 is detected at a location on touch screen 112 corresponding to movie title icon 562-9 on third viewing area 552-2. FIG. 5SS-5UU illustrate an animation of overlaying fourth viewing area 552-3 over a portion of first viewing area 520.

FIGS. 5VV-WW illustrate exemplary user interfaces associated with returning to the first viewing area. In FIG. 5VV, contact 539 is detected at a location on touch screen 112 that corresponds to a portion of first viewing area 520. In FIG. 5WW, third viewing area 552-2 and fourth viewing area 552-3 are closed, and entire first viewing area 520 is displayed.

In FIGS. 5XX-5ZZ, a back-tracking operation is illustrated in accordance with some embodiments. FIG. 5XX illustrates a detection of contact 541-A at a location corresponding to a portion of third viewing area 552-2. In some embodiments, swipe gesture 541-A' is detected at a location corresponding to a portion of third viewing area 552-2. FIGS. 5YY-5ZZ illustrate a sliding animation of third and fourth viewing areas 552-2 and 552-3. In FIG. 5ZZ, fourth viewing area 552-3 ceases to be displayed. In some embodiments, fourth viewing area 552-3 is closed.

In FIGS. 5AAA-5CCC, a back-tracking operation is illustrated in accordance with some embodiments. FIG. 5AAA illustrates a detection of contact 543-A at a location corresponding to a portion of third viewing area 552-2. In some embodiments, swipe gesture 543-A' is detected at a location corresponding to a portion of third viewing area 552-2. FIGS. 5BBB-5CCC illustrate a sliding animation of third and fourth viewing areas 552-2 and 552-3. In FIG. 5CCC, a portion of fourth viewing area 552-3 remains on the display.

FIGS. 5DDD-5JJJ illustrate exemplary user interfaces associated with displaying and closing a third viewing area. In FIG. 5DDD, contact 545 is detected at a location on touch screen 112 that corresponds to the location of movie title icon 518-2. FIG. 5EEE illustrates overlaying second viewing area 552-1 over a portion of first viewing area 520. In FIG. 5EEE, contact 547 is detected at a location on touch screen 112 that corresponds to the location of movie title icon 562-3. FIGS. 5FFF-5HHH illustrate an animation of overlaying third viewing area 552-2 over a portion of first viewing area 520. In FIG. 5III, contact 549 is detected at a location on touch screen 112 that corresponds to a portion of first viewing area 520. In FIG. 5JJJ, second viewing area 552-1 and third viewing area 552-2 are closed, and entire first viewing area 520 is displayed.

FIGS. 6A-6E are flow diagrams illustrating method 600 of navigating through multiple viewing areas in accordance with some embodiments. Method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to navigate through multiple viewing areas. The method reduces the cognitive burden on a user when navigating through multiple viewing areas, thereby creating a more efficient human-machine interface. For battery-operated computing devices, enabling a user to navigate through multiple viewing areas faster and more efficiently conserves power and increases the time between battery charges.

The device displays a first viewing area (602). The first viewing area includes a first plurality of selectable objects. In some embodiments, the first viewing area is a window or other predefined viewing area that includes selectable objects, such as activatable icons or links (e.g., first viewing area 520 in FIG. 5A includes a plurality of selectable objects, including icons 516 and 518).

While displaying the first viewing area, the device detects activation of an object in the first plurality of selectable objects (604). In some embodiments, the device detects activation of the object by detecting a tap or other gesture on the object on a touch screen display (e.g., contact 523 on icon 518-2 in FIG. 5Z), or by detecting a mouse click while a cursor is at the object.

In response to detecting activation of the object in the first plurality of selectable objects, the device overlays a second viewing area on a portion of the first viewing area while maintaining display of a remaining portion of the first viewing area (606). The second viewing area includes a second plurality of selectable objects. For example, the device 100 overlays a second viewing area 552-1 on a portion of first viewing area 520 (FIG. 5AA). Second viewing area 552-1 includes a plurality of selectable objects (e.g., icons 562-1, 562-2, 562-3, 562-4, and 562-5 in FIG. 5AA).

In some embodiments, in response to detecting activation of the object in the first plurality of selectable objects, the device visually deemphasizes the remaining portion of the first viewing area (608). In some embodiments, visually deemphasizing the remaining portion of the first viewing area includes diminishing the remaining portion of the first area relative to the display of the first area prior to displaying the second viewing area by dimming, shading, graying-out, or otherwise deemphasizing the remaining portion of the first area (e.g., first viewing area 520 in FIG. 5AA).

After overlaying the second viewing area, the device detects activation of an object in the second plurality of selectable objects (610). As described above, in some embodiments, the device detects activation of the object by detecting a tap or other gesture on the object on a touch screen display (e.g., contact 525 on icon 562-3 in FIG. 5AA), or by detecting a mouse click while a cursor is at the object.

In response to detecting activation of the object in the second plurality of selectable objects, the device overlays a third viewing area on a portion of the first viewing area, displays a portion of the second viewing area overlaid on a portion of the first viewing area, and maintains display of a remaining portion of the first viewing area (612). The third viewing area includes a third plurality of selectable objects. For example, device 100 overlays third viewing area 552-2 on a portion of first viewing area 520, displays a portion of second viewing area 552-1 overlaid on a portion of first viewing area 520, and maintains display of a remaining portion of first viewing area 520 (FIG. 5DD). Third viewing area 552-2 includes a plurality of selectable objects (e.g., icons 562-6, 562-7, 562-8, 562-9, and 562-10 in FIG. 5II).

In some embodiments, the remaining portion of the first viewing area is dimmed or otherwise visually deemphasized (e.g., the remaining portion of first viewing area 520 in FIG. 5DD).

In some embodiments, the third viewing area is displayed where the second viewing area was previously shown, such as at a centered location on the display (e.g., when FIGS. 5AA and 5DD are compared, third viewing area 552-2 is displayed at a location on touch screen 112 where second viewing area 552-1 was previously shown).

In some embodiments, in response to detecting activation of the object in the second plurality of selectable objects, the device moves the second viewing area such that a portion of second viewing area moves off the display and a portion of the second viewing area remains on the display overlaid on a portion of first viewing area (614) (e.g., in FIGS. 5BB-5DD, a portion of second viewing area 552-1 moves off the display and a portion of second viewing area 552-1 remains on touch screen 112 overlaid on a portion of first viewing area 520).

In some embodiments, the first viewing area, the second viewing area, and the third viewing area are part of a single application (616). For example, in FIGS. 5Z-5JJJ, first viewing area 520, second viewing area 552-1, and third viewing area 552-2 are part of the digital content management application. In some embodiments, the first viewing area, the second viewing area, and the third viewing area are in separate respective applications. For example, first viewing area 520 in FIG. 5Z, as part of the digital content management application, may include a hyperlink that when activated initiates the display of web content in a second viewing area as part of a browser application. Similarly, the second viewing area may include a link to an electronic document, which can be displayed in a third viewing area as part of an electronic document reader application.

In some embodiments, while displaying the third viewing area and the portion of the second viewing area, the device detects a swipe gesture on the touch-sensitive surface (618). In some embodiments, the swipe gesture is detected at a location on the touch-sensitive surface that corresponds to the third viewing area (e.g., swipe gesture 527-A in FIG. 5EE). In response to detecting the swipe gesture on the touch-sensitive surface, when the swipe gesture occurs in a first direction (e.g., a horizontal direction on the touch-sensitive surface, such as swipe gesture 527-A in FIG. 5EE), the devices ceases to display (or closes) the third viewing area (e.g., viewing area 552-2 in FIGS. 5FF-5GG); moves the second viewing area such that the entire second viewing area is redisplayed (e.g., viewing area 552-1 in FIG. 5FF-5GG); and maintains display of a remaining portion of the first viewing area (e.g., viewing area 520 in FIG. 5GG). In some embodiments, the second viewing area replaces the third viewing area at a centered location on the display (e.g., in FIGS. 5EE-5GG, second viewing area 552-1 replaces third viewing area 552-2 at a centered location on display 112). In some embodiments, the remaining portion of the first viewing area is dimmed or otherwise visually deemphasized (e.g., first viewing area 520 in FIG. 5GG). When the swipe gesture occurs in a second direction that is perpendicular to the first direction (e.g., a vertical direction on the touch-sensitive surface, such as the movement of contact 529-A in FIG. 5HH), the device maintains display of the third viewing area and the portion of the second viewing area, and scrolls at least a portion of the third viewing area (e.g., in FIGS. 5HH-5II, the device maintains display of third viewing area 552-2 and a portion of second viewing area 552-1, and scrolls a portion of third viewing area 552-2).

In some embodiments, while displaying the third viewing area and the portion of the second viewing area, the device detects a gesture (e.g., a tap or a swipe gesture) at a location on the touch-sensitive surface that corresponds to the portion of the second viewing area (620) (e.g., contact 531-A on a portion of second viewing area 552-1 in FIG. 5JJ). In some embodiments, detecting a swipe gesture (e.g., a horizontal swipe gesture) at a location on the touch-sensitive surface that corresponds to the second or third viewing area will also initiate the following response (e.g., swipe gesture 531-A' on the portion of second viewing area 552-1 in FIG. 5JJ). In response to detecting the gesture at the location on the touch-sensitive surface that corresponds to the portion of the second viewing area, the device ceases to display (or closes) the third viewing area, moves the second viewing area such that the entire second viewing area is redisplayed, and maintains display of a remaining portion of the first viewing area (e.g., FIGS. 5KK-5LL). In some embodiments, the second viewing area replaces the third viewing area at a centered location on the display (e.g., in FIGS. 5JJ-5LL, second viewing area 552-1 replaces third viewing area 552-2 at a centered location on display 112). In some embodiments, the remaining portion of the first viewing area is dimmed or otherwise visually deemphasized (e.g., first viewing area 520 in FIG. 5LL).

In some embodiments, while displaying the third viewing area and the portion of the second viewing area, the device detects a gesture (e.g., a tap or a swipe gesture) at a location on the touch-sensitive surface that corresponds to the portion of the second viewing area (622) (e.g., contact 533-A on a portion of second viewing area 552-1 in FIG. 5MM). In some embodiments, detecting a swipe gesture (e.g., a horizontal swipe gesture) at a location on the touch-sensitive surface that corresponds to the second or third viewing area will also initiate the following response (e.g., swipe gesture 533-A' on the portion of second viewing area 552-2 in FIG. 5MM). In response to detecting the gesture at the location on the touch-sensitive surface that corresponds to the portion of the second viewing area, the device moves the third viewing area such that a portion of third viewing area moves off the display and a portion of the third viewing area remains on the display overlaid on a portion of the first viewing area, moves the second viewing area such that the entire second viewing area is redisplayed, and maintains display of a remaining portion of the first viewing area (e.g., in FIGS. 5MM-5OO, the device moves third viewing area 552-2 such that a portion of third viewing area 552-2 moves off the display and a portion of third viewing area 552-2 remains on the display, moves second viewing area 552-1 such that the entire second viewing area 552-1 is redisplayed, and maintains display of a remaining portion of first viewing area 520). In some embodiments, the second viewing area replaces the third viewing area at a centered location on the display (e.g., in FIGS. 5MM-5OO, second viewing area 552-1 replaces third viewing area 552-2 at a centered location on display 112). In some embodiments, the remaining portion of the first viewing area is dimmed or otherwise visually deemphasized (e.g., in FIG. 5OO, the remaining portion of first viewing area 520 is visually deemphasized).

In some embodiments, while displaying the third viewing area and the portion of the second viewing area, the device detects a gesture (e.g., a tap gesture) at a location on the touch-sensitive surface that corresponds to the remaining portion of the first viewing area (624). In response to detecting the gesture at the location on the touch-sensitive surface that corresponds to the remaining portion of the first viewing area, the device closes the second viewing area and the third viewing area, and displaying the entire first viewing area. For example, in response to contact 535 in FIG. 5PP, device 100 closes all viewing areas (e.g., 552-1 and 552-2) overlaid on first viewing area 520, and displays entire first viewing area 520 in Figure QQ. The viewing areas that were previously overlaid on the first viewing area (e.g., the second viewing area and the third viewing area) are closed and not merely hidden by redisplay of the entire first viewing area. In some embodiments, when the remaining portion of the first viewing area is dimmed or otherwise visually deemphasized, the dimming is ceased when the entire first viewing area is redisplayed (e.g., first viewing area 520 in FIG. 5QQ).

In some embodiments, while displaying the third viewing area and the portion of the second viewing area, the device detects activation of an object in the third plurality of selectable objects (626) (e.g., contact 537 in FIG. 5RR). In response to detecting activation of the object in the third plurality of selectable objects, the device overlays a fourth viewing area on a portion of the first viewing area (626) (e.g., viewing area 552-3 in FIG. 5UU). The fourth viewing area includes a fourth plurality of selectable objects (e.g., icons 562 in FIG. 5UU). In some embodiments, the fourth viewing area is displayed where the second and third viewing areas were previously shown, such as at a centered location on the display (e.g., compare the locations of fourth viewing area 552-3 in FIG. 5UU and third viewing area 552-2 in FIG. 5RR). Also in response to detecting activation of the object in the third plurality of selectable objects, the device moves the third viewing area such that a portion of third viewing area moves off the display and a portion of the third viewing area remains on the display overlaid on a portion of the first viewing area (e.g., third viewing area 552-2 in FIG. 5UU), ceases to display the second viewing area (e.g., second viewing area 552-1 moves fully off display 112), and maintains display of a remaining portion of the first viewing area (626) (e.g., first viewing area 520 in FIG. 5UU). In some embodiments, the remaining portion of the first viewing area is dimmed or otherwise visually deemphasized (e.g., first viewing area 520 in FIG. 5UU).

In some embodiments, while displaying the fourth viewing area and the portion of the third viewing area, the device detects (628) a gesture (e.g., a tap gesture) at a location on the touch-sensitive surface that corresponds to the remaining portion of the first viewing area (e.g., contact 539 in FIG. 5VV). In response to detecting the gesture at the location on the touch-sensitive surface that corresponds to the remaining portion of the first viewing area, the device closes the fourth viewing area and the third viewing area, and displays the entire first viewing area (e.g., FIG. 5WW). All of the viewing areas that were previously overlaid on the first viewing area are closed and not merely hidden by redisplay of the entire first viewing area. In some embodiments, when the remaining portion of the first viewing area is dimmed or otherwise visually deemphasized, the dimming is ceased when the entire first viewing area is redisplayed (e.g., first viewing area 520 in FIG. 5WW).

In some embodiments, while displaying the fourth viewing area and the portion of the third viewing area, the device detects (630) a gesture (e.g., a tap or a swipe gesture) at a location on the touch-sensitive surface that corresponds to the portion of the third viewing area (e.g., contact 541-A in FIG. 5XX). In some embodiments, detecting a swipe gesture (e.g., a horizontal swipe gesture) at a location on the touch-sensitive surface that corresponds to the third or fourth viewing area will also initiate the following response (e.g., swipe gesture 541-A' in FIG. 5XX). In response to detecting the gesture at the location on the touch-sensitive surface that corresponds to the portion of the third viewing area, the device ceases to display (or closes) the fourth viewing area, moves the third viewing area such that the entire third viewing area is redisplayed; and maintains display of a remaining portion of the first viewing area (e.g., FIGS. 5YY-5ZZ). In some embodiments, the third viewing area replaces the fourth viewing area at a centered location on the display (e.g., in FIG. 5XX-5ZZ, third viewing area 552-2 replaces fourth viewing area 552-3 at a centered location on display 112). In some embodiments, the remaining portion of the first viewing area is dimmed or otherwise visually deemphasized (e.g., first viewing area 520 in FIG. 5ZZ).

In some embodiments, while displaying the fourth viewing area and the portion of the third viewing area, the device detects (632) a gesture (e.g., a tap or a swipe gesture) at a location on the touch-sensitive surface that corresponds to the portion of the third viewing area (e.g., contact 543-A in FIG. 5AAA). In some embodiments, detecting a swipe gesture (e.g., a horizontal swipe gesture) at a location on the touch-sensitive surface that corresponds to the third or fourth viewing area will also initiate the following response (e.g., swipe gesture 543-A' in FIG. 5AAA). In response to detecting the gesture at the location on the touch-sensitive surface that corresponds to the portion of the third viewing area, the device moves the fourth viewing area such that a portion of fourth viewing area moves off the display and a portion of the fourth viewing area remains on the display overlaid on a portion of the first viewing area; moves the third viewing area such that the entire third viewing area is redisplayed; and maintains display of a remaining portion of the first viewing area (e.g., FIGS. 5AAA-5CCC). In some embodiments, the third viewing area replaces the fourth viewing area at a centered location on the display (e.g., in FIG. 5AAA-5CCC, third viewing area 552-2 replaces fourth viewing area 552-3 at a centered location on display 112). In some embodiments, the remaining portion of the first viewing area is dimmed or otherwise visually deemphasized (e.g., first viewing area 520 in FIG. 5CCC). In some embodiments, the device also overlays a portion of the second viewing area on a portion of the first viewing area (e.g., second viewing area 552-1 in FIG. 5CCC).

Note that details of the processes described above with respect to method 600 (e.g., FIGS. 6A-6E, and 5A-5CCC) are also applicable in an analogous manner to the methods described below. For example, methods 700 and 800 may includes one or more of the characteristics of the various methods involving the fourth viewing area described above with reference to method 600. For brevity, these details are not repeated below.

Figure 7:
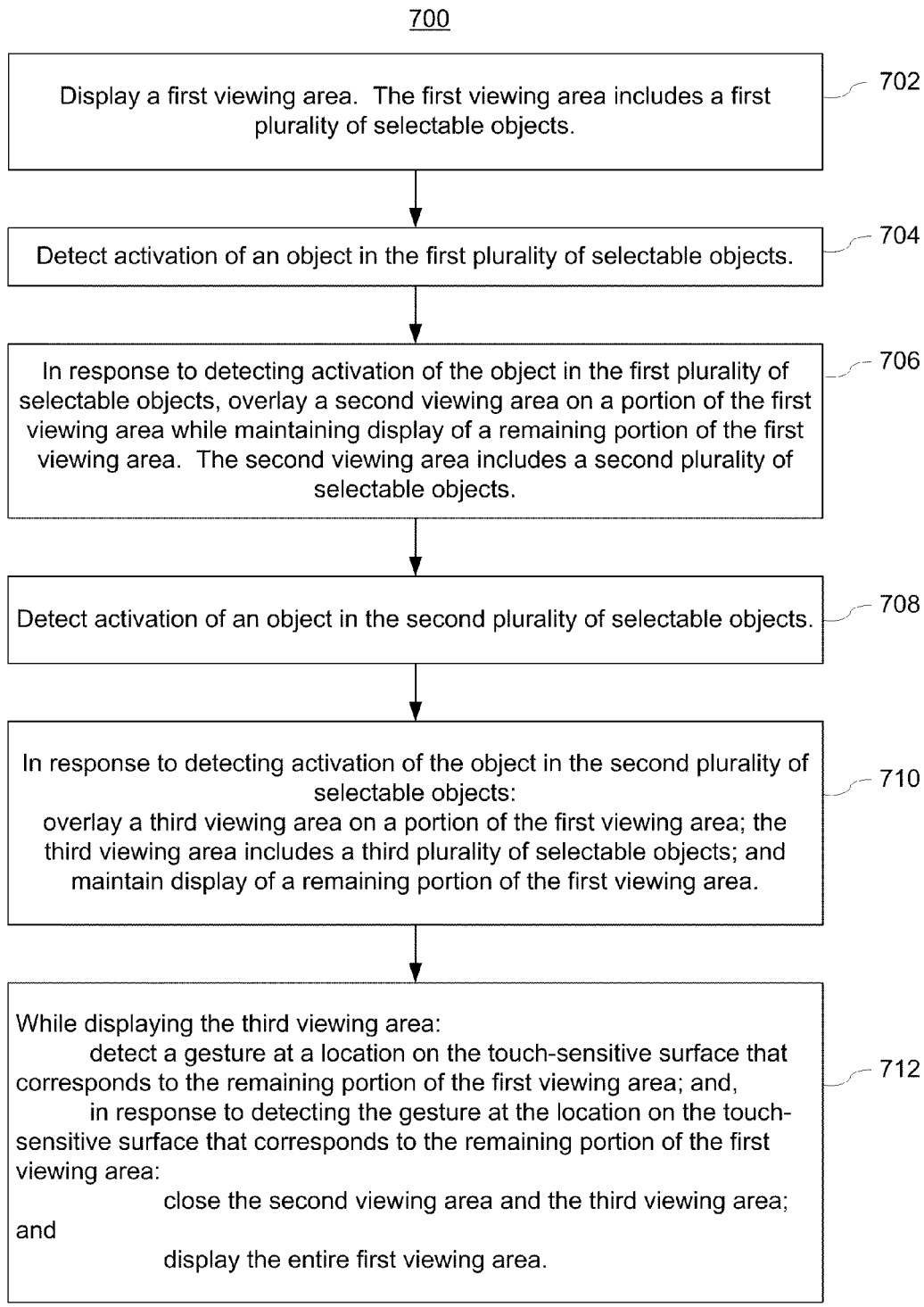
FIG. 7 is a flow diagram illustrating a method of returning to a first viewing area after navigating through multiple viewing areas in accordance with some embodiments.

FIG. 7 is a flow diagram illustrating method 700 of returning to the first viewing area after navigating through multiple viewing areas in accordance with some embodiments. Method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to return to the first viewing area after navigating through multiple viewing areas. The method reduces the cognitive burden on a user when returning to the first viewing area after navigating through multiple viewing areas, thereby creating a more efficient human-machine interface. For battery-operated computing devices, enabling a user to return to the first viewing area after navigating through multiple viewing areas faster and more efficiently conserves power and increases the time between battery charges.

The device displays a first viewing area, the first viewing area including a first plurality of selectable objects (702) (e.g., a window or other predefined viewing area that includes selectable objects, such as activatable icons or links; first viewing area 520 in FIG. 5DDD includes a plurality of selectable objects, including icons 516 and 518), and detects activation of an object in the first plurality of selectable objects (704) (e.g., by detecting a tap or other gesture on the object on a touch screen display, such as contact 545 on the icon 518-2 in FIG. 5DDD, or detecting a mouse click while a cursor is at the object).

In response to detecting activation of the object in the first plurality of selectable objects, the device overlays a second viewing area on a portion of the first viewing area while maintaining display of a remaining portion of the first viewing area (706) (e.g., second viewing area 552-1 in FIG. 5EEE). The second viewing area includes a second plurality of selectable objects (e.g., icons 562 in FIG. 5EEE).

The device detects activation of an object in the second plurality of selectable objects (708) (e.g., contact 547 in FIG. 5EEE). In response to detecting activation of the object in the second plurality of selectable objects, the device overlays a third viewing area on a portion of the first viewing area and maintains display of a remaining portion of the first viewing area (710) (e.g., FIGS. 5EEE-5HHH). The third viewing area includes a third plurality of selectable objects (710) (e.g., icons 562 in FIG. 5III). In some embodiments, the third viewing area is displayed where the second viewing area was previously shown, such as at a centered location on the display (e.g., compare locations of second viewing area 552-1 in FIG. 5EEE and third viewing area 552-2 in FIG. 5HHH). In some embodiments, the remaining portion of the first viewing area is dimmed or otherwise visually deemphasized (e.g., first viewing area 520 in FIG. 5HHH).

While displaying the third viewing area, the device detects a gesture (e.g., a tap gesture) at a location on the touch-sensitive surface that corresponds to the remaining portion of the first viewing area (712) (e.g., contact 549 in FIG. 5III). In response to detecting the gesture at the location on the touch-sensitive surface that corresponds to the remaining portion of the first viewing area, the device closes the second viewing area and the third viewing area, and displays the entire first viewing area (712) (e.g., FIG. 5JJJ). The viewing areas that were previously overlaid on the first viewing area (e.g., the second viewing area and the third viewing area) are closed and not merely hidden by redisplay of the entire first viewing area. In some embodiments, when the remaining portion of the first viewing area is dimmed or otherwise visually deemphasized, the dimming is ceased when the entire first viewing area is redisplayed (e.g., FIG. 5JJJ).

Figure 8:
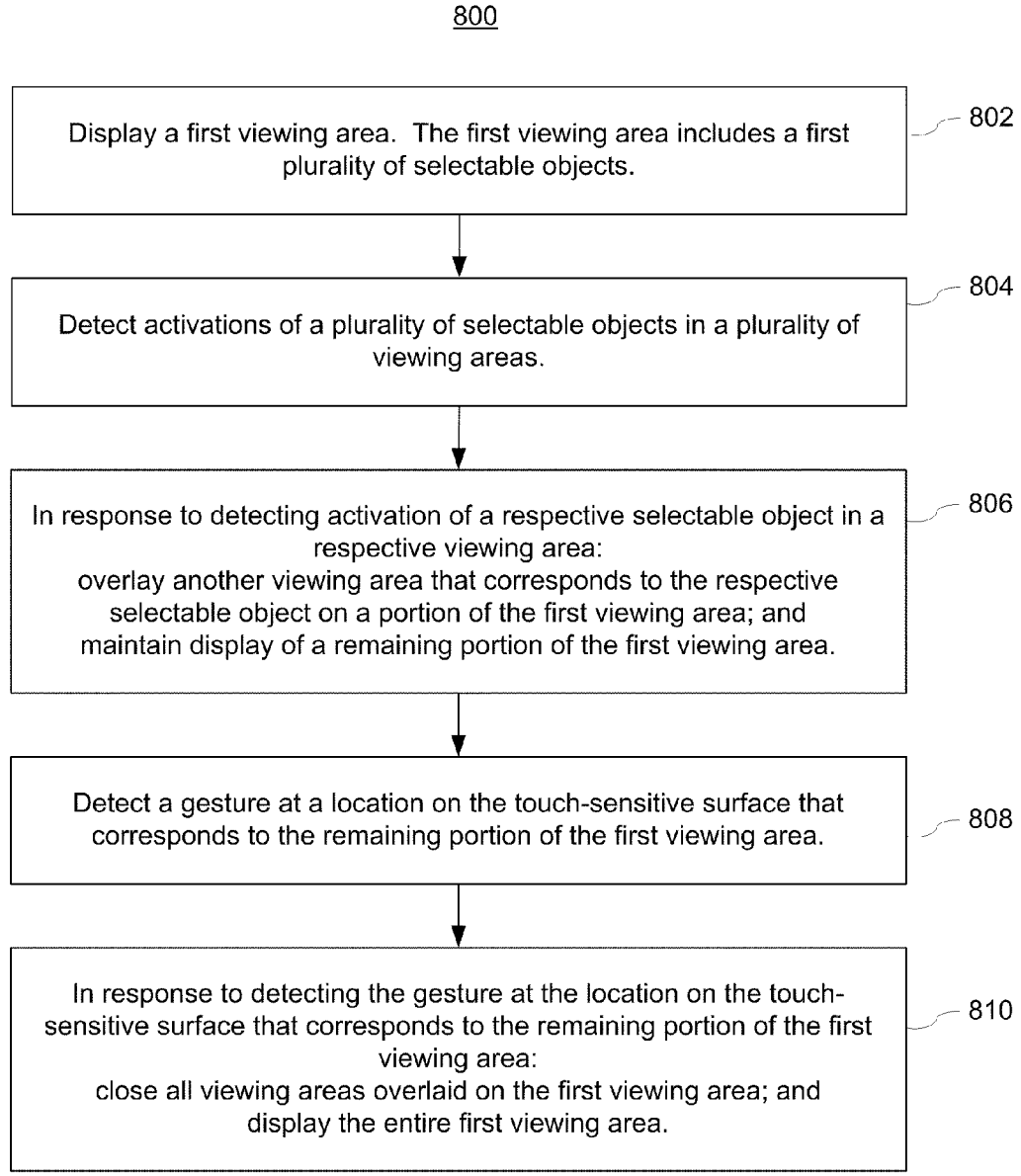
FIG. 8 is a flow diagram illustrating a method of returning to a first viewing area after navigating through multiple viewing areas in accordance with some embodiments.

FIG. 8 is a flow diagram illustrating method 800 of returning to a first viewing area after navigating through multiple viewing areas in accordance with some embodiments. Method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to return to a first viewing area after navigating through multiple viewing areas. The method reduces the cognitive burden on a user when returning to a first viewing area after navigating through multiple viewing areas, thereby creating a more efficient human-machine interface. For battery-operated computing devices, enabling a user to use a plurality of selectable objects in a plurality of viewing areas faster and more efficiently conserves power and increases the time between battery charges.

The device displays a first viewing area, the first viewing area including a first plurality of selectable objects (802) (e.g., a window or other predefined viewing area that includes selectable objects, such as activatable icons or links; first viewing area 520 in FIG. 5DDD includes a plurality of selectable objects, including icons 516 and 518), and detects activations of a plurality of selectable objects in a plurality of viewing areas (804) (e.g., contact 545 on icon 518-2 in FIG. 5DDD; and contact 547 on icon 562-3 in FIG. 5EEE). In some embodiments, when the remaining portion of the first viewing area is dimmed or otherwise visually deemphasized, the dimming is ceased when the entire first viewing area is redisplayed. In response to detecting activation of a respective selectable object in a respective viewing area, the device overlays another viewing area that corresponds to the respective selectable object on a portion of the first viewing area, and maintains display of a remaining portion of the first viewing area (806) (e.g., in FIG. 5EEE, second viewing area 552-1 is overlaid on a portion of first viewing area 520; second viewing area 552-1 corresponds to the respective selectable object, icon 518-2, in FIG. 5DDD).

The device further detects a gesture (e.g., a tap gesture) at a location on the touch-sensitive surface that corresponds to the remaining portion of the first viewing area (808) (e.g., contact 549 in FIG. 5III). In some embodiments, in response to detecting the gesture at the location on the touch-sensitive surface that corresponds to the remaining portion of the first viewing area, the device closes all viewing areas overlaid on the first viewing area; and displays the entire first viewing area (810) (e.g., FIG. 5JJJ). All of the viewing areas that were previously overlaid on the first viewing area are closed and not merely hidden by redisplay of the entire first viewing area. In some embodiments, when the remaining portion of the first viewing area is dimmed or otherwise visually deemphasized, the dimming is ceased when the entire first viewing area is redisplayed (e.g., first viewing area 520 in FIG. 5JJJ).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6E, 7 and 8 may be implemented by components depicted in FIGS. 1A-1C. For example, detection operation 604, overlaying operation 606, and visual de-emphasis operation 608 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates event handler 180 associated with the detection of the event or sub-event. Event handler 180 may utilize or call data updater 176 or object updater 177 to update the internal state of application 136-1 data. In some embodiments, event handler 180 accesses respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A multifunction device, comprising:
a display;
a touch-sensitive surface;
one or more processors;
memory; and one or more programs, wherein the one or more programs are stored in the memory and configured to be executed by the one or more processors, the one or more programs including instructions for:
   displaying a first viewing area, the first viewing area including a first plurality of selectable objects;
   detecting activation of an object in the first plurality of selectable objects;
   in response to detecting activation of the object in the first plurality of selectable objects, overlaying a second viewing area on a portion of the first viewing area while maintaining display of a remaining portion of the first viewing area, wherein the second viewing area includes a second plurality of selectable objects;
   detecting activation of an object in the second plurality of selectable objects;
   in response to detecting activation of the object in the second plurality of selectable objects:
      overlaying a third viewing area on a portion of the first viewing area, wherein the third viewing area includes a third plurality of selectable objects;
      displaying a portion, less than all, of the second viewing area overlaid on a portion of the first viewing area; and
      maintaining display of a remaining portion of the first viewing area; and
   while displaying the third viewing area and the portion of the second viewing area:
      detecting a swipe gesture on the touch-sensitive surface; and, in response to detecting the swipe gesture on the touch-sensitive surface:
         when the swipe gesture occurs in a first direction:
            moving the second viewing area such that the entire second viewing area is redisplayed; and
            maintaining display of a remaining portion of the first viewing area; and,
         when the swipe gesture occurs in a second direction that is perpendicular to the first direction:
            maintaining display of the third viewing area, the portion of the second viewing area, and a remaining portion of the first viewing area; and
            scrolling at least a portion of the third viewing area to display a new portion of the third viewing area.

2. The device of claim 1, wherein the first viewing area, the second viewing area, and the third viewing area are part of a single application.

3. The device of claim 1, including instructions for:
   in response to detecting activation of the object in the first plurality of selectable objects, visually deemphasizing the remaining portion of the first viewing area.

4. The device of claim 1, including instructions for:
   in response to detecting activation of the object in the second plurality of selectable objects, moving the second viewing area in a lateral direction such that a portion of the second viewing area moves off an edge of the display and a portion of the second viewing area remains on the display overlaid on a portion of the first viewing area, while concurrently moving the third viewing area in the lateral direction onto the display.

5. The device of claim 1, including instructions for:
   while displaying the third viewing area and the portion of the second viewing area:
      detecting a gesture at a location on the touch-sensitive surface that corresponds to the portion of the second viewing area; and, in response to detecting the gesture at the location on the touch-sensitive surface that corresponds to the portion of the second viewing area:
         ceasing to display the third viewing area;
         moving the second viewing area such that the entire second viewing area is redisplayed; and
         maintaining display of a remaining portion of the first viewing area.

6. The device of claim 1, including instructions:
   while displaying the third viewing area and the portion of the second viewing area:
      detecting a gesture at a location on the touch-sensitive surface that corresponds to the portion of the second viewing area;
      in response to detecting the gesture at the location on the touch-sensitive surface that corresponds to the portion of the second viewing area:
         moving the third viewing area such that a portion of third viewing area moves off the display and a portion of the third viewing area remains on the display overlaid on a portion of the first viewing area;
         moving the second viewing area such that the entire second viewing area is redisplayed; and
         maintaining display of a remaining portion of the first viewing area.

7. The device of claim 1, including instructions for:
   while displaying the third viewing area and the portion of the second viewing area:
      detecting activation of an object in the third plurality of selectable objects; and,
      in response to detecting activation of the object in the third plurality of selectable objects:
         overlaying a fourth viewing area on a portion of the first viewing area, wherein the fourth viewing area includes a fourth plurality of selectable objects;
         moving the third viewing area such that a portion of third viewing area moves off the display and a portion of the third viewing area remains on the display overlaid on a portion of the first viewing area;
         ceasing to display the second viewing area; and
         maintaining display of a remaining portion of the first viewing area.

8. The device of claim 7, including instructions for:
   while displaying the fourth viewing area and the portion of the third viewing area:
      detecting a gesture at a location on the touch-sensitive surface that corresponds to the remaining portion of the first viewing area; and,
      in response to detecting the gesture at the location on the touch-sensitive surface that corresponds to the remaining portion of the first viewing area:
         closing the fourth viewing area and the third viewing area; and
         displaying the entire first viewing area.

9. The device of claim 7, including instructions for:
   while displaying the fourth viewing area and the portion of the third viewing area:
      detecting a gesture at a location on the touch-sensitive surface that corresponds to the portion of the third viewing area; and,
      in response to detecting the gesture at the location on the touch-sensitive surface that corresponds to the portion of the third viewing area:
         ceasing to display the fourth viewing area;
         moving the third viewing area such that the entire third viewing area is redisplayed; and
         maintaining display of a remaining portion of the first viewing area.

10. The device of claim 7, including instructions for:
while displaying the fourth viewing area and the portion of the third viewing area:
  detecting a gesture at a location on the touch-sensitive surface that corresponds to the portion of the third viewing area;
  in response to detecting the gesture at the location on the touch-sensitive surface that corresponds to the portion of the third viewing area:
    moving the fourth viewing area such that a portion of fourth viewing area moves off the display and a portion of the fourth viewing area remains on the display overlaid on a portion of the first viewing area;
    moving the third viewing area such that the entire third viewing area is redisplayed; and
    maintaining display of a remaining portion of the first viewing area.

11. A method, comprising:
at a multifunction device with a display and a touch-sensitive surface:
  displaying a first viewing area, the first viewing area including a first plurality of selectable objects;
  detecting activation of an object in the first plurality of selectable objects;
    in response to detecting activation of the object in the first plurality of selectable objects, overlaying a second viewing area on a portion of the first viewing area while maintaining display of a remaining portion of the first viewing area, wherein the second viewing area includes a second plurality of selectable objects;
  detecting activation of an object in the second plurality of selectable objects;
  in response to detecting activation of the object in the second plurality of selectable objects:
    overlaying a third viewing area on a portion of the first viewing area, wherein the third viewing area includes a third plurality of selectable objects;
    displaying a portion, less than all, of the second viewing area overlaid on a portion of the first viewing area; and
    maintaining display of a remaining portion of the first viewing area; and
  while displaying the third viewing area and the portion of the second viewing area:
    detecting a swipe gesture on the touch-sensitive surface; and, in response to detecting the swipe gesture on the touch-sensitive surface:
      when the swipe gesture occurs in a first direction:
        moving the second viewing area such that the entire second viewing area is redisplayed; and
        maintaining display of a remaining portion of the first viewing area; and,
      when the swipe gesture occurs in a second direction that is perpendicular to the first direction:
        maintaining display of the third viewing area, the portion of the second viewing area, and a remaining portion of the first viewing area; and
        scrolling at least a portion of the third viewing area to display a new portion of the third viewing area.

12. The method of claim 11, including:
in response to detecting activation of the object in the first plurality of selectable objects, visually deemphasizing the remaining portion of the first viewing area.

13. The method of claim 11, including:
in response to detecting activation of the object in the second plurality of selectable objects, moving the second viewing area in a lateral direction such that a portion of the second viewing area moves off an edge of the display and a portion of the second viewing area remains on the display overlaid on a portion of the first viewing area, while concurrently moving the third viewing area in the lateral direction onto the display.

14. The method of claim 11, including:
while displaying the third viewing area and the portion of the second viewing area:
  detecting a gesture at a location on the touch-sensitive surface that corresponds to the portion of the second viewing area; and, in response to detecting the gesture at the location on the touch-sensitive surface that corresponds to the portion of the second viewing area:
    ceasing to display the third viewing area;
    moving the second viewing area such that the entire second viewing area is redisplayed; and
    maintaining display of a remaining portion of the first viewing area.

15. The method of claim 11, including:
while displaying the third viewing area and the portion of the second viewing area:
  detecting a gesture at a location on the touch-sensitive surface that corresponds to the portion of the second viewing area;
  in response to detecting the gesture at the location on the touch-sensitive surface that corresponds to the portion of the second viewing area:
    moving the third viewing area such that a portion of third viewing area moves off the display and a portion of the third viewing area remains on the display overlaid on a portion of the first viewing area;
    moving the second viewing area such that the entire second viewing area is redisplayed; and
    maintaining display of a remaining portion of the first viewing area.

16. A non-transitory computer readable storage medium storing one or more programs, the one or more programs comprising instructions, which when executed by a multifunction device with a display and a touch-sensitive surface, cause the device to:
  display a first viewing area, the first viewing area including a first plurality of selectable objects;
  detect activation of an object in the first plurality of selectable objects;
  in response to detecting activation of the object in the first plurality of selectable objects, overlay a second viewing area on a portion of the first viewing area while maintaining display of a remaining portion of the first viewing area, wherein the second viewing area includes a second plurality of selectable objects;
  detect activation of an object in the second plurality of selectable objects;
  in response to detecting activation of the object in the second plurality of selectable objects:
    overlay a third viewing area on a portion of the first viewing area, wherein the third viewing area includes a third plurality of selectable objects;
    display a portion, less than all, of the second viewing area overlaid on a portion of the first viewing area; and
    maintain display of a remaining portion of the first viewing area; and while displaying the third viewing area and the portion of the second viewing area:
  detect a swipe gesture on the touch-sensitive surface; and, in response to detecting the swipe gesture on the touch-sensitive surface:
    when the swipe gesture occurs in a first direction:
      move the second viewing area such that the entire second viewing area is redisplayed; and
      maintain display of a remaining portion of the first viewing area; and,
    when the swipe gesture occurs in a second direction that is perpendicular to the first direction:
      maintain display of the third viewing area, the portion of the second viewing area, and a remaining portion of the first viewing area; and
      scroll at least a portion of the third viewing area to display a new portion of the third viewing area.

17. The computer readable storage medium of claim 16, including instructions that cause the device to:
  in response to detecting activation of the object in the first plurality of selectable objects, visually deemphasize the remaining portion of the first viewing area.

18. The computer readable storage medium of claim 16, including instructions that cause the device to:
  in response to detecting activation of the object in the second plurality of selectable objects, move the second viewing area in a lateral direction such that a portion of the second viewing area moves off an edge of the display and a portion of the second viewing area remains on the display overlaid on a portion of the first viewing area, while concurrently moving the third viewing area in the lateral direction onto the display.

19. The computer readable storage medium of claim 16, including instructions that cause the device to:
  while displaying the third viewing area and the portion of the second viewing area:
    detect a gesture at a location on the touch-sensitive surface that corresponds to the portion of the second viewing area; and, in response to detecting the gesture at the location on the touch-sensitive surface that corresponds to the portion of the second viewing area:
      cease to display the third viewing area;
      move the second viewing area such that the entire second viewing area is redisplayed; and
      maintain display of a remaining portion of the first viewing area.

20. The computer readable storage medium of claim 16, including instructions that cause the device to:
  while displaying the third viewing area and the portion of the second viewing area:
    detect a gesture at a location on the touch-sensitive surface that corresponds to the portion of the second viewing area;
    in response to detecting the gesture at the location on the touch-sensitive surface that corresponds to the portion of the second viewing area:
      move the third viewing area such that a portion of third viewing area moves off the display and a portion of the third viewing area remains on the display overlaid on a portion of the first viewing area;
      move the second viewing area such that the entire second viewing area is redisplayed; and
      maintain display of a remaining portion of the first viewing area.

21. A multifunction device, comprising:
  a display;
  a touch-sensitive surface;
  one or more processors;
  memory; and
  one or more programs, wherein the one or more programs are stored in the memory and configured to be executed by the one or more processors, the one or more programs including instructions for:
    displaying a first viewing area, the first viewing area including a first plurality of selectable objects;
    detecting activation of an object in the first plurality of selectable objects;
    in response to detecting activation of the object in the first plurality of selectable objects, overlaying a second viewing area on a portion of the first viewing area while maintaining display of a remaining portion of the first viewing area, wherein the second viewing area includes a second plurality of selectable objects;
    detecting activation of an object in the second plurality of selectable objects;
    in response to detecting activation of the object in the second plurality of selectable objects:
      overlaying a third viewing area on a portion of the first viewing area, wherein the third viewing area includes a third plurality of selectable objects; and
      maintaining display of a remaining portion of the first viewing area;
    while displaying the third viewing area and a portion of the second viewing area:
      detecting a swipe gesture on the touch-sensitive surface; and, in response to detecting the swipe gesture on the touch-sensitive surface:
        when the swipe gesture occurs in a first direction:
          moving the second viewing area such that the entire second viewing area is redisplayed; and
          maintaining display of a remaining portion of the first viewing area; and,
        when the swipe gesture occurs in a second direction that is perpendicular to the first direction:
          maintaining display of the third viewing area, the portion of the second viewing area, and a remaining portion of the first viewing area; and
          scrolling at least a portion of the third viewing area to display a new portion of the third viewing area; and
    while displaying the third viewing area:
      detecting a gesture at a location on the touch-sensitive surface that corresponds to the remaining portion of the first viewing area; and,
      in response to detecting the gesture at the location on the touch-sensitive surface that corresponds to the remaining portion of the first viewing area:
        closing the second viewing area and the third viewing area; and
        displaying the entire first viewing area.

22. A method, comprising:
  at a multifunction device with a display and a touch-sensitive surface:
    displaying a first viewing area, the first viewing area including a first plurality of selectable objects;
    detecting activation of an object in the first plurality of selectable objects;
    in response to detecting activation of the object in the first plurality of selectable objects, overlaying a second viewing area on a portion of the first viewing area while maintaining display of a remaining portion of the first viewing area, wherein the second viewing area includes a second plurality of selectable objects;
detecting activation of an object in the second plurality of selectable objects;
in response to detecting activation of the object in the second plurality of selectable objects:
overlaying a third viewing area on a portion of the first viewing area, wherein the third viewing area includes a third plurality of selectable objects; and
maintaining display of a remaining portion of the first viewing area;
while displaying the third viewing area and a portion of the second viewing area:
detecting a swipe gesture on the touch-sensitive surface; and, in response to detecting the swipe gesture on the touch-sensitive surface:
when the swipe gesture occurs in a first direction:
moving the second viewing area such that the entire second viewing area is redisplayed; and
maintaining display of a remaining portion of the first viewing area; and,
when the swipe gesture occurs in a second direction that is perpendicular to the first direction:
maintaining display of the third viewing area, the portion of the second viewing area, and a remaining portion of the first viewing area; and
scrolling at least a portion of the third viewing area to display a new portion of the third viewing area; and
while displaying the third viewing area:
detecting a gesture at a location on the touch-sensitive surface that corresponds to the remaining portion of the first viewing area; and,
in response to detecting the gesture at the location on the touch-sensitive surface that corresponds to the remaining portion of the first viewing area:
closing the second viewing area and the third viewing area; and
displaying the entire first viewing area.

23. A non-transitory computer readable storage medium storing one or more programs, the one or more programs comprising instructions, which when executed by a multifunction device with a display and a touch-sensitive surface, cause the device to:
display a first viewing area, the first viewing area including a first plurality of selectable objects;
detect activation of an object in the first plurality of selectable objects;
in response to detecting activation of the object in the first plurality of selectable objects, overlay a second viewing area on a portion of the first viewing area while maintaining display of a remaining portion of the first viewing area, wherein the second viewing area includes a second plurality of selectable objects;
detect activation of an object in the second plurality of selectable objects; and,
in response to detecting activation of the object in the second plurality of selectable objects:
overlay a third viewing area on a portion of the first viewing area, wherein the third viewing area includes a third plurality of selectable objects; and
maintain display of a remaining portion of the first viewing area;
while displaying the third viewing area and a portion of the second viewing area:
detect a swipe gesture on the touch-sensitive surface; and, in response to detecting the swipe gesture on the touch-sensitive surface:
when the swipe gesture occurs in a first direction:
move the second viewing area such that the entire second viewing area is redisplayed; and
maintain display of a remaining portion of the first viewing area; and,
when the swipe gesture occurs in a second direction that is perpendicular to the first direction:
maintain display of the third viewing area, the portion of the second viewing area, and a remaining portion of the first viewing area; and
scroll at least a portion of the third viewing area to display a new portion of the third viewing area; and
while displaying the third viewing area:
detect a gesture at a location on the touch-sensitive surface that corresponds to the remaining portion of the first viewing area; and,
in response to detecting the gesture at the location on the touch-sensitive surface that corresponds to the remaining portion of the first viewing area:
close the second viewing area and the third viewing area; and
display the entire first viewing area.

* * * * *